(12) United States Patent
Amano

(10) Patent No.: US 12,535,665 B2
(45) Date of Patent: Jan. 27, 2026

(54) ZOOM LENS, PROJECTION TYPE DISPLAY DEVICE, AND IMAGING APPARATUS

(71) Applicant: FUJIFILM Corporation, Tokyo (JP)

(72) Inventor: Masaru Amano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 484 days.

(21) Appl. No.: 18/163,795

(22) Filed: Feb. 2, 2023

(65) Prior Publication Data

US 2023/0266573 A1 Aug. 24, 2023

(30) Foreign Application Priority Data

Feb. 18, 2022 (JP) ................. 2022-024285

(51) Int. Cl.
*G02B 15/14* (2006.01)
*G02B 15/167* (2006.01)

(52) U.S. Cl.
CPC ......... *G02B 15/145* (2019.08); *G02B 15/167* (2013.01)

(58) Field of Classification Search
CPC .. G02B 15/1461; G02B 15/167; G02B 15/20; G02B 13/18; G02B 13/22; G02B 13/009; G03B 21/142; G03B 21/147
USPC ................ 359/695, 663, 683, 681, 676, 432
See application file for complete search history.

(56) References Cited

U.S. PATENT DOCUMENTS

| | | | | |
|---|---|---|---|---|
| 6,404,561 | B1 * | 6/2002 | Isono ................. | G02B 15/1461 359/683 |
| 2004/0021953 | A1 * | 2/2004 | Betensky ............. | G02B 27/646 359/691 |
| 2005/0190434 | A1 | 9/2005 | Betensky et al. | |
| 2005/0259330 | A1 | 11/2005 | Neil | |
| 2011/0109975 | A1 * | 5/2011 | Amano ................. | G02B 13/22 359/682 |
| 2015/0103403 | A1 | 4/2015 | Oe et al. | |
| 2017/0090169 | A1 * | 3/2017 | Noda ................... | G02B 13/04 |
| 2017/0153414 | A1 * | 6/2017 | Sugita .................. | G02B 15/08 |
| 2018/0307041 | A1 * | 10/2018 | Masui .................. | G02B 13/16 |
| 2020/0264413 | A1 * | 8/2020 | Yamanaka .......... | G02B 15/173 |

(Continued)

FOREIGN PATENT DOCUMENTS

| | | |
|---|---|---|
| CN | 101268399 A | 9/2008 |
| JP | 2006-512595 A | 4/2006 |

(Continued)

OTHER PUBLICATIONS

"Notice of Reasons for Refusal" Office Action issued in JP 2022-024285; mailed by the Japanese Patent Office on Sep. 9, 2025.

*Primary Examiner* — Bumsuk Won
*Assistant Examiner* — Seth D Moser
(74) *Attorney, Agent, or Firm* — Studebaker Brackett PLLC

(57) ABSTRACT

The zoom lens consists of a first unit, a second unit, a third unit, a fourth unit, and a fifth unit in order from the magnification side, and forms an intermediate image. The first unit consists of one lens group which has a positive refractive power. The second unit consists of two lens groups which move during magnification change and has a negative refractive power as a whole at the wide angle end. The third unit includes one or more lens groups which move during magnification change. The fourth unit includes one or more lens groups which move during magnification change.

19 Claims, 33 Drawing Sheets

EXAMPLE 1

(56) References Cited

U.S. PATENT DOCUMENTS

| | | | | |
|---|---|---|---|---|
| 2021/0063710 A1* | 3/2021 | Nagatoshi | ............ | G03B 21/147 |
| 2022/0057612 A1* | 2/2022 | Nagatoshi | .............. | G02B 13/16 |
| 2022/0146842 A1* | 5/2022 | Nagahara | ............... | G02B 15/14 |

FOREIGN PATENT DOCUMENTS

| | | | |
|---|---|---|---|
| JP | 5378162 | B2 | 12/2013 |
| JP | 2017-102227 | A | 6/2017 |
| JP | 2020-106660 | A | 7/2020 |
| JP | 2020-118807 | A | 8/2020 |
| WO | 2013/129274 | A1 | 9/2013 |

* cited by examiner

EXAMPLE 1

FIG. 2
EXAMPLE 1
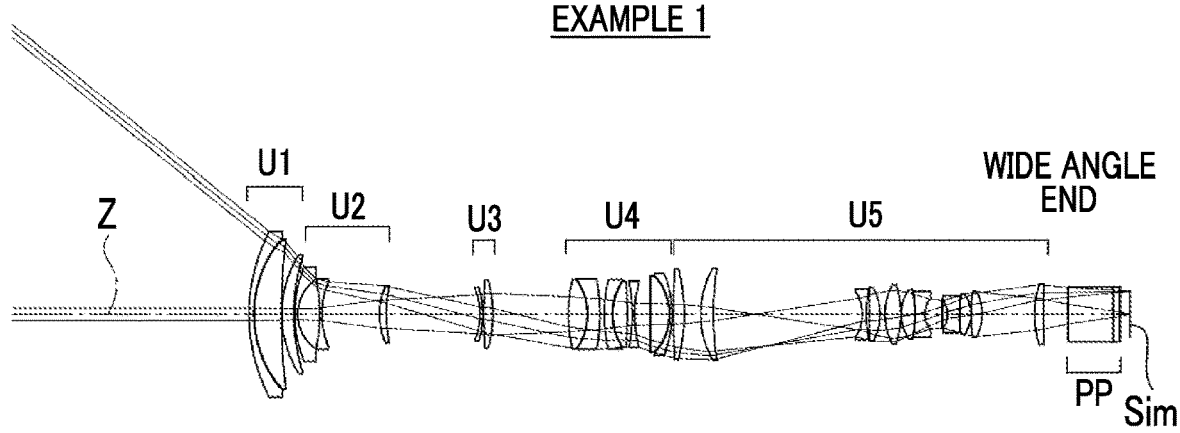
WIDE ANGLE END
FIRST INTERMEDIATE
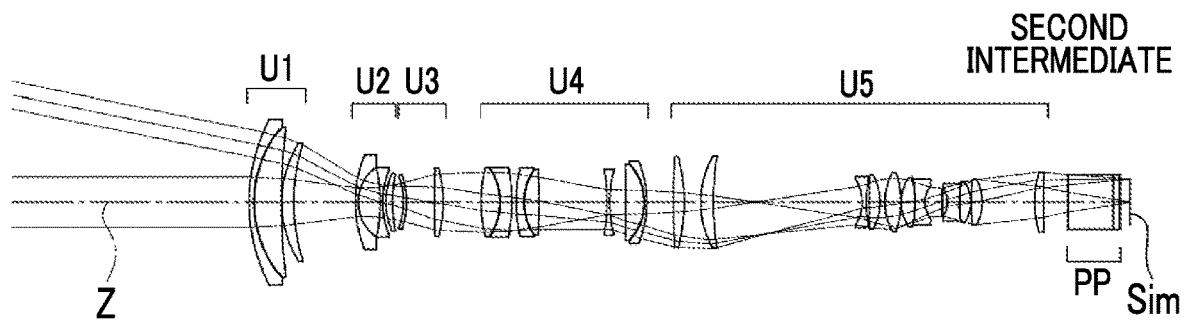
SECOND INTERMEDIATE
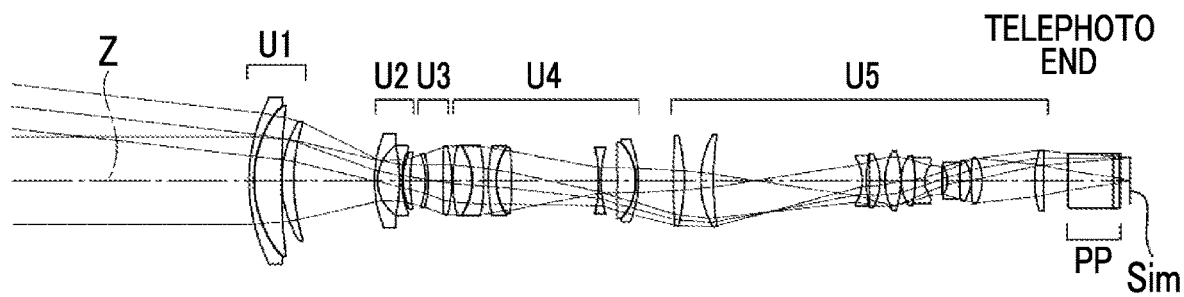
TELEPHOTO END

EXAMPLE 1

EXAMPLE 2

EXAMPLE 2 PROJECTION MAGNIFICATION 150 TIMES

EXAMPLE 3

EXAMPLE 4

EXAMPLE 5

EXAMPLE 6

EXAMPLE 7

FIG. 26
EXAMPLE 7
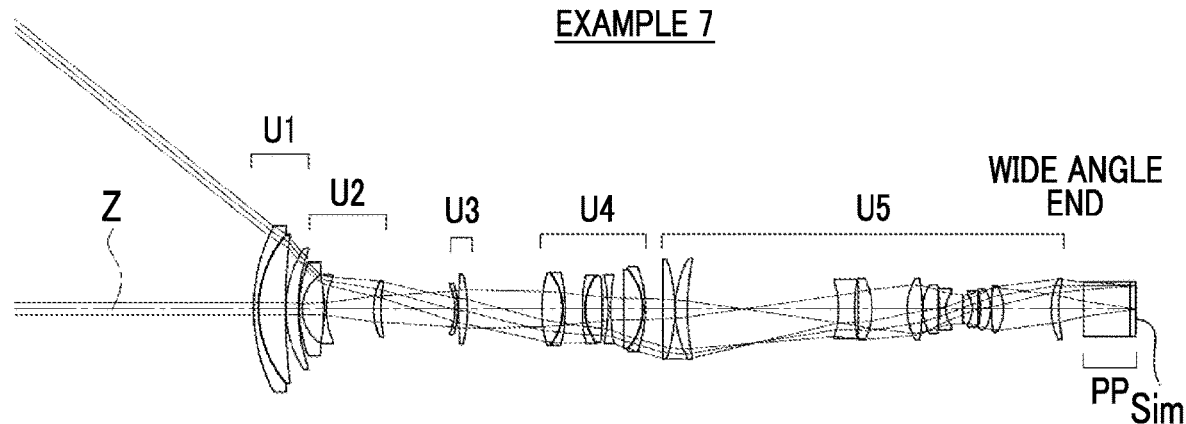
WIDE ANGLE END
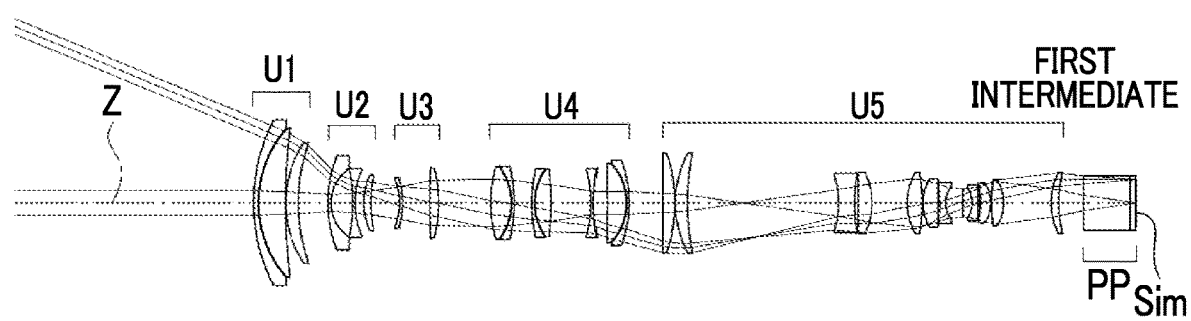
FIRST INTERMEDIATE
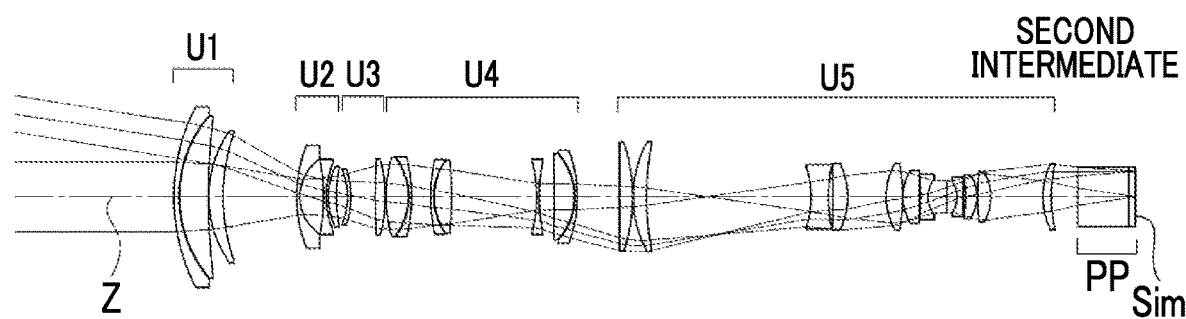
SECOND INTERMEDIATE
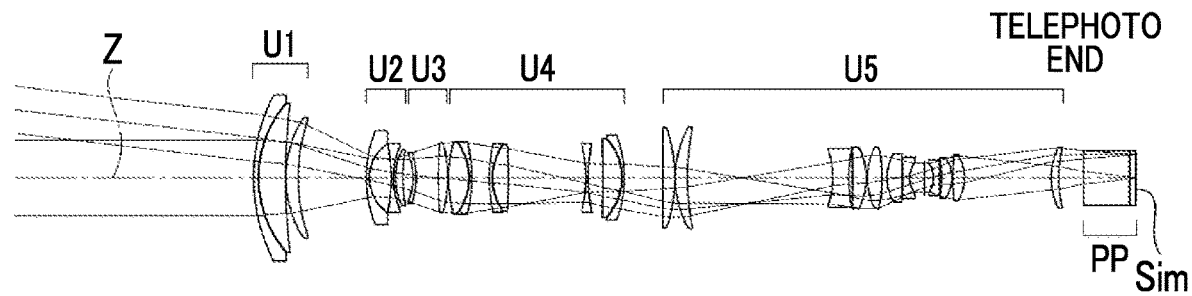
TELEPHOTO END

EXAMPLE 7

ZOOM LENS, PROJECTION TYPE DISPLAY DEVICE, AND IMAGING APPARATUS

CROSS-REFERENCE TO RELATED APPLICATIONS

This application claims priority from Japanese Patent Application No. 2022-024285, filed on Feb. 18, 2022, the entire disclosure of which is incorporated herein by reference.

BACKGROUND OF THE INVENTION

Technical Field

The technique of the present disclosure relates to a zoom lens, a projection type display device, and an imaging apparatus.

Related Art

The lens systems described in JP5378162B and JP2020-118807A below are known as zoom lenses applicable to the projection type display device or the imaging apparatus.

In a zoom lens that forms an intermediate image, there is a demand for a zoom lens that has a high magnification and maintains high optical performance by suppressing fluctuation in aberrations during magnification change. The demand levels are increasing year by year.

SUMMARY

The present disclosure has been made in view of the above circumstances, and in a zoom lens that forms an intermediate image, it is an object of the present disclosure to provide a zoom lens that has a high magnification and maintains high optical performance by suppressing fluctuation in aberrations during magnification change, a projection type display device comprising the zoom lens, and an imaging apparatus comprising the zoom lens.

According to one aspect of the present disclosure, there is provided a zoom lens that forms an intermediate image at a position conjugate to a reduction side image formation plane and reforms the intermediate image on a magnification side image formation plane. The zoom lens consists of, in order from a magnification side to a reduction side along an optical path: a first unit; a second unit; a third unit; a fourth unit; and a fifth unit. In a case where one lens group is a group of which a spacing to an adjacent group in an optical axis direction changes during magnification change, the first unit consists of one lens group that has a positive refractive power, the second unit consists of two lens groups that move by changing mutual spacing between the lens groups during magnification change, and has a negative refractive power as a whole at a wide angle end, the third unit includes one or more lens groups that move during magnification change, and the fourth unit includes one or more lens groups that move during magnification change. In a case where, among intersections of a principal ray having a maximum angle of view and an optical axis at the wide angle end, the intersection on the magnification side on the optical path is set as a first intersection, and the intersection on the reduction side is set as a second intersection, at the wide angle end, the third unit includes a lens group that has a positive refractive power and that is located closest to the first intersection, and at the wide angle end, the fifth unit includes the second intersection inside the fifth unit.

It is preferable that the zoom lens according to the above-mentioned aspect is configured to be telecentric on the reduction side.

Assuming that a radius of an effective image circle on the reduction side is Ymax, and a distance on the optical axis from the reduction side image formation plane end to a paraxial exit pupil position at the wide angle in a case where the reduction side is set as an exit side in a state where the magnification side image formation plane is at infinity is exPw, it is preferable that the zoom lens according to the above-mentioned aspect satisfies Conditional Expression (1), which is represented by $$0 < Y\max/|exPw| < 0.1 \qquad (1).$$

It is preferable that in a case where, in the two lens groups of the second unit, a lens group on the magnification side on the optical path is set as a second A lens group and a lens group on the reduction side is set as a second B lens group, the second A lens group has a negative refractive power, and the second B lens group has a positive refractive power. Further, it is preferable that the second B lens group moves to the magnification side and then moves to the reduction side during magnification change from the wide angle end to a telephoto end.

It is preferable that in a case where, in the two lens groups of the second unit, a lens group on the magnification side on the optical path is set as a second A lens group, and a lens group on the reduction side is set as a second B lens group, assuming that a focal length of the second A lens group is f2A, and a focal length of the second B lens group is f2B, it is preferable that the zoom lens according to the above-mentioned aspect satisfies Conditional Expression (2), which is represented by $$-0.5 < f2A/f2B < 0 \qquad (2).$$

It is preferable that the fourth unit consists of, in order from the magnification side to the reduction side along the optical path, a fourth A lens group that has a positive refractive power and a fourth B lens group that has a positive or negative refractive power, and during magnification change, the fourth A lens group and the fourth B lens group move by changing mutual spacing between the lens groups. Assuming that a focal length of the fourth A lens group is f4A, and a focal length of the fourth B lens group is f4B, it is preferable that the zoom lens according to the above-mentioned aspect satisfies Conditional Expression (3), which is represented by $$-2 < f4A/f4B < 1 \qquad (3).$$

Assuming that an average value of Abbe numbers of all positive lenses included in the fourth unit at a d line is ν4pave, it is preferable that the zoom lens according to the above-mentioned aspect satisfies Conditional Expression (4), which is represented by $$60 < \nu 4pave \qquad (4).$$

It is preferable that the intermediate image is located in the fifth unit.

It is preferable that in a case where an optical system closer to the magnification side than the intermediate image is set as a first optical system, and an optical system closer to the reduction side than the intermediate image is set as a second optical system, assuming that a focal length of the first optical system at the wide angle end is fS1w, and a focal length of the zoom lens at the wide angle end is fw, it is preferable that the zoom lens according to the above-mentioned aspect satisfies Conditional Expression (5), which is represented by $$0.8 < fS1w/|fw| \qquad (5).$$

It is preferable that in a case where an optical system closer to the magnification side than the intermediate image is set as a first optical system, and an optical system closer to the reduction side than the intermediate image is set as a second optical system, the first optical system corrects field curvature occurring in the second optical system to reform the intermediate image on the magnification side image formation plane.

It is preferable that the intermediate image is located closer to the reduction side than the second unit, and in a case where an optical system closer to the magnification side than the intermediate image is set as a first optical system, and an optical system closer to the reduction side than the intermediate image is set as a second optical system, assuming that a distance on the optical axis from a lens surface closest to the magnification side in the first optical system to a lens surface closest to the reduction side in the first optical system at the wide angle end is ThS1, and a distance on the optical axis from a lens surface closest to the magnification side in the zoom lens to the lens surface closest to the reduction side in the zoom lens at the wide angle end is ThZL, it is preferable that the zoom lens according to the above-mentioned aspect satisfies Conditional Expression (6), which is represented by $$0.4 < ThS1/ThZL < 0.7 \quad (6).$$

Assuming that an air-equivalent distance on the optical axis from a lens surface of the zoom lens closest to the reduction side to a reduction side focal position of the zoom lens at the wide angle end is Bfw, and a focal length of the zoom lens at the wide angle end is fw, it is preferable that the zoom lens according to the above-mentioned aspect satisfies Conditional Expression (7), which is represented by $$1 < Bfw/|fw| \quad (7).$$

It is preferable that the zoom lens according to the above-mentioned aspect comprises an optical path deflection member that deflects the optical path at a position adjacent to the intermediate image. The optical path deflection member may be configured to deflect the optical path by 90 degrees.

It is preferable that at least one or more lenses of the fourth unit and the fifth unit move during focusing.

According to another aspect of the present disclosure, there is provided a projection type display device comprising: a light valve that outputs an optical image; and the zoom lens according to the above-mentioned aspect, in which the zoom lens projects the optical image, which is output from the light valve, onto a screen.

According to still another aspect of the present disclosure, there is provided an imaging apparatus comprising the zoom lens according to the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a mask, a filter, a cover glass, a plane mirror, and a prism, and mechanism parts such as a lens flange, a lens barrel, an imaging element, and a camera shaking correction mechanism. Further, the "lens group" may include optical elements other than the lens such as a stop, a mask, a filter, a cover glass, a plane mirror, and a prism in addition to the lens.

In the present specification, the terms "group that has a positive refractive power" and "group has a positive refractive power" mean that the group as a whole has a positive refractive power. Similarly, the terms "group that has a negative refractive power" and "group has a negative refractive power" mean that the group as a whole has a negative refractive power. This point is the same even in a case where the term "group" is replaced with the term "unit". The sign of the refractive power of the lens including the aspherical surface is considered in the paraxial region unless otherwise specified. The term "lens group" in the present specification is not limited to a configuration consisting of a plurality of lenses, but may be a configuration consisting of only one lens.

The "focal length" used in a conditional expression is a paraxial focal length. Unless otherwise specified, the "distance on the optical axis" used in Conditional Expression is considered as a geometrical distance. The values used in Conditional Expression are values in a state where the magnification side image formation plane is at infinity and at the d line.

The "d line", "C line", and "F line" described in the present specification are bright lines, the wavelength of the d line is 587.56 nm (nanometers), the wavelength of the C line is 656.27 nm (nanometers), and the wavelength of the F line is 486.13 nm (nanometers).

According to the present disclosure, in a zoom lens that forms an intermediate image, it is possible to provide a zoom lens that has a high magnification and maintains high optical performance by suppressing fluctuation in aberrations during magnification change, a projection type display device comprising the zoom lens, and an imaging apparatus comprising the zoom lens.

BRIEF DESCRIPTION OF THE DRAWINGS

FIG. 2 is a diagram showing a configuration and luminous flux of the zoom lens of Example 1 in each variable magnification state.

FIG. 26 is a diagram showing a configuration and luminous flux of the zoom lens of Example 7 in each variable magnification state.

DESCRIPTION OF THE EMBODIMENTS

Figure 1:
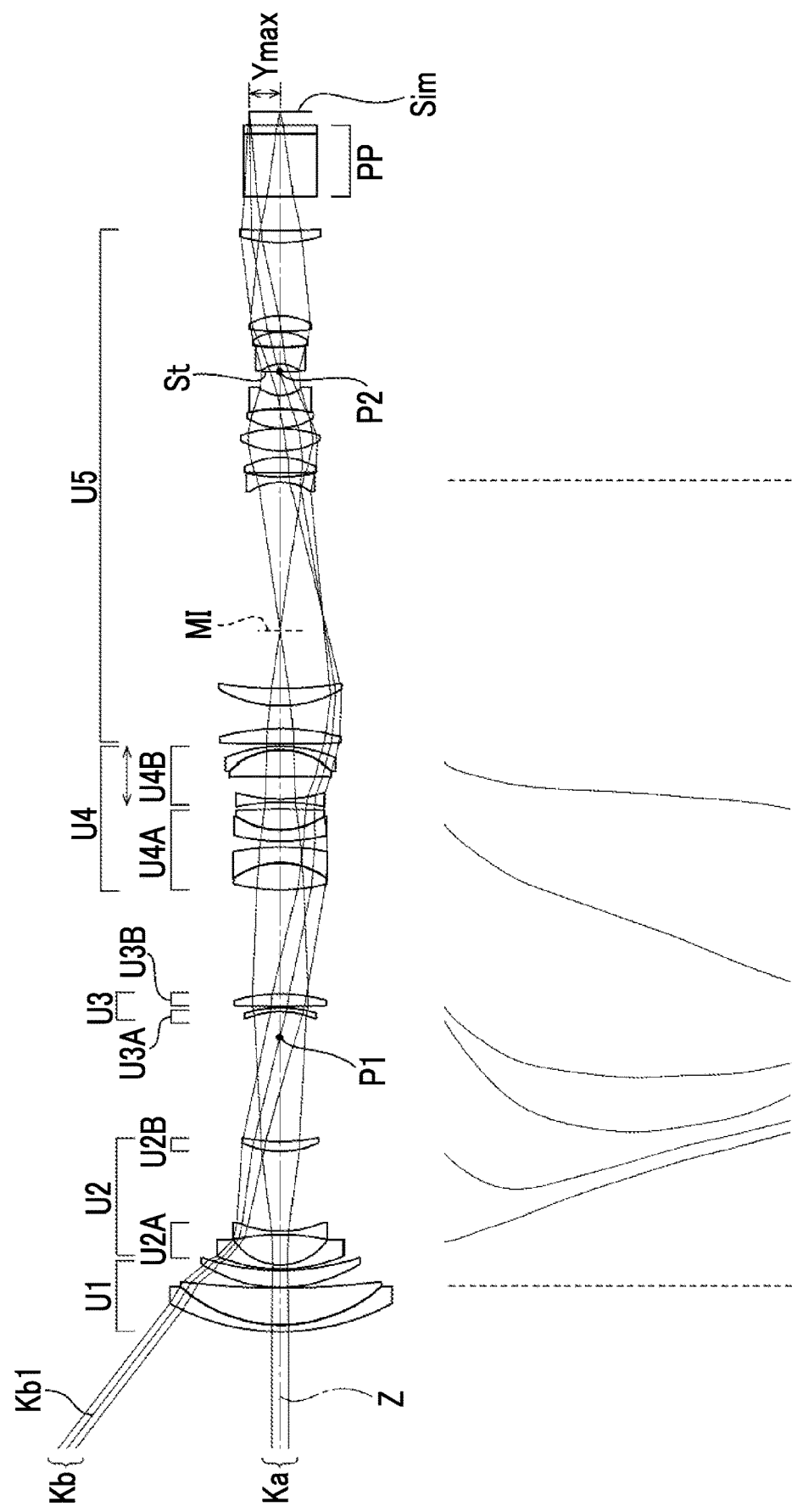
FIG. 1 is a cross-sectional view showing a configuration, luminous flux, and movement loci of a zoom lens according to an embodiment, the zoom lens corresponding to a zoom lens of Example 1.

Hereinafter, embodiments of the present disclosure will be described with reference to the accompanying drawings. FIG. 1 shows a cross-sectional view of a configuration and luminous flux of a zoom lens according to an embodiment of the present disclosure at a wide angle end, and shows movement loci below the cross-sectional view. FIG. 1 shows, as the luminous flux, on-axis luminous flux Ka and luminous flux Kb having a maximum angle of view. FIG. 2 shows a cross-sectional view of the configuration and luminous flux of this zoom lens in each variable magnification state. In FIG. 2, the top part labeled with "WIDE ANGLE END" indicates a wide angle end state, the second part from the top labeled with "FIRST INTERMEDIATE" indicates a first intermediate focal length state, the third part from the top labeled with "SECOND INTERMEDIATE" indicates a second intermediate focal length state, and the lowest part labeled with "TELEPHOTO END" indicates a telephoto end state. The examples shown in FIGS. 1 and 2 correspond to a zoom lens of Example 1 to be described later. In FIG. 1 and FIG. 2, the left side is the magnification side and the right side is the reduction side. Hereinafter, the zoom lens according to the embodiment of the present disclosure will be described mainly with reference to FIG. 1.

The zoom lens of the present disclosure may be a projection optical system that is mounted on a projection type display device and forms an image projected on a screen, or may be an imaging optical system that is mounted on an imaging apparatus and forms an image of an object. Hereinafter, the case of using the zoom lens in the application of the projection optical system will be described.

FIG. 1 shows an example in which an optical member PP and an image display surface Sim of a light valve are disposed on the reduction side of the zoom lens on the assumption that the zoom lens is mounted on the projection type display device. The optical member PP is a member which is regarded as a filter, a cover glass, a color synthesis prism, or the like. The optical member PP has no refractive power, and the optical member PP may be configured to be omitted.

In the projection type display device, luminous flux provided with image information on the image display surface Sim are incident on the zoom lens through the optical member PP, and are projected onto the screen, which is not shown, through the zoom lens. In such a case, the image display surface Sim corresponds to the reduction side image formation plane, and the screen corresponds to the magnification side image formation plane. In the present specification, the terms "screen" means an object on which a projection image formed by the zoom lens is projected. The screen may be not only a dedicated screen but also a wall surface of a room, a floor surface, a ceiling surface, an outer wall surface of a building, or the like.

In the description of the present specification, the term "magnification side" means the screen side on the optical path, and the "reduction side" means the image display surface Sim side on the optical path. In the present specification, the terms "magnification side" and "reduction side" are determined along the optical path, and this point is the same in a case of the zoom lens forming the deflected optical path. In the following description, in order to avoid making the description redundant, the phrase "in order from the magnification side to the reduction side along the optical path" may be described as "in order from the magnification side to the reduction side".

The zoom lens of the present disclosure is configured to form an intermediate image MI at a position conjugate to the reduction side image formation plane and to reform the intermediate image MI on the magnification side image formation plane. In FIG. 1, only a part of the intermediate image MI near the optical axis is simply indicated by a dotted line. The intermediate image MI in FIG. 1 shows a position on the optical axis and does not show an accurate shape. In the following description, among the optical systems constituting the zoom lens, an optical system closer to the magnification side than the intermediate image MI is referred to as a first optical system, and an optical system closer to the reduction side than the intermediate image MI is referred to as a second optical system. In the projection type display device, the second optical system forms an intermediate image MI of an image displayed on the image display surface Sim, and the first optical system projects the intermediate image MI onto the screen to form a projection image. The optical system that forms the intermediate image MI in such a manner has an advantage that a back focal length of the first optical system can be shortened and a lens diameter of the first optical system on the magnification side can be reduced.

It can be considered that the zoom lens of the present disclosure consists of, in order from the magnification side to the reduction side along the optical path, a first unit U1, a second unit U2, a third unit U3, a fourth unit U4, and a fifth unit U5. Each unit is configured as follows.

The first unit U1 consists of one lens group that has a positive refractive power. By disposing the group that has a positive refractive power at a position closest to the magnification side, a teleconverter-like configuration can be included, and there is an advantage in achieving an increase in magnification. The first unit U1 may remain stationary or may be moved during magnification change. In a case where the first unit U1 remains stationary during magnification change, the entire length of the optical system can be made constant even in magnification change. In a case where the first unit U1 moves during magnification change, there is an advantage in suppressing fluctuation in aberrations during magnification change.

In the present specification, a group, in which a spacing between the group and the adjacent group changes in the optical axis direction during magnification change, is set as one lens group. That is, the term "lens group" in the present specification is a component part of the zoom lens, and is a part that is divided by an air spacing that changes during magnification change and that includes at least one lens. During magnification change, each lens group moves or remains stationary, and the mutual spacing between the lenses in each lens group does not change.

The second unit U2 is a unit that has a negative refractive power as a whole at the wide angle end. According to this configuration, the second unit U2 can be responsible for the main function of magnification change. Further, the second unit U2 consists of two lens groups that move by changing their mutual spacing during magnification change. According to these configurations of the second unit U2, it is possible to suppress fluctuation in aberrations during magnification change. In the optical system that forms the intermediate image MI, by configuring the second unit U2 as described above, it is possible to reduce distortion that is a problem on the wide angle side while reducing the lens diameter on the magnification side, and it is possible to reduce the change in distortion caused by the magnification change. In the following description, in the above-mentioned two lens groups constituting the second unit U2, the lens group on the magnification side on the optical path is referred to as the second A lens group U2A, and the lens group on the reduction side is referred to as the second B lens group U2B.

In FIG. 1, two intersections are shown as intersections between the optical axis Z and the principal ray Kb 1 having the maximum angle of view at the wide angle end. In the two intersections, the intersection on the magnification side on the optical path is set as a first intersection P1, and the intersection on the reduction side is set as a second intersection P2. The third unit U3 is configured as a unit including a lens group that has a positive refractive power and that is located closest to the first intersection P1 at the wide angle end. The term "closest" as used herein means that positions are closest on the optical path in the arrangement order, and does not mean that the positions are closest in terms of distance. Further, in a case where there is a lens group including the first intersection P1, the lens group is set as the lens group located closest to the first intersection P1.

The third unit U3 is configured to include one or more lens groups that move during magnification change. In addition to the above-mentioned configuration of the second unit U2, by including one or more lens groups in which the third unit U3 moves during magnification change, it is possible to contribute to suppression of fluctuation in aberrations during magnification change. All the lens groups included in the third unit U3 may be configured to move during magnification change. Further, the third unit U3 may be configured to have a positive refractive power as a whole at the wide angle end. In such a case, the negative refractive power of the second unit U2 can be increased. Therefore, there is an advantage in achieving an increase in magnification while suppressing the increase in size of the lens system.

The fourth unit U4 is configured to include one or more lens groups that move during magnification change. According to this configuration of the fourth unit U4, the fourth unit U4 can also have a magnification change action in addition to the magnification change action of the second unit U2. Therefore, it is possible to further achieve an increase in magnification. Further, it is easy to ensure the telecentricity in the entire magnification change range. All the lens groups included in the fourth unit U4 may be configured to move during magnification change.

The fifth unit U5 is configured as a unit including a second intersection P2 therein at the wide angle end. The fifth unit U5 may be configured to consist of one lens group or may be configured to consist of a plurality of lens groups. In a case where the fifth unit U5 consists of one lens group, the fifth unit U5 may be configured to remain stationary during magnification change. In a case where the fifth unit U5 consists of a plurality of lens groups, the lens group closest to the reduction side in the fifth unit U5 may be configured to remain stationary during magnification change. Since the lens group closest to the reduction side remains stationary during magnification change, it is easy to maintain the telecentricity on the reduction side.

For example, in the example of FIG. 1, each unit is configured as follows. The first unit U1 consists of one lens group. The second unit U2 consists of two lens groups including a second A lens group U2A and a second B lens group U2B, in order from the magnification side to the reduction side. The third unit U3 consists of two lens groups including a third A lens group U3A and a third B lens group U3B, in order from the magnification side to the reduction side. The fourth unit U4 consists of two lens groups including a fourth A lens group U4A and a fourth B lens group U4B, in order from the magnification side to the reduction side. The fifth unit U5 consists of one lens group.

In the example of FIG. 1, the intermediate image MI is located inside the fifth unit U5. Further, in the example of FIG. 1, at the wide angle end, the lens group that has a positive refractive power and that is located closest to the first intersection P1 is the third B lens group U3B, and the second intersection P2 is located inside the fifth unit U5. A position of the second intersection P2 coincides with a position of the aperture stop St. The aperture stop St in FIG. 1 does not indicate a shape and a size, but indicates the position in the optical axis direction.

In the example of FIG. 1, during magnification change, the first unit U1 and the fifth unit U5 remain stationary, and the second A lens group U2A, the second B lens group U2B, the third A lens group U3A, the third B lens group U3B, the fourth A lens group U4A, and the fourth B lens group U4B move along the optical axis Z by changing a spacing between the adjacent lens groups. In FIG. 1, the linear dotted line is drawn below the lens group remaining stationary during magnification change, and the solid line indicates the movement locus under the lens group moving during magnification change, during magnification change from the wide angle end to the telephoto end.

Hereinafter, more preferable and possible configurations of the zoom lens of the present disclosure will be described. In the following description, the term "zoom lens of the present disclosure" is also simply referred to as a "zoom lens" in order to avoid redundant description.

It is preferable that the zoom lens is configured to be telecentric on the reduction side. For example, a projection type display device that projects a high-definition image mostly employs a so-called three-plate system in which an image display element corresponding to each wavelength of blue, green, or red is provided. In order to support such a method, it is preferable that the zoom lens is configured to be telecentric on the reduction side.

In addition, the above-mentioned phrase "configured to be telecentric on the reduction side" includes an error that is practically allowed in the technical field to which the technique of the present disclosure belongs. The error may be, for example, ±3 degrees. In a system that does not include the aperture stop St, in a case where the luminous flux is viewed in the direction from the magnification side to the reduction side, the telecentricity may be determined by using, as a substitute for the principal ray, the bisector line of the maximum ray on the upper side and the maximum ray on the lower side in the cross section of the luminous flux focused on a point on the reduction side image formation plane.

It is preferable that the zoom lens satisfies Conditional Expression (1). Here, it is assumed that a radius of an effective image circle on the reduction side is Ymax. It is assumed that a distance on the optical axis from the reduction side image formation plane to a paraxial exit pupil position at the wide angle end in a case where the reduction side is set as an exit side in a state where the magnification side image formation plane is at infinity is exPw. For example, FIG. 1 shows the radius Ymax of the effective image circle. The effective image circle is a so-called image circle. In calculating exPw, it is assumed that an air-equivalent distance is used for an optical member having no refractive power. Regarding the lower limit of Conditional Expression (1), Ymax>0 and |exPw|>0. Thus, 0<Ymax/|exPw|. By not allowing the corresponding value of Conditional Expression (1) to be equal to or greater than the upper limit thereof, it is easy to ensure the telecentricity while obtaining a desired size of the effective image circle.

$$0<Ymax/|exPw|<0.1 \tag{1}$$

It is preferable that the second A lens group U2A has a negative refractive power and the second B lens group U2B has a positive refractive power. In such a case, the second A lens group U2A is able to appropriately perform the magnification change action, and the second B lens group U2B is able to perform the action of correcting the aberration caused by the magnification change. Thus, there is an advantage in achieving an increase in magnification.

Assuming that a focal length of the second A lens group U2A is f2A and a focal length of the second B lens group U2B is f2B, it is preferable that the zoom lens satisfies Conditional Expression (2). By not allowing the corresponding value of Conditional Expression (2) to be equal to or less than the lower limit thereof, the refractive power of the second A lens group U2A with respect to the refractive power of the second B lens group U2B is prevented from being excessively weakened. As a result, there is an advantage in achieving an increase in magnification without increasing the size of the entire lens system. By not allowing the corresponding value of Conditional Expression (2) to be equal to or greater than the upper limit thereof, the refractive power of the second unit U2 is prevented from becoming excessively strong. As a result, there is an advantage in suppressing fluctuation in aberrations during magnification change. In order to obtain more favorable characteristics, it is more preferable that the zoom lens satisfies Conditional Expression (2-1).

$$-0.5<f2A/f2B<0 \tag{2}$$

$$-0.3<f2A/f2B<0 \tag{2-1}$$

The second B lens group U2B may be configured to move to the magnification side and then to the reduction side during magnification change from the wide angle end to the telephoto end. In such a case, the moving stroke of the second A lens group U2A during magnification change can be obtained. Thereby, there is an advantage in achieving an increase in magnification, and it is also possible to suppress fluctuation in aberrations during magnification change, and in particular, fluctuation in distortion on the wide angle side during magnification change.

It is preferable that the fourth unit U4 consists of a fourth A lens group U4A that has a positive refractive power and a fourth B lens group U4B that has a positive or negative refractive power in order from the magnification side to the reduction side along the optical path. In this configuration, it is preferable that the fourth A lens group U4A and the fourth B lens group U4B move by changing the mutual spacing during magnification change. By adopting the configurations, the fourth A lens group U4A is able to perform the magnification change action, and the fourth B lens group U4B is able to perform the action of correcting the aberrations caused by the magnification change. As a result, there is an advantage in achieving an increase in magnification. Further, it is easy to ensure the telecentricity in the entire magnification change range.

In a configuration in which the fourth unit U4 consists of the fourth A lens group U4A and the fourth B lens group U4B, assuming that a focal length of the fourth A lens group U4A is f4A and a focal length of the fourth B lens group U4B is f4B, it is preferable that the zoom lens satisfies Conditional Expression (3). By not allowing the corresponding value of Conditional Expression (3) to be equal to or less than the lower limit thereof, the negative refractive power of the fourth B lens group U4B with respect to the refractive power of the fourth A lens group U4A is prevented from becoming excessively strong. By not allowing the corresponding value of Conditional Expression (3) to be equal to or greater than the upper limit thereof, the positive refractive power of the fourth B lens group U4B with respect to the refractive power of the fourth A lens group U4A is prevented from becoming excessively strong. By satisfying Conditional Expression (3), there is an advantage in suppressing fluctuation in aberrations during magnification change and there is an advantage in ensuring telecentricity. In order to obtain more favorable characteristics, it is more preferable that the zoom lens satisfies Conditional Expression (3-1).

$$-2 < f4A/f4B < 1 \tag{3}$$

$$-1.5 < f4A/f4B < 0.8 \tag{3-1}$$

Assuming that an average value of Abbe numbers of all the positive lenses included in the fourth unit U4 at the d line is v4pave, it is preferable that the zoom lens satisfies Conditional Expression (4). By not allowing the corresponding value of Conditional Expression (4) to be equal to or less than the lower limit thereof, it is easy to correct longitudinal chromatic aberration. It is more preferable that the zoom lens satisfies Conditional Expression (4-1). By not allowing the corresponding value of Conditional Expression (4-1) to be equal to or less than the lower limit thereof, it is easier to correct longitudinal chromatic aberration. By not allowing the corresponding value of Conditional Expression (4-1) to be equal to or greater than the upper limit thereof, there is an advantage in reducing the cost of the lens.

$$60 < v4pave \tag{4}$$

$$65 < v4pave < 90 \tag{4-1}$$

It is preferable that the first optical system corrects field curvature occurring in the second optical system to reform the intermediate image MI on the magnification side image formation plane. By forming the optical system that corrects field curvature occurring at the position of the intermediate image MI, there is an advantage in achieving reduction in size and achieving an increase in magnification of the entire lens system.

Assuming that a focal length of the first optical system at the wide angle end is fS1w and a focal length of the zoom lens at the wide angle end is fw, it is preferable that the zoom lens satisfies Conditional Expression (5). By not allowing the corresponding value of Conditional Expression (5) to be equal to or less than the lower limit thereof, the F number of the first optical system is prevented from being excessively reduced. As a result, there is an advantage in correcting spherical aberration and astigmatism. It is more preferable that the zoom lens satisfies Conditional Expression (5-1). By not allowing the corresponding value of Conditional Expression (5-1) to be equal to or less than the lower limit thereof, the above-mentioned effect relating to the lower limit of Conditional Expression (5) can be further enhanced. By not allowing the corresponding value of Conditional Expression (5-1) to be equal to or greater than the upper limit thereof, the relay magnification in forming the intermediate image MI at a position conjugate to the reduction side image formation plane is prevented from becoming excessively large. Therefore, the size of the intermediate image MI can be suppressed. Therefore, it is possible to suppress an increase in size of the first optical system, and there is an advantage in correcting distortion and field curvature in the first optical system.

$$0.8 < fS1w/|fw| \tag{5}$$

$$1 < fS1w/|fw| < 2 \tag{5-1}$$

In a case where the intermediate image MI is located closer to the reduction side than the second unit U2, it is preferable that the zoom lens satisfies Conditional Expression (6). Here, it is assumed that a distance on the optical axis from the lens surface closest to the magnification side in the first optical system to the lens surface closest to the reduction side in the first optical system at the wide angle end is ThS1. Further, it is assumed that a distance on the optical axis from the lens surface closest to the magnification side in the zoom lens to the lens surface closest to the reduction side in the zoom lens at the wide angle end is ThZL. By not allowing the corresponding value of Conditional Expression (6) to be equal to or less than the lower limit thereof, the total length of the first optical system having a large magnification change action is prevented from being excessively shortened. As a result, there is an advantage in achieving an increase in magnification. By not allowing the corresponding value of Conditional Expression (6) to be equal to or greater than the upper limit thereof, it is possible to suppress an increase in total length of the first optical system. Therefore, the total length of the second optical system is prevented from being excessively shortened. As a result, it is possible to suppress excessive aberrations such as field curvature and distortion that occur in the second optical system. Therefore, these aberrations that occur in the second optical system are corrected by the first optical system. As a result, there is an advantage in obtaining a favorable image on the magnification side image formation plane. In order to obtain more favorable characteristics, it is more preferable that the zoom lens satisfies Conditional Expression (6-1).

$$0.4 < ThS1/ThZL < 0.7 \tag{6}$$

$$0.5 < ThS1/ThZL < 0.65 \tag{6-1}$$

It is preferable that the intermediate image MI is located in the fifth unit U5. In such a case, since the intermediate image MI can be formed at a position relatively close to the second intersection P2, the size of the intermediate image MI can be suppressed. Therefore, it is possible to suppress an increase in size of the first optical system, and there is an advantage in correcting distortion and field curvature in the first optical system.

Assuming an air-equivalent distance on the optical axis from a lens surface closest to the reduction side in the zoom lens at the wide angle end to a reduction side focal position of the zoom lens is Bfw and a focal length of the zoom lens at the wide angle end is fw, it is preferable that the zoom lens satisfies Conditional Expression (7). Bfw is a back focal length of the zoom lens at the wide angle end in terms of air-equivalent distance. By not allowing the corresponding value of Conditional Expression (7) to be equal to or less than the lower limit thereof, the back focal length is prevented from being excessively shortened, and thus it is easy to dispose a color synthesis prism or the like. It is more preferable that the zoom lens satisfies Conditional Expression (7-1). By not allowing the corresponding value of Conditional Expression (7-1) to be equal to or less than the lower limit thereof, the above-mentioned effect relating to the lower limit of Conditional Expression (7) can be further enhanced. By not allowing the corresponding value of Conditional Expression (7-1) to be equal to or greater than the upper limit thereof, it is possible to suppress an increase in size of the entire optical system including the back focal length.

$$1 < Bfw/|fw| \tag{7}$$

$$1.3 < Bfw/|fw| < 4 \tag{7-1}$$

The zoom lens may be configured to include an optical path deflection member that deflects an optical path at a position adjacent to the intermediate image MI. Here, the phrase "including an optical path deflection member that deflects an optical path at a position adjacent to the intermediate image MI" means that there is no member, such as a lens, having a refractive power in the optical path between the intermediate image MI and the deflection member. A relatively wide air spacing can be ensured at a position adjacent to the intermediate image MI, it is easy to dispose the optical path deflection member. By providing the optical path deflection member, it is possible to contribute to the reduction in size of the entire lens system. As the optical path deflection member, for example, a member having a reflective surface such as a mirror can be used.

The deflection angle at which the optical path of the optical path deflection member is deflected can be arbitrarily set, but may be set to, for example, 90 degrees. By setting the deflection angle to 90 degrees, it is possible to form a structure that is easy to produce. It should be noted that the term "90 degrees" includes an error that is practically allowed in the technical field to which the technique of the present disclosure belongs. The error may be, for example, ±5 degrees.

It is preferable that the zoom lens has a focusing function. For example, during focusing, at least one or more lenses of the fourth unit U4 and the fifth unit U5 may be configured to move. Since the lens group that moves during focusing can be configured to be small by performing focusing on the relatively reduction side in such a manner, there are advantages in achieving reduction in load on the drive system, reduction in size of the device, and an increase in speed of focusing. Hereinafter, a lens group which moves during focusing is referred to as a focus group. In the example of FIG. 1, the focus group consists of the fourth B lens group U4B. The horizontal double arrow on the fourth B lens group U4B in FIG. 1 indicates that the focus group is the fourth B lens group U4B.

The example shown in FIG. 1 is an example, and various modifications can be made without departing from the scope of the technique according to the embodiment of the present disclosure. For example, according to the technique of the present disclosure, the number of lens groups included in the third unit U3, the fourth unit U4, and the fifth unit U5 may be different from the number of the example of FIG. 1. Further, according to the technique of the present disclosure, the number of lenses included in each lens group may be different from the number of lenses in the example of FIG. 1.

The above-mentioned preferred configurations and available configurations including the configurations relating to Conditional Expressions may be any combination, and it is preferable to appropriately and selectively adopt the configurations in accordance with required specification. It should be noted that the conditional expressions that the zoom lens of the present disclosure preferably satisfies are not limited to the conditional expressions described in the form of the expression, and the lower limit and the upper limit are selected from the preferable and more preferable conditional expressions. The conditional expressions may include all conditional expressions obtained through optional combinations.

Next, examples of the zoom lens of the present disclosure will be described, with reference to the drawings. The reference numerals attached to the units and lens groups in the cross-sectional views of each example are used independently for each example in order to avoid complication of description and drawings caused by an increase in number of digits of the reference numerals. Therefore, even in a case where common reference numerals are attached in the drawings of different examples, components do not necessarily have a common configuration.

Example 1

FIG. 1 is a cross-sectional view of a configuration of a zoom lens and luminous flux of Example 1, and an illustration method and a configuration thereof are as described above. Therefore, some description is not repeated herein. The zoom lens of Example 1 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of a third A lens group U3A that has a negative refractive power and a third B lens group U3B that has a positive refractive power, in order from the magnification side to the reduction side. The fourth unit U4 consists of a fourth A lens group U4A that has a positive refractive power and a fourth B lens group U4B that has a negative refractive power, in order from the magnification side to the reduction side. The fifth unit U5 consists of one lens group. The zoom lens of Example 1 consists of eight lens groups.

During magnification change, the lens group of the first unit U1 and the lens group of the fifth unit U5 remain stationary, and the other lens groups move along the optical axis Z by changing the spacing between the adjacent groups. The focus group consists of the fourth B lens group U4B.

The intermediate image MI is located inside the fifth unit U5. The first optical system has a positive refractive power as a whole, and the second optical system has a positive refractive power as a whole, at the wide angle end and the telephoto end.

Regarding the zoom lens of Example 1, Tables 1A and 1B show basic lens data, Table 2 shows specifications, and Table 3 shows variable surface spacings. Here, the basic lens data is shown to be divided into two tables, Table 1A and Table 1B, in order to avoid lengthening of one table. Table 1A shows the first optical system, and Table 1B shows the second optical system and the optical member PP.

The table of basic lens data will be described as follows. The column of Sn shows surface numbers in a case where the surface closest to the magnification side is the first surface and the number is increased one by one toward the reduction side. The column of R shows a curvature radius of each surface. The column of D shows a surface spacing between each surface and the surface adjacent to the reduction side on the optical axis. The column of Nd shows a refractive index of each component at the d line. The column of vd shows an Abbe number of each component based on the d line.

In the table of basic lens data, the sign of the curvature radius of the convex surface facing toward the magnification side is positive and the sign of the curvature radius of the convex surface facing toward the reduction side is negative. In Table 1B, in a cell of a surface number of a surface corresponding to the aperture stop St, the surface number and a term of (St) are noted. A value at the bottom cell of D in Table 1B indicates a spacing between the image display surface Sim and the surface closest to the reduction side in the table. In the table of basic lens data, the symbol DD[ ] is used for each variable surface spacing during zooming, and the magnification side surface number of the distance is given in [ ] and is noted in the column of D.

Table 2 shows the zoom magnification Zr, the absolute value of the focal length |f|, and the F number FNo., and the maximum total angle of view 2ω are shown on the basis of the d line. [°] in the cells of 2ω indicates that the unit thereof is a degree. The values shown in Tables 1 and 2 are values in a state where the projection distance is infinite. In the examples of the present disclosure, the state where the projection distance is infinite is synonymous with the state where the magnification side image formation plane is at infinity. In Table 2, the values in the wide angle end state, the first intermediate focal length state, the second intermediate focal length state, and the telephoto end state are respectively shown in the columns of the "wide angle end", the "first intermediate", the "second intermediate", and "telephoto end". This point is the same as in Table 3 to be described later.

Table 3 shows the variable surface spacings in the variable magnification states. In Table 3, a table labeled with "Infinity" shows a value in a state where the projection distance is infinite, and a table labeled with "Projection magnification 150 times" shows a value in a state where the projection magnification is 150 times.

In the data of each table, degrees are used as a unit of an angle, and millimeters (mm) are used as a unit of a length, but appropriate different units may be used since the optical system can be used even in a case where the system is enlarged or reduced in proportion. Further, each of the following tables shows numerical values rounded off to predetermined decimal places.

TABLE 1A

Example 1

| Sn | R | D | Nd | vd |
|---|---|---|---|---|
| 1 | 90.8443 | 2.5010 | 1.84666 | 23.78 |
| 2 | 58.3790 | 13.5107 | 1.62041 | 60.29 |
| 3 | 310.3939 | 0.1992 | | |
| 4 | 56.3099 | 6.1254 | 1.83481 | 42.74 |
| 5 | 96.5706 | DD[5] | | |
| 6 | 62.1487 | 1.4998 | 1.87070 | 40.73 |
| 7 | 21.6764 | 11.0763 | | |
| 8 | −88.8769 | 1.2008 | 1.83481 | 42.74 |
| 9 | 42.4301 | DD[9] | | |
| 10 | 36.7887 | 3.4426 | 1.72825 | 28.46 |
| 11 | 72.2324 | DD[11] | | |
| 12 | −34.5957 | 1.4089 | 1.84666 | 23.78 |
| 13 | −47.0788 | DD[13] | | |
| 14 | 464.6296 | 4.5316 | 1.89286 | 20.36 |
| 15 | −65.4161 | DD[15] | | |
| 16 | 70.8723 | 9.7271 | 1.53775 | 74.70 |
| 17 | −30.5656 | 5.8361 | 1.59270 | 35.31 |
| 18 | −93.4641 | 2.2115 | | |
| 19 | 76.1116 | 4.0849 | 1.77250 | 49.60 |
| 20 | 30.2214 | 7.5604 | 1.49700 | 81.61 |
| 21 | −302.4634 | DD[21] | | |
| 22 | −84.4346 | 1.2074 | 1.84666 | 23.78 |
| 23 | 64.0036 | 8.0800 | | |
| 24 | −1176.5539 | 9.4477 | 1.55200 | 70.70 |
| 25 | −28.5714 | 1.2991 | 1.84666 | 23.78 |
| 26 | −54.5486 | DD[26] | | |
| 27 | 502.6944 | 5.4179 | 1.72916 | 54.68 |
| 28 | −90.9850 | 8.3621 | | |
| 29 | 47.7223 | 6.2928 | 1.77250 | 49.60 |
| 30 | 146.0599 | 75.0000 | | |

TABLE 1B

Example 1

| Sn | R | D | Nd | vd |
|---|---|---|---|---|
| 31 | −21.3449 | 2.0294 | 1.67270 | 32.10 |
| 32 | 63.6065 | 1.5091 | | |
| 33 | 903.8451 | 5.4793 | 1.83481 | 42.74 |
| 34 | −28.5932 | 2.4693 | | |
| 35 | 32.2535 | 8.0913 | 1.52841 | 76.45 |
| 36 | −45.4614 | 0.2001 | | |
| 37 | 22.6494 | 6.8503 | 1.55200 | 70.70 |
| 38 | −62.0696 | 0.1851 | | |
| 39 | −54.1317 | 4.8353 | 1.51742 | 52.43 |
| 40 | 12.3120 | 8.6262 | | |
| 41(St) | ∞ | 2.7763 | | |
| 42 | 11.8190 | 6.1855 | 1.79360 | 37.09 |
| 43 | 78.5462 | 0.1000 | | |
| 44 | 88.2007 | 5.5235 | 1.49700 | 81.61 |
| 45 | −18.3411 | 0.2006 | | |
| 46 | 92.5215 | 5.6425 | 1.49700 | 81.61 |
| 47 | −24.0873 | 26.4631 | | |
| 48 | 52.7100 | 4.4331 | 1.89190 | 37.13 |
| 49 | 274.2597 | 12.3400 | | |
| 50 | ∞ | 23.0000 | 1.51633 | 64.14 |
| 51 | ∞ | 3.0000 | 1.48749 | 70.44 |
| 52 | ∞ | 5.0299 | | |

TABLE 2

Example 1

| | Wide angle end | First intermediate | Second intermediate | Telephoto end |
|---|---|---|---|---|
| Zr | 1.0 | 1.9 | 4.0 | 7.0 |
| |f| | 14.55 | 28.08 | 58.20 | 101.86 |
| FNo. | 2.30 | 2.30 | 2.30 | 2.30 |
| 2ω[°] | 77.4 | 45.0 | 22.6 | 13.0 |

TABLE 3

| | Wide angle end | First intermediate | Second intermediate | Telephoto end |
|---|---|---|---|---|
| | Example 1 Infinity | | | |
| DD[5] | 0.50 | 15.45 | 31.05 | 40.81 |
| DD[9] | 29.03 | 3.85 | 1.66 | 0.77 |
| DD[11] | 47.41 | 20.23 | 5.62 | 7.94 |
| DD[13] | 0.50 | 14.54 | 14.00 | 7.32 |
| DD[15] | 37.81 | 34.60 | 19.13 | 0.50 |
| DD[21] | 2.50 | 19.38 | 33.61 | 43.47 |
| DD[26] | 0.80 | 10.50 | 13.48 | 17.75 |
| | Example 1 Projection magnification 150 times | | | |
| DD[5] | 0.50 | 15.45 | 31.05 | 40.81 |
| DD[9] | 29.03 | 3.85 | 1.66 | 0.77 |
| DD[11] | 47.41 | 20.23 | 5.62 | 7.94 |
| DD[13] | 0.50 | 14.54 | 14.00 | 7.32 |
| DD[15] | 37.81 | 34.60 | 19.13 | 0.50 |
| DD[21] | 2.68 | 19.69 | 34.24 | 44.52 |
| DD[26] | 0.62 | 10.18 | 12.86 | 16.71 |

Figure 3:
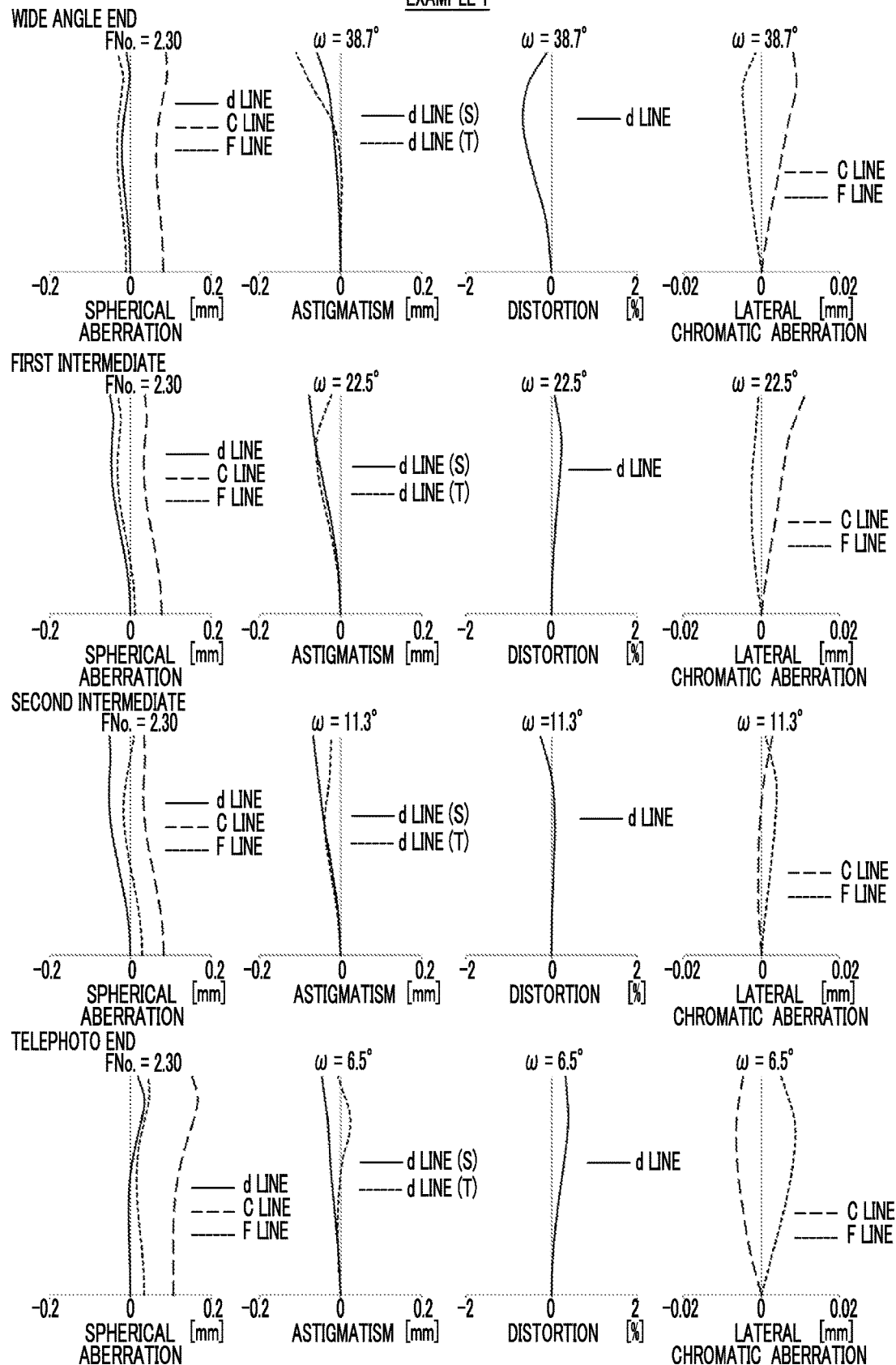
FIG. 3 is a diagram of aberrations of the zoom lens of Example 1 in a state where a projection distance is infinite.

FIG. 3 shows a diagram of aberrations of the zoom lens of Example 1 in a state where the projection distance is infinite. FIG. 3 shows aberration diagrams at the wide angle end in the top part labeled with "WIDE ANGLE END", shows aberration diagrams in the first intermediate focal length state in the second part labeled with "FIRST INTERMEDIATE" from the top, shows aberration diagrams in the second intermediate focal length state in the third part labeled "SECOND INTERMEDIATE" from the top, and shows aberration diagrams at the telephoto end in the lowest part labeled "TELEPHOTO END". FIG. 3 shows, in order from the left, spherical aberration, astigmatism, distortion, and lateral chromatic aberration. In the spherical aberration diagram, aberrations at the d line, C line, and F line are indicated by the solid line, the long broken line, and the short broken line, respectively. In the astigmatism diagram, the aberration at the d line in the sagittal direction is indicated by a solid line, and the aberration at the d line in the tangential direction is indicated by the short broken line. In the distortion diagram, aberration at the d line is indicated by the solid line. In the lateral chromatic aberration diagram, aberrations at the C line and the F line are indicated by the long broken line and the short broken line, respectively. In the spherical aberration diagram, the value of the F number is shown after "FNo.=". In other aberration diagrams, the value of the maximum half angle of view is shown after "ω=".

Figure 4:
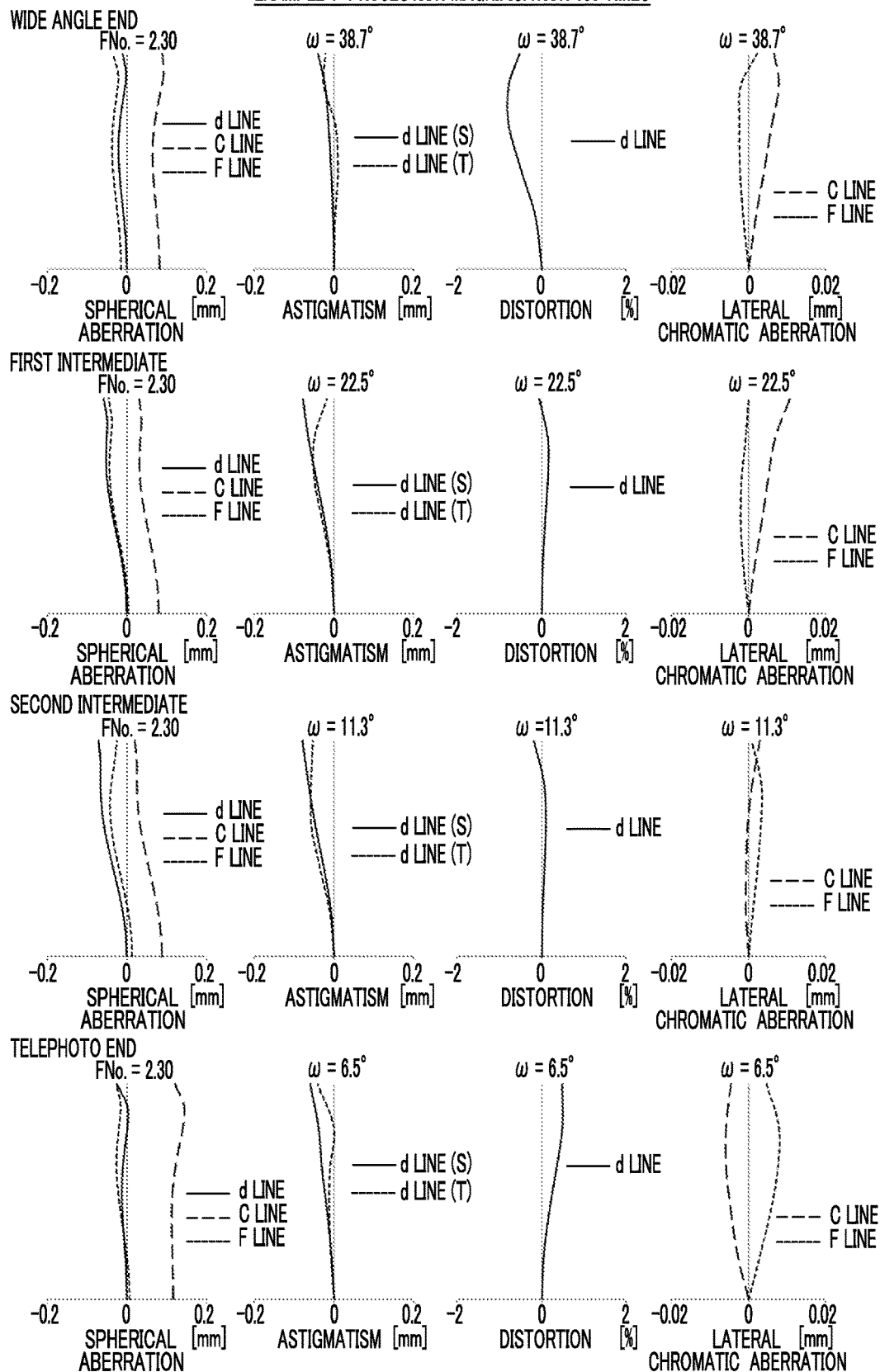
FIG. 4 is a diagram of aberrations of the zoom lens of Example 1 in a state where a projection magnification is 150 times.

FIG. 4 shows a diagram of aberrations of the zoom lens of Example 1 in a state where the projection magnification is 150 times. The illustration method of FIG. 4 is the same as that of FIG. 3. In the data of FIG. 4, the projection distances at the wide angle end, in the first intermediate focal length state, in the second intermediate focal length state, and at the telephoto end are respectively 2.1 meters (m), 4.1 meters (m), 8.6 meters (m), and 15.1 meters (m). The projection distance is a distance on the optical axis from the lens surface closest to the magnification side to the magnification side image formation plane.

Figure 5:
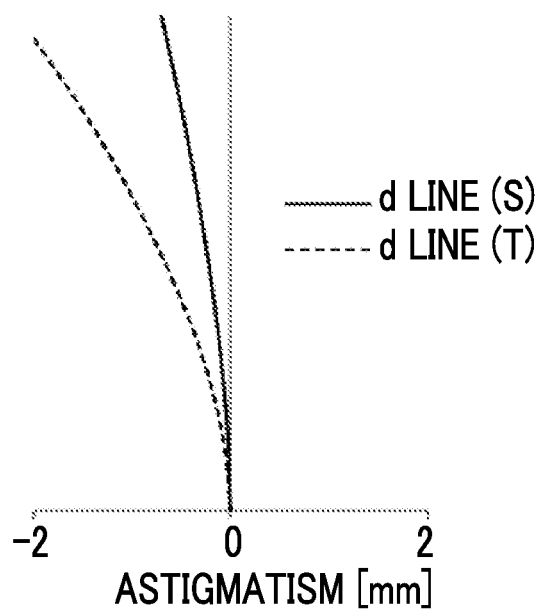
FIG. 5 is an astigmatism diagram of a second optical system of the zoom lens of Example 1.

FIG. 5 shows only an astigmatism diagram of the second optical system of Example 1. FIG. 5 is an astigmatism diagram on the image plane on the reduction side in a case where a distance on the optical axis from the lens surface closest to the magnification side in the second optical system to the paraxial image position of the intermediate image MI is set as an object distance. The upper end of the graph of FIG. 5 corresponds to the maximum half angle of view. In FIG. 5, the astigmatism is large, but the astigmatism in FIGS. 3 and 4 is extremely smaller than that in FIG. 5. For this reason, in the first optical system of the zoom lens of Example 1, it would appear that field curvature occurring in the second optical system is satisfactorily corrected to reform the intermediate image MI on the magnification side image formation plane.

Figure 6:
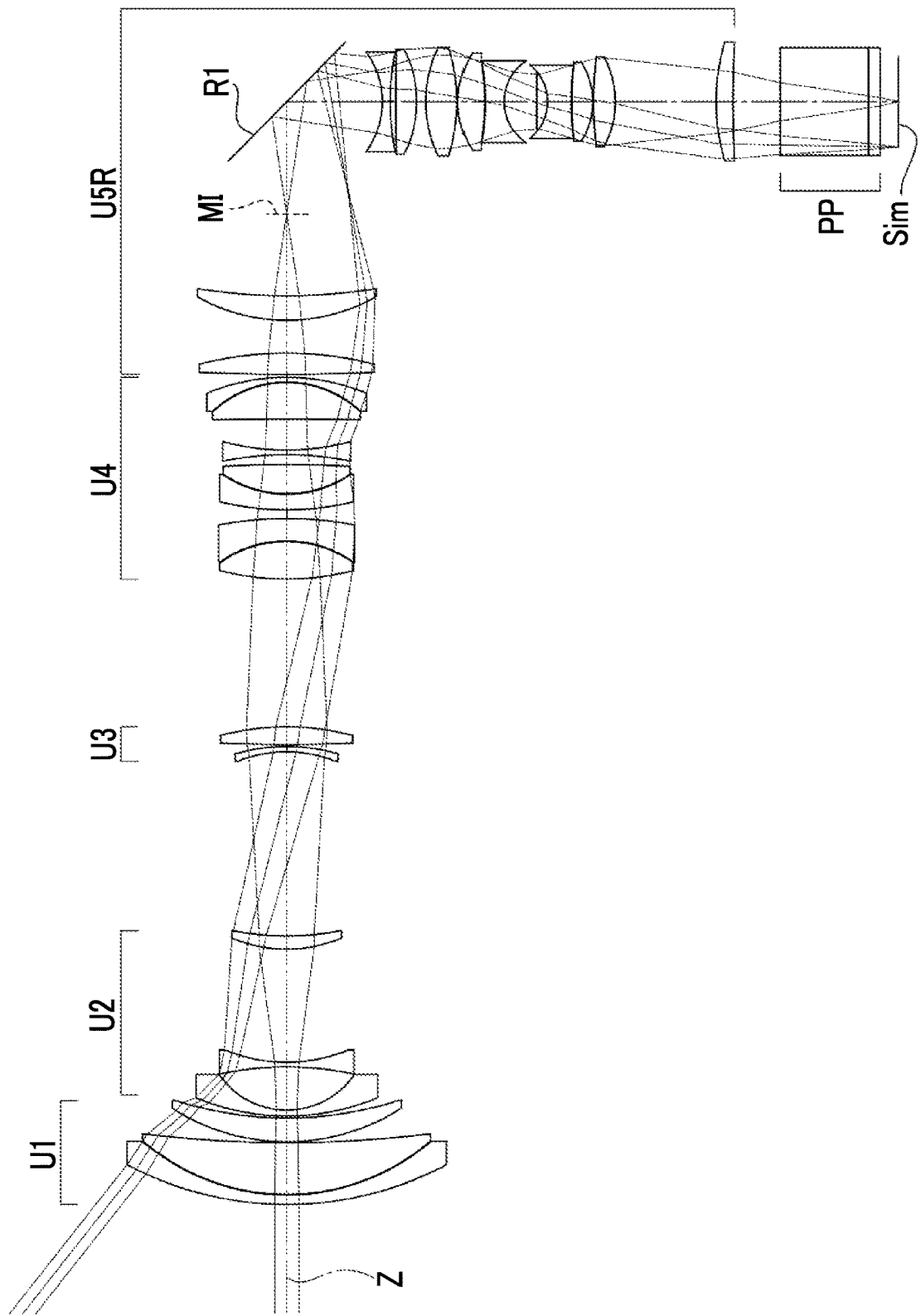
FIG. 6 is a cross-sectional view showing a configuration and luminous flux of a zoom lens according to a modification example of Example 1.

FIG. 6 shows a configuration and luminous flux of a zoom lens according to a modification example of Example 1 at the wide angle end. The zoom lens of FIG. 6 consists of a first unit U1, a second unit U2, a third unit U3, a fourth unit U4, and a fifth unit U5R, in order from the magnification side to the reduction side along the optical path. The fifth unit U5R is different from the fifth unit U5 of the zoom lens of Example 1 in that the mirror R1 which is an optical path deflection member is included at a position adjacent to the intermediate image MI and the optical path is deflected by the mirror R1. Other configurations of the zoom lens of FIG. 6 are the same as those of the zoom lens of Example 1. By deflecting the optical path, a compact configuration is possible.

Symbols, meanings, description methods, and illustration methods of the respective data pieces according to Example 1 and the modification example are basically similar to those in the following examples unless otherwise specified. Therefore, in the following description, repeated description will not be given.

Example 2

Figure 7:
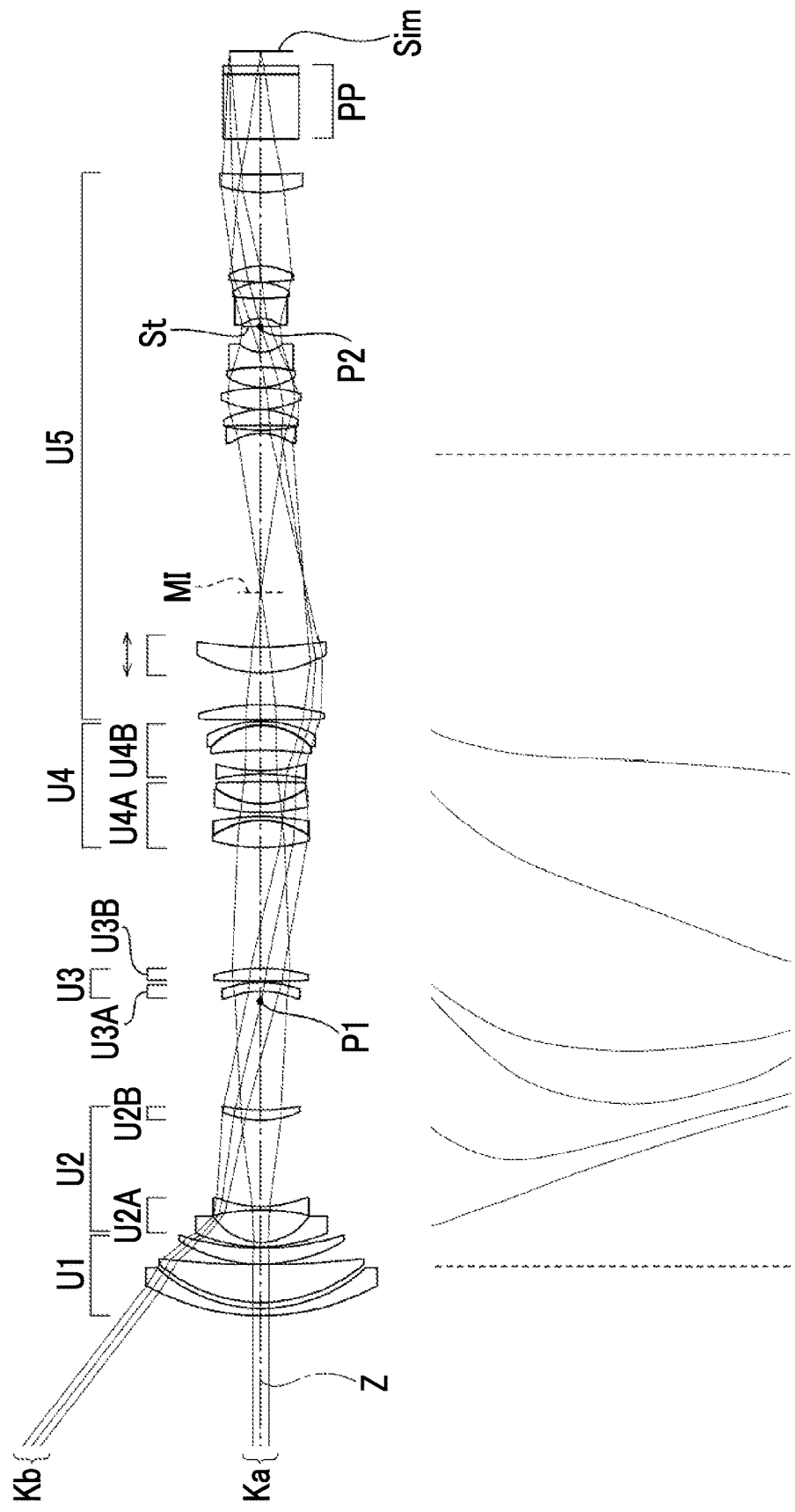
FIG. 7 is a cross-sectional view showing a configuration, luminous flux, and movement loci of a zoom lens of Example 2.

FIG. 7 shows a cross-sectional view of a configuration and luminous flux of the zoom lens of Example 2. The zoom lens of Example 2 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of a third A lens group U3A that has a negative refractive power and a third B lens group U3B that has a positive refractive power, in order from the magnification side to the reduction side. The fourth unit U4 consists of a fourth A lens group U4A that has a positive refractive power and a fourth B lens group U4B that has a negative refractive power, in order from the magnification side to the reduction side. The fifth unit U5 consists of one lens group. The zoom lens of Example 2 consists of eight lens groups.

During magnification change, the lens group of the first unit U1 and the lens group of the fifth unit U5 remain stationary, and the other lens groups move along the optical axis Z by changing the spacing between the adjacent groups. The focus group consists of one lens as a lens which is second from the magnification side of the fifth unit U5.

The intermediate image MI is located inside the fifth unit U5. The first optical system has a positive refractive power as a whole, and the second optical system has a positive refractive power as a whole, at the wide angle end and the telephoto end.

Figure 8:
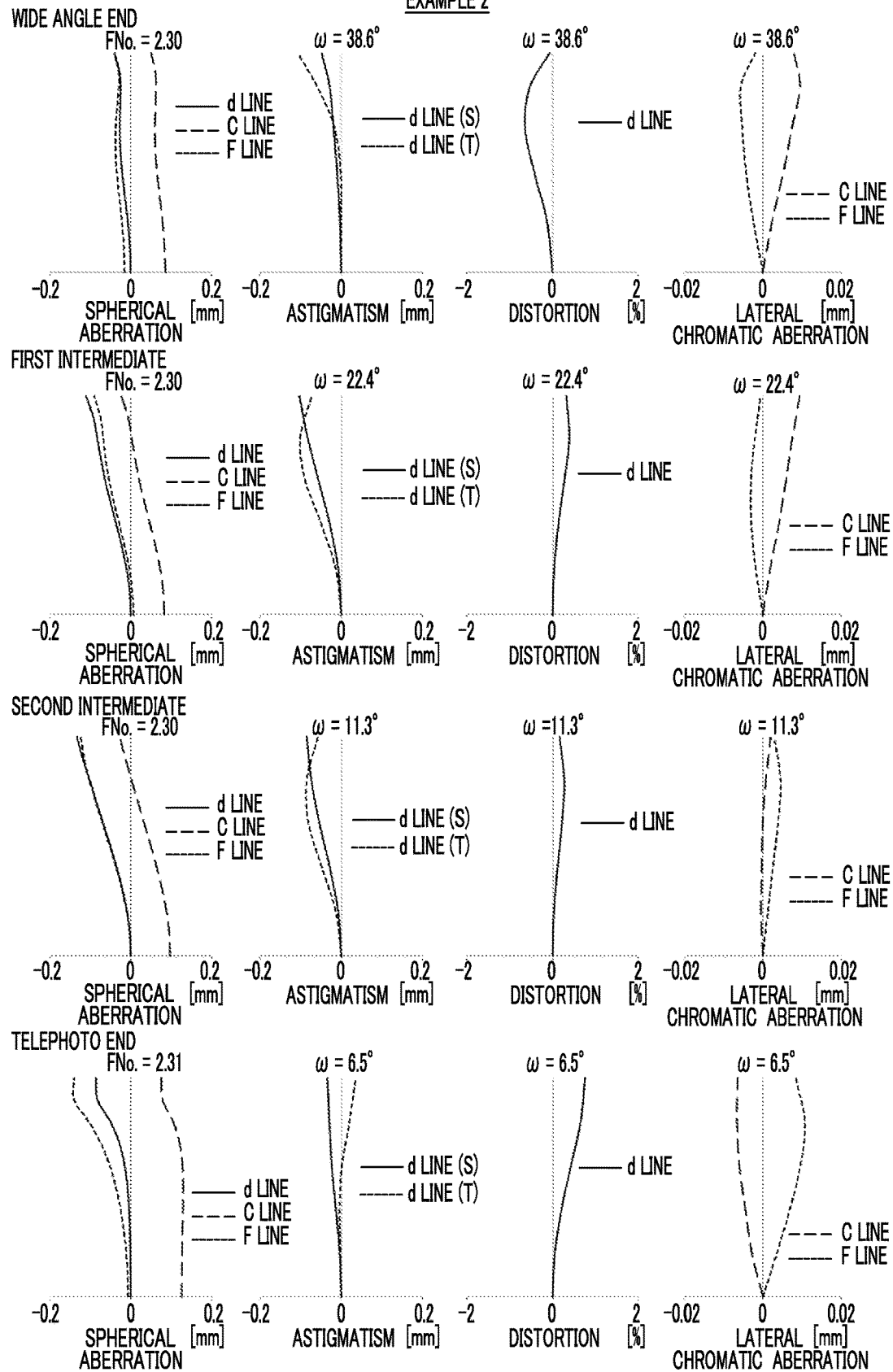
FIG. 8 is a diagram of aberrations of the zoom lens of Example 2 in a state where the projection distance is infinite.
Figure 9:
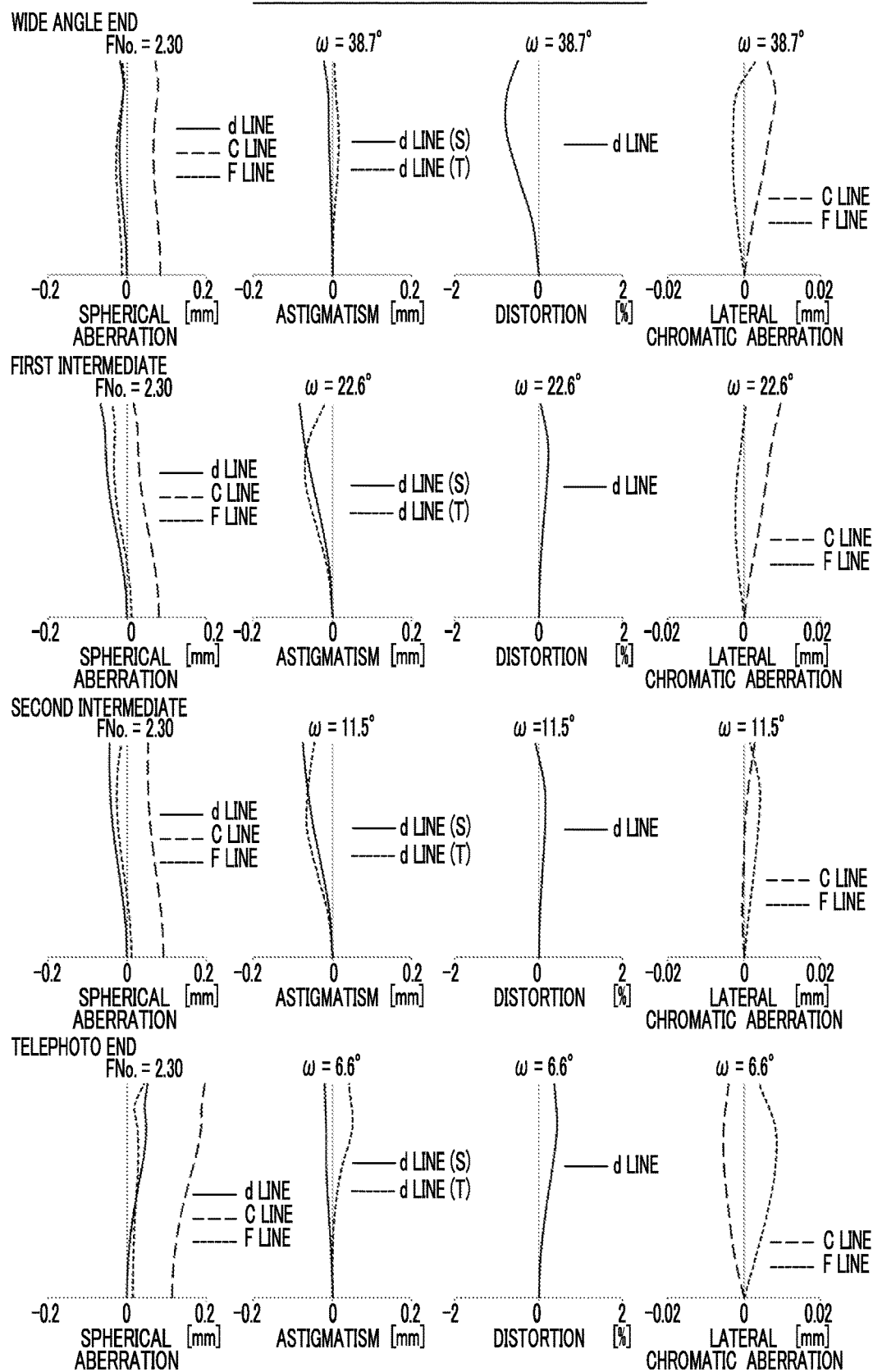
FIG. 9 is a diagram of aberrations of the zoom lens of Example 2 in a state where the projection magnification is 150 times.

Regarding the zoom lens of Example 2, Tables 4A and 4B show basic lens data, Table 5 shows specifications, and Table 6 shows variable surface spacings. Further, FIG. 8 shows a diagram of aberrations in a state where the projection distance is infinite, and FIG. 9 shows a diagram of aberrations in a state where the projection magnification is 150 times. In the data of FIG. 9, the projection distances at the wide angle end, in the first intermediate focal length state, in the second intermediate focal length state, and at the telephoto end are respectively 2.1 meters (m), 4.1 meters (m), 8.5 meters (m), and 14.7 meters (m).

TABLE 4A

| | Example 2 | | | |
|---|---|---|---|---|
| Sn | R | D | Nd | vd |
| 1 | 89.4540 | 2.5000 | 1.84666 | 23.78 |
| 2 | 57.5464 | 2.0758 | | |
| 3 | 58.1548 | 13.2383 | 1.62041 | 60.29 |
| 4 | 320.1033 | 0.1992 | | |
| 5 | 58.7512 | 5.6356 | 1.83481 | 42.74 |
| 6 | 101.4727 | DD[6] | | |
| 7 | 62.7378 | 1.5007 | 1.83481 | 42.74 |
| 8 | 21.5537 | 11.3110 | | |
| 9 | −83.3731 | 1.2007 | 1.83481 | 42.74 |
| 10 | 44.2474 | DD[10] | | |
| 11 | 35.0326 | 3.5843 | 1.67300 | 38.26 |
| 12 | 71.3220 | DD[12] | | |
| 13 | −33.2022 | 3.0772 | 1.85478 | 24.80 |
| 14 | −44.6414 | DD[14] | | |
| 15 | 600.0355 | 4.3830 | 1.89286 | 20.36 |
| 16 | −67.9116 | DD[16] | | |
| 17 | 66.9181 | 9.4419 | 1.53775 | 74.70 |
| 18 | −32.1288 | 0.0706 | | |
| 19 | −31.8542 | 1.2991 | 1.58144 | 40.75 |
| 20 | −96.7015 | 1.4751 | | |
| 21 | 73.2122 | 3.0129 | 1.77250 | 49.60 |
| 22 | 28.2086 | 0.1008 | | |
| 23 | 27.9759 | 7.6150 | 1.49700 | 81.61 |
| 24 | −428.4209 | DD[24] | | |
| 25 | −84.2644 | 1.2000 | 1.84666 | 23.78 |

TABLE 4A-continued

Example 2

| Sn | R | D | Nd | νd |
|---|---|---|---|---|
| 26 | 65.5661 | 6.7436 | | |
| 27 | −140.5200 | 8.6768 | 1.55200 | 70.70 |
| 28 | −25.5364 | 0.2001 | | |
| 29 | −25.8088 | 1.2991 | 1.84666 | 23.78 |
| 30 | −43.3481 | DD[30] | | |
| 31 | 855.1341 | 5.2435 | 1.77250 | 49.60 |
| 32 | −86.6999 | 11.1950 | | |
| 33 | 45.4873 | 9.0009 | 1.72916 | 54.68 |
| 34 | 129.1709 | 74.9991 | | |

TABLE 4B

Example 2

| Sn | R | D | Nd | νd |
|---|---|---|---|---|
| 35 | −21.5847 | 1.2003 | 1.64769 | 33.79 |
| 36 | 74.4005 | 1.7301 | | |
| 37 | −324.5500 | 5.3729 | 1.83481 | 42.74 |
| 38 | −28.4232 | 0.2001 | | |
| 39 | 33.4416 | 7.7450 | 1.52841 | 76.45 |
| 40 | −47.5825 | 0.2001 | | |
| 41 | 23.3837 | 6.9310 | 1.59522 | 67.73 |
| 42 | −63.9069 | 0.1443 | | |
| 43 | −57.6917 | 5.2268 | 1.51742 | 52.43 |
| 44 | 12.7469 | 9.0426 | | |
| 45(St) | ∞ | 2.7387 | | |
| 46 | −12.1556 | 6.9942 | 1.80100 | 34.97 |
| 47 | 77.8571 | 0.1005 | | |
| 48 | 87.1522 | 5.4537 | 1.49700 | 81.61 |
| 49 | −19.3490 | 0.2478 | | |
| 50 | 95.0400 | 5.6136 | 1.49700 | 81.61 |
| 51 | −24.8003 | 25.7657 | | |
| 52 | 50.9276 | 6.2213 | 1.86700 | 36.23 |
| 53 | 256.8013 | 12.3400 | | |
| 54 | ∞ | 23.0000 | 1.51633 | 64.14 |
| 55 | ∞ | 3.0000 | 1.48749 | 70.44 |
| 56 | ∞ | 5.0281 | | |

TABLE 5

Example 2

| | Wide angle end | First intermediate | Second intermediate | Telephoto end |
|---|---|---|---|---|
| Zr | 1.0 | 1.9 | 4.0 | 7.0 |
| \|f\| | 14.59 | 28.16 | 58.36 | 102.13 |
| FNo. | 2.30 | 2.30 | 2.30 | 2.31 |
| 2ω[°] | 77.2 | 44.8 | 22.6 | 13.0 |

TABLE 6

| | Wide angle end | First intermediate | Second intermediate | Telephoto end |
|---|---|---|---|---|
| Example 2 Infinity | | | | |
| DD[6] | 0.50 | 15.39 | 31.37 | 41.93 |
| DD[10] | 30.41 | 5.71 | 1.92 | 0.51 |
| DD[12] | 41.67 | 19.03 | 4.87 | 9.06 |
| DD[14] | 0.50 | 11.77 | 12.55 | 5.21 |
| DD[16] | 42.57 | 35.79 | 19.59 | 0.50 |
| DD[24] | 2.77 | 21.40 | 36.64 | 46.50 |
| DD[30] | 0.50 | 9.82 | 11.98 | 15.20 |
| Example 2 Projection magnification 150 times | | | | |
| DD[6] | 0.50 | 15.39 | 31.37 | 41.93 |
| DD[10] | 30.41 | 5.71 | 1.92 | 0.51 |
| DD[12] | 41.67 | 19.03 | 4.87 | 9.06 |
| DD[14] | 0.50 | 11.77 | 12.55 | 5.21 |
| DD[16] | 42.57 | 35.79 | 19.59 | 0.50 |
| DD[24] | 2.77 | 21.40 | 36.64 | 46.50 |
| DD[30] | 0.50 | 9.82 | 11.98 | 15.20 |
| DD[32] | 10.88 | 10.59 | 9.95 | 9.04 |
| DD[34] | 75.32 | 75.61 | 76.25 | 77.16 |

Figure 10:
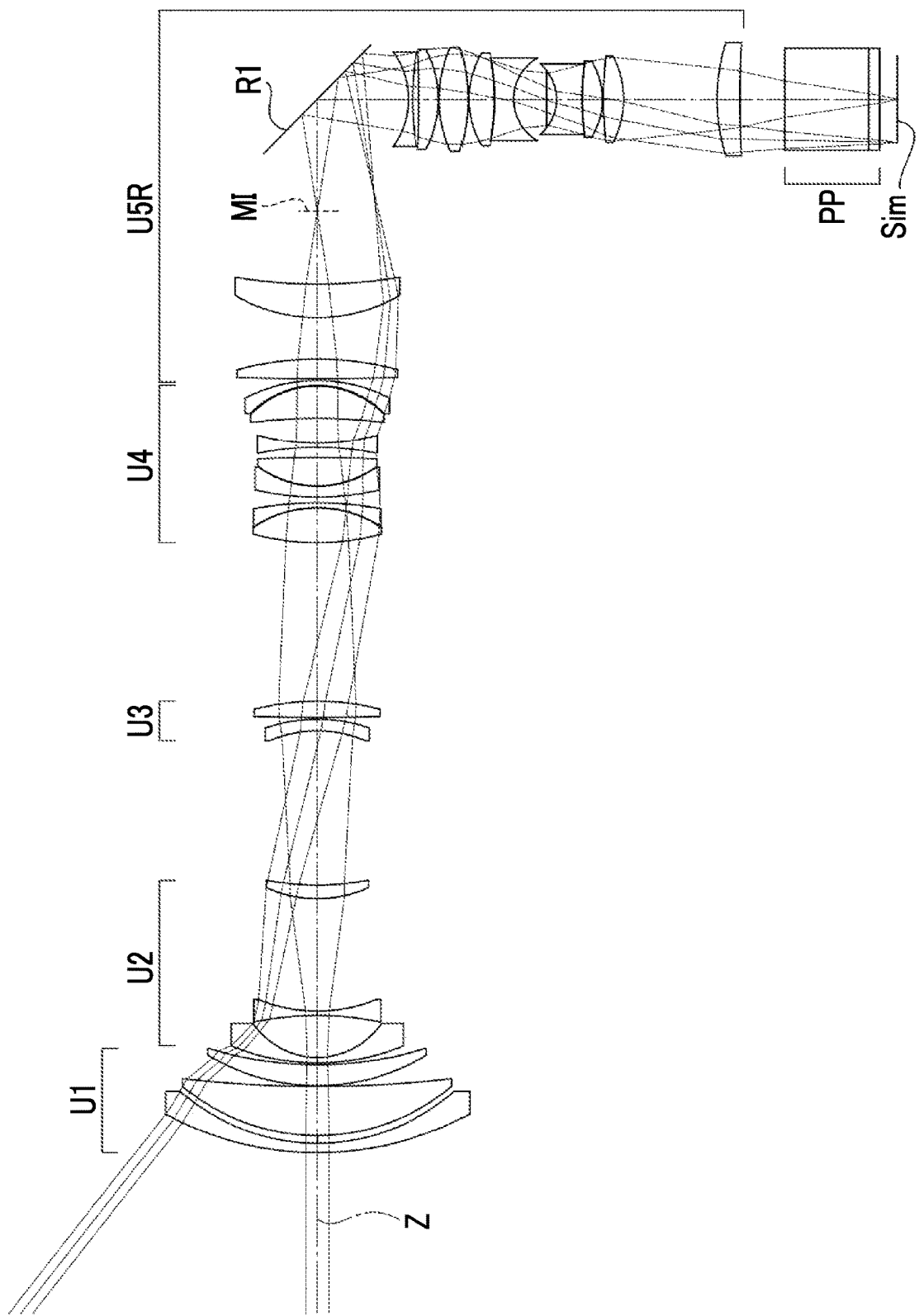
FIG. 10 is a cross-sectional view showing a configuration and luminous flux of a zoom lens according to a modification example of Example 2.

FIG. 10 shows a configuration and luminous flux at the wide angle end of the zoom lens according to the modification example of Example 2. The zoom lens of FIG. 10 consists of a first unit U1, a second unit U2, a third unit U3, a fourth unit U4, and a fifth unit U5R, in order from the magnification side to the reduction side along an optical path. The fifth unit U5R is different from the fifth unit U5 of the zoom lens of Example 2 in that the fifth unit U5R includes the mirror R1 as an optical path deflection member at a position adjacent to the intermediate image MI and the mirror R1 deflects the optical path. Other configurations of the zoom lens of FIG. 10 are the same as those of the zoom lens of Example 2. By deflecting the optical path, a compact configuration is possible.

Example 3

Figure 11:
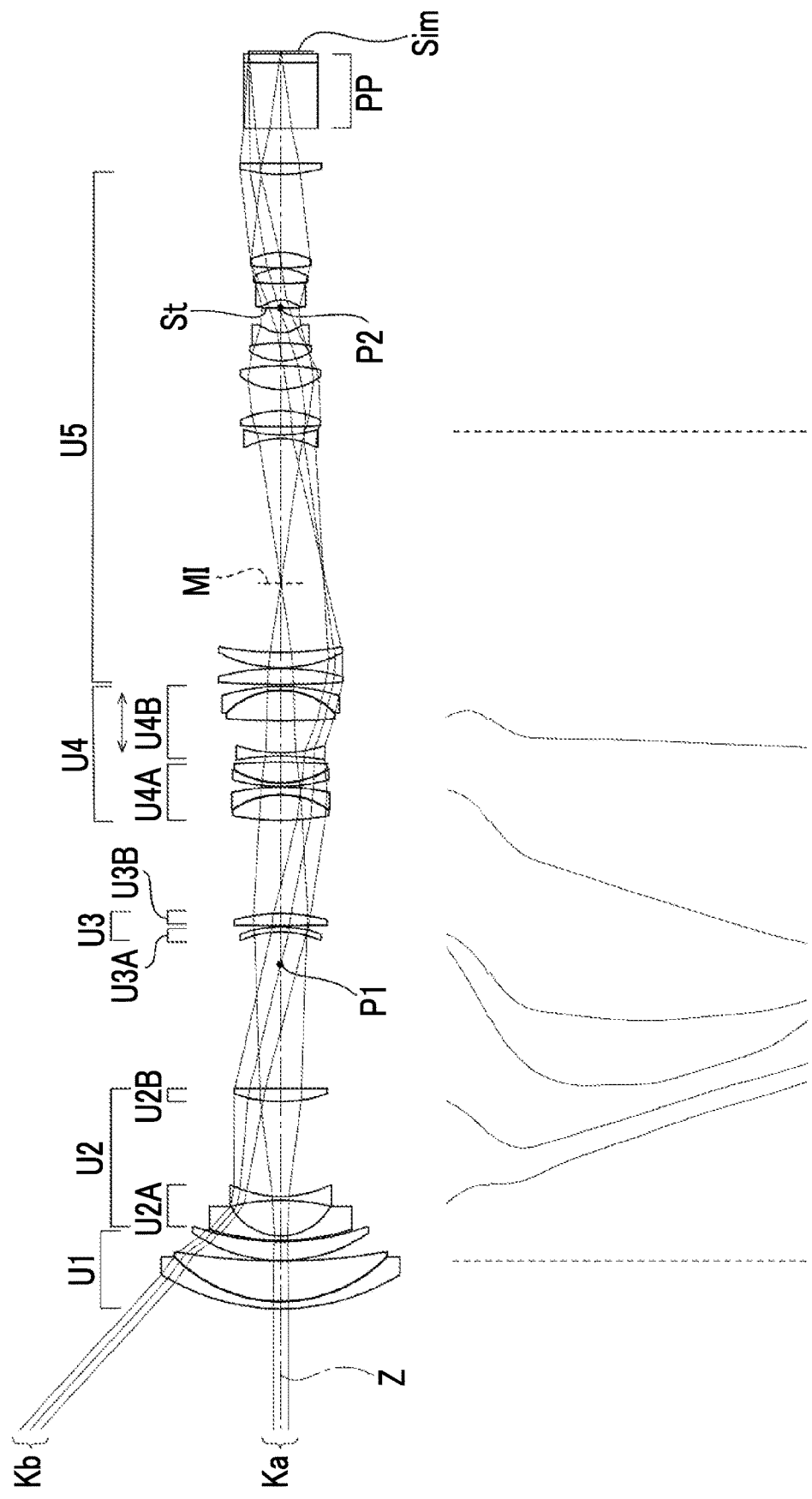
FIG. 11 is a cross-sectional view showing a configuration, luminous flux, and movement loci of a zoom lens of Example 3.

FIG. 11 shows a cross-sectional view of a configuration and luminous flux of the zoom lens of Example 3. The zoom lens of Example 3 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of a third A lens group U3A that has a negative refractive power and a third B lens group U3B that has a positive refractive power, in order from the magnification side to the reduction side. The fourth unit U4 consists of a fourth A lens group U4A that has a positive refractive power and a fourth B lens group U4B that has a negative refractive power, in order from the magnification side to the reduction side. The fifth unit U5 consists of one lens group. The zoom lens of Example 3 consists of eight lens groups.

During magnification change, the lens group of the first unit U1 and the lens group of the fifth unit U5 remain stationary, and the other lens groups move along the optical axis Z by changing the spacing between the adjacent groups. The focus group consists of the fourth B lens group U4B.

The intermediate image MI is located inside the fifth unit U5. The first optical system has a positive refractive power as a whole, and the second optical system has a positive refractive power as a whole, at the wide angle end and the telephoto end.

Regarding the zoom lens of Example 3, Tables 7A and 7B show basic lens data, Table 8 shows specifications, Table 9 shows variable surface spacings, and Table 10 shows aspherical coefficients thereof.

In basic lens data, a reference sign * is attached to surface numbers of aspherical surfaces, and numerical values of the paraxial curvature radius are written into the column of the curvature radius of the aspherical surface. In Table 10, the row of Sn shows surface numbers of the aspherical surfaces, and the rows of KA and Am (m=3, 4, 5, 6, 7, and 8) show numerical values of the aspherical coefficients for each aspherical surface. The "E±n" (n: an integer) in numerical values of the aspherical coefficients of Table 10 indicates "×10$^{±n}$". KA and Am are the aspherical coefficients in the aspherical surface expression represented by the following expression.

$$Zd=C \times h^2/\{1+(1-KA \times c^2 \times h^2)^{1/2}\}+\Sigma Am \times h^m$$

Here,

Zd is an aspherical surface depth (a length of a perpendicular from a point on an aspherical surface at height h to a plane that is perpendicular to the optical axis Z and that is in contact with the vertex of the aspherical surface), h is a height (a distance from the optical axis Z to the lens surface), C is a reciprocal of the paraxial curvature radius, KA and Am are aspherical coefficients, and Σ in the aspherical surface expression means the sum with respect to m.

TABLE 7A

Example 3

| Sn | R | D | Nd | vd |
|---|---|---|---|---|
| 1 | 85.2585 | 2.5000 | 1.84666 | 23.78 |
| 2 | 56.0347 | 14.1242 | 1.61800 | 63.33 |
| 3 | 223.5799 | 0.2000 | | |
| 4 | 58.0583 | 6.5610 | 1.83481 | 42.74 |
| 5 | 96.3039 | DD[5] | | |
| 6 | 90.9179 | 1.5009 | 1.87070 | 40.73 |
| 7 | 21.2937 | 12.5459 | | |
| *8 | −73.5026 | 1.2000 | 1.76450 | 49.10 |
| *9 | 38.1789 | DD[9] | | |
| 10 | 54.4854 | 4.5480 | 1.74400 | 44.79 |
| 11 | 1699.4154 | DD[11] | | |
| 12 | −37.2267 | 1.7663 | 1.84666 | 23.78 |
| 13 | −43.3484 | DD[13] | | |
| 14 | 1432.0173 | 4.1617 | 1.80809 | 22.76 |
| 15 | −69.1587 | DD[15] | | |
| 16 | 96.2804 | 8.9228 | 1.53775 | 74.70 |
| 17 | −31.3615 | 2.6363 | 1.58144 | 40.75 |
| 18 | −84.8862 | 0.1991 | | |
| 19 | 68.2174 | 1.2007 | 1.77250 | 49.60 |
| 20 | 33.4208 | 7.2758 | 1.49700 | 81.61 |
| 21 | −258.5836 | DD[21] | | |
| 22 | −103.8693 | 1.2006 | 1.84666 | 23.78 |
| 23 | 51.6471 | 11.2368 | | |
| 24 | 275.7723 | 10.6465 | 1.61800 | 63.33 |
| 25 | −28.5714 | 1.3006 | 1.84666 | 23.78 |
| 26 | −72.9126 | DD[26] | | |
| 27 | 375.4225 | 5.5753 | 1.72916 | 54.68 |
| 28 | −90.2535 | 0.1999 | | |
| 29 | 50.7825 | 5.3357 | 1.75500 | 52.32 |
| 30 | 126.7048 | 74.9991 | | |

TABLE 7B

Example 3

| Sn | R | D | Nd | vd |
|---|---|---|---|---|
| 31 | −27.9442 | 1.2004 | 1.53172 | 48.84 |
| 32 | 50.2263 | 2.8158 | | |
| 33 | 322.8223 | 5.6397 | 1.83481 | 42.72 |
| 34 | −34.0694 | 7.6376 | | |
| 35 | 26.4833 | 7.9177 | 1.52841 | 76.45 |
| 36 | −76.2622 | 1.7225 | | |
| 37 | 21.0715 | 6.1411 | 1.52841 | 76.45 |
| 38 | −67.5506 | 0.1535 | | |

TABLE 7B-continued

Example 3

| Sn | R | D | Nd | vd |
|---|---|---|---|---|
| 39 | −58.3464 | 3.5576 | 1.60342 | 38.03 |
| 40 | 12.3943 | 8.5676 | | |
| 41(St) | ∞ | 2.7373 | | |
| 42 | −11.6662 | 5.7551 | 1.74950 | 35.33 |
| 43 | 80.5280 | 0.1010 | | |
| 44 | 91.6762 | 5.2326 | 1.53775 | 74.70 |
| 45 | −18.3033 | 0.2007 | | |
| 46 | 72.5344 | 5.3813 | 1.49700 | 81.61 |
| 47 | −26.7393 | 27.2503 | | |
| 48 | 58.8989 | 3.9002 | 1.85896 | 22.73 |
| 49 | 2380.3219 | 12.3400 | | |
| 50 | ∞ | 23.0000 | 1.51633 | 64.14 |
| 51 | ∞ | 3.0000 | 1.48749 | 70.44 |
| 52 | ∞ | 1.0179 | | |

TABLE 8

Example 3

| | Wide angle end | First intermediate | Second intermediate | Telephoto end |
|---|---|---|---|---|
| Zr | 1.0 | 1.9 | 4.0 | 7.0 |
| \|f\| | 12.43 | 23.98 | 49.70 | 86.98 |
| FNo. | 2.30 | 2.30 | 2.30 | 2.30 |
| 2ω[°] | 86.4 | 51.8 | 26.6 | 15.2 |

TABLE 9

| | Wide angle end | First intermediate | Second intermediate | Telephoto end |
|---|---|---|---|---|
| | Example 3 Infinity | | | |
| DD[5] | 0.50 | 16.06 | 33.49 | 45.11 |
| DD[9] | 33.08 | 4.61 | 2.71 | 2.12 |
| DD[11] | 54.68 | 17.14 | 7.28 | 13.93 |
| DD[13] | 0.50 | 21.40 | 14.97 | 3.47 |
| DD[15] | 32.82 | 32.75 | 17.30 | 0.50 |
| DD[21] | 2.09 | 24.00 | 38.64 | 47.62 |
| DD[26] | 0.73 | 8.44 | 10.00 | 11.63 |
| | Example 3 Projection magnification 150 times | | | |
| DD[5] | 0.50 | 16.06 | 33.49 | 45.11 |
| DD[9] | 33.08 | 4.61 | 2.71 | 2.12 |
| DD[11] | 54.68 | 17.14 | 7.28 | 13.93 |
| DD[13] | 0.50 | 21.40 | 14.97 | 3.47 |
| DD[15] | 32.82 | 32.75 | 17.30 | 0.50 |
| DD[21] | 2.23 | 24.24 | 39.12 | 48.46 |
| DD[26] | 0.59 | 8.13 | 9.52 | 10.81 |

TABLE 10

Example 3

| Sn | 8 | 9 |
|---|---|---|
| KA | 1.000000E+00 | 1.000000E+00 |
| A3 | 0.000000E+00 | 0.000000E+00 |
| A4 | 5.450003E−06 | 7.376274E−08 |
| A5 | 4.392814E−08 | −3.007235E−07 |
| A6 | −4.684611E−08 | −1.359937E−08 |
| A7 | 2.098899E−09 | 2.403723E−10 |
| A8 | −2.552139E−11 | 1.760659E−11 |

Figure 12:
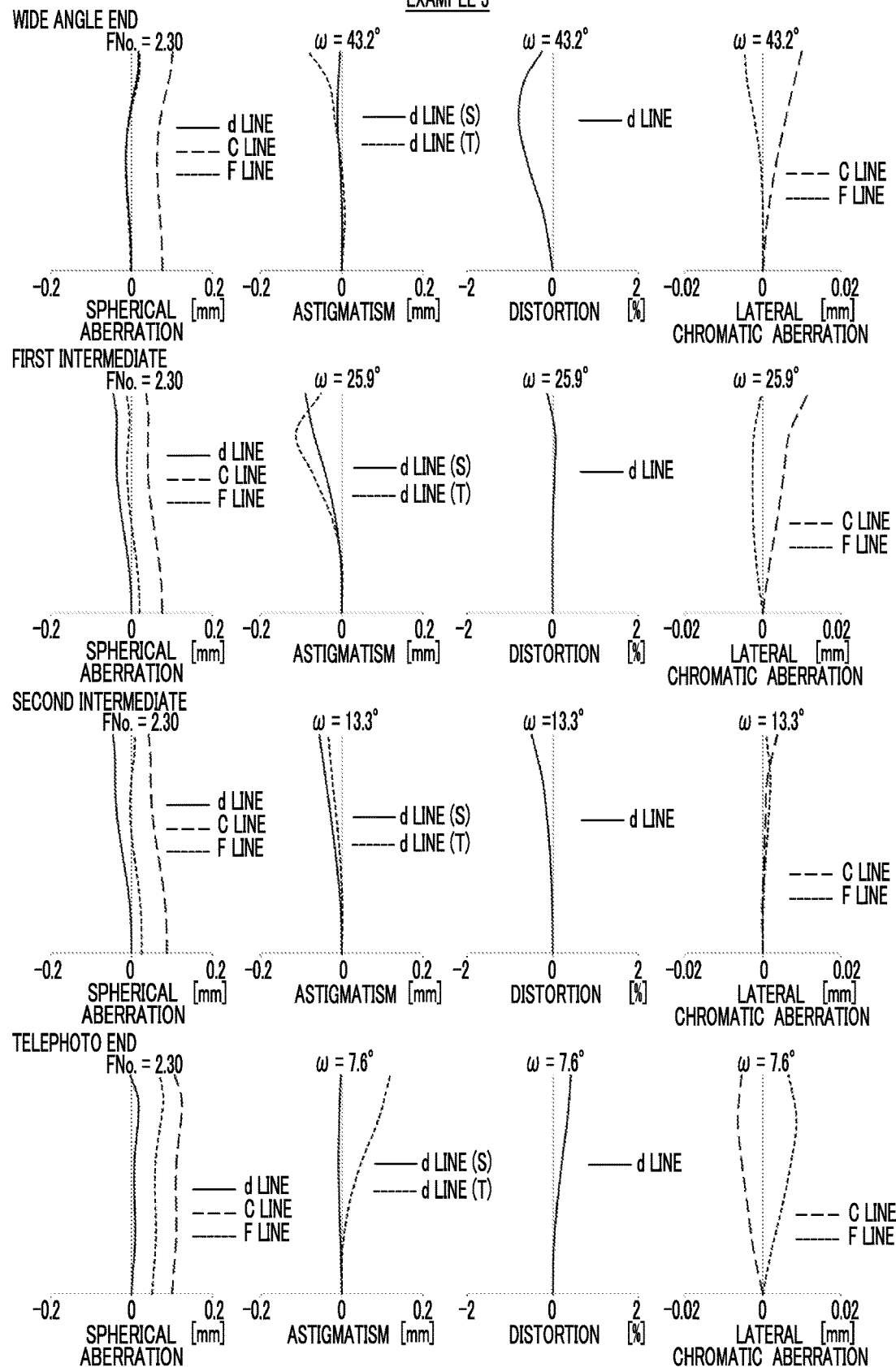
FIG. 12 is a diagram of aberrations of the zoom lens of Example 3 in a state where the projection distance is infinite.
Figure 13:
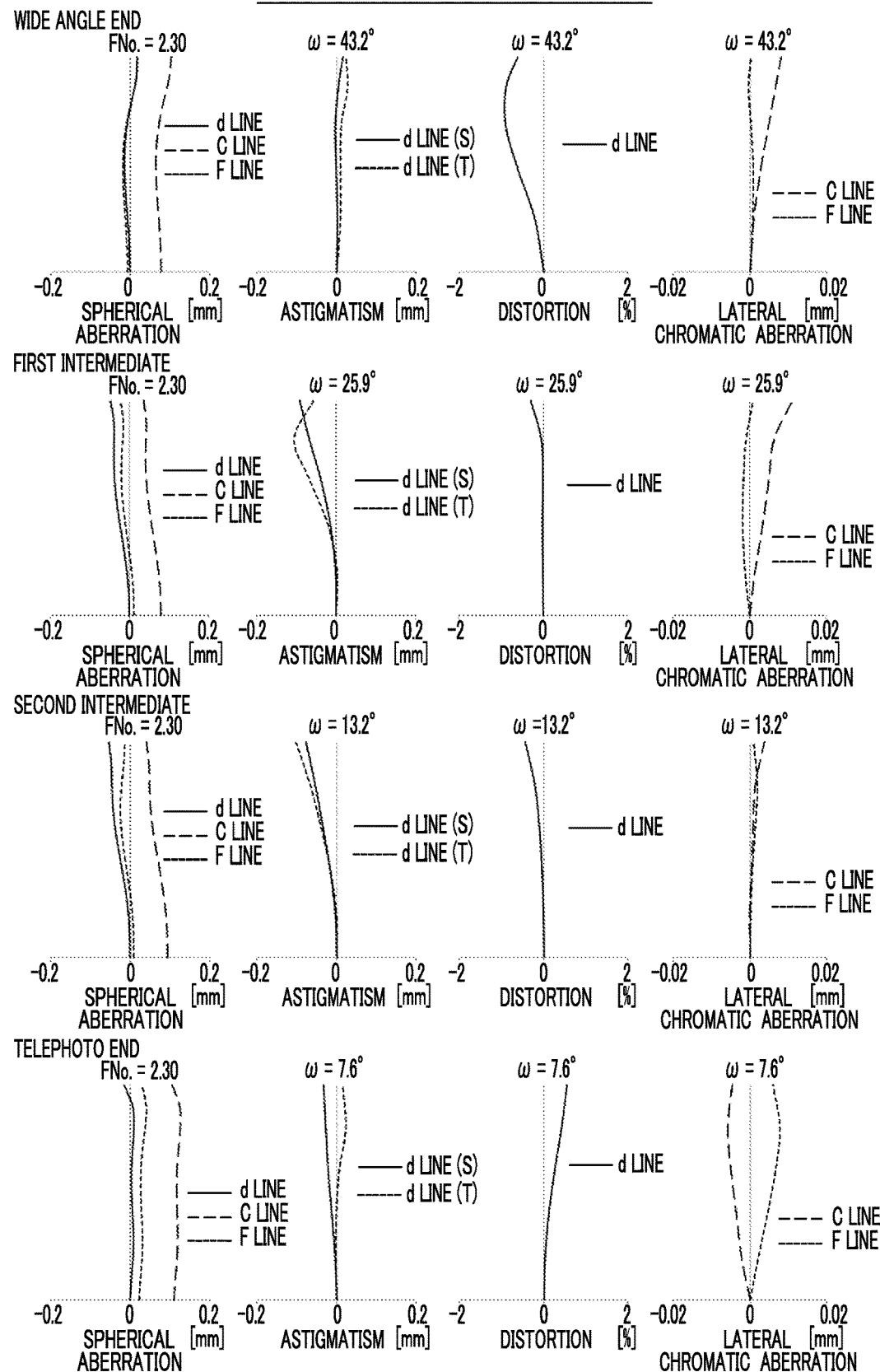
FIG. 13 is a diagram of aberrations of the zoom lens of Example 3 in a state where the projection magnification is 150 times.

Regarding the zoom lens of Example 3, FIG. 12 shows a diagram of aberrations in a state where the projection distance is infinite, and FIG. 13 shows a diagram of aberrations in a state where the projection magnification is 150 times. In the data of FIG. 13, the projection distances at the wide angle end, in the first intermediate focal length state, in the second intermediate focal length state, and at the telephoto end are respectively 1.8 meters (m), 3.5 meters (m), 7.3 meters (m), and 12.8 meters (m).

Figure 14:
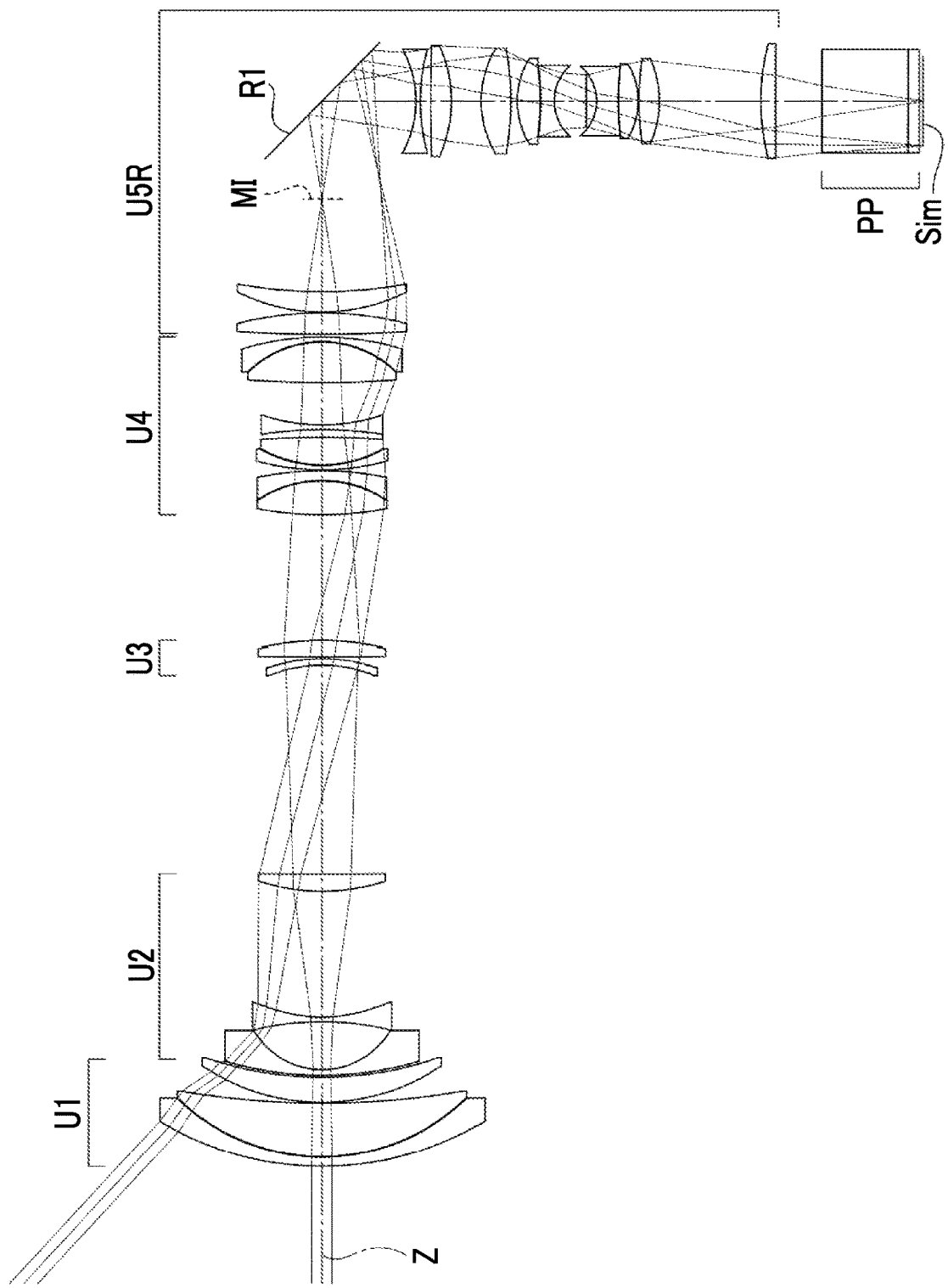
FIG. 14 is a cross-sectional view showing a configuration and luminous flux of a zoom lens according to a modification example of Example 3.

FIG. 14 shows a configuration and luminous flux of a zoom lens according to a modification example of Example 3 at the wide angle end. The zoom lens of FIG. 14 consists of a first unit U1, a second unit U2, a third unit U3, a fourth unit U4, and a fifth unit U5R, in order from the magnification side to the reduction side along the optical path. The fifth unit U5R is different from the fifth unit U5 of the zoom lens of Example 3 in that the mirror R1 which is an optical path deflection member is included at a position adjacent to the intermediate image MI and the optical path is deflected by the mirror R1. Other configurations of the zoom lens of FIG. 14 are the same as those of the zoom lens of Example 3. By deflecting the optical path, a compact configuration is possible.

Example 4

Figure 15:
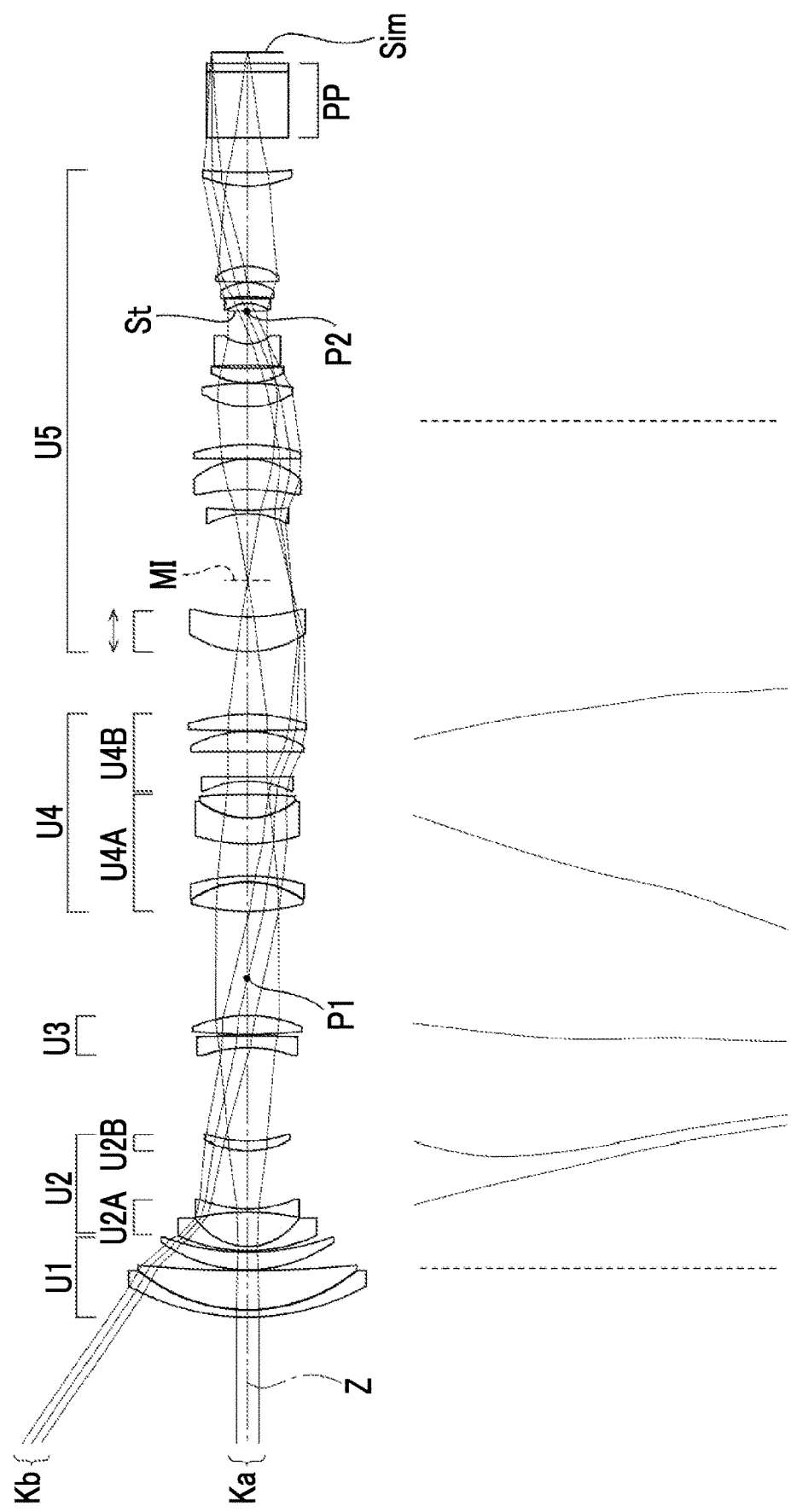
FIG. 15 is a cross-sectional view showing a configuration, luminous flux, and movement loci of a zoom lens of Example 4.

FIG. 15 shows a cross-sectional view of a configuration and luminous flux of the zoom lens of Example 4. The zoom lens of Example 4 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of one lens group that has a positive refractive power. The fourth unit U4 consists of a fourth A lens group U4A that has a positive refractive power and a fourth B lens group U4B that has a positive refractive power, in order from the magnification side to the reduction side. The fifth unit U5 consists of one lens group. The zoom lens of Example 4 consists of seven lens groups.

During magnification change, the lens group of the first unit U1 and the lens group of the fifth unit U5 remain stationary, and the other lens groups move along the optical axis Z by changing the spacing between the adjacent groups. The focus group consists of one lens closest to the magnification side in the fifth unit U5.

The intermediate image MI is located inside the fifth unit U5. The first optical system has a positive refractive power as a whole, and the second optical system has a positive refractive power as a whole, at the wide angle end and the telephoto end.

Figure 16:
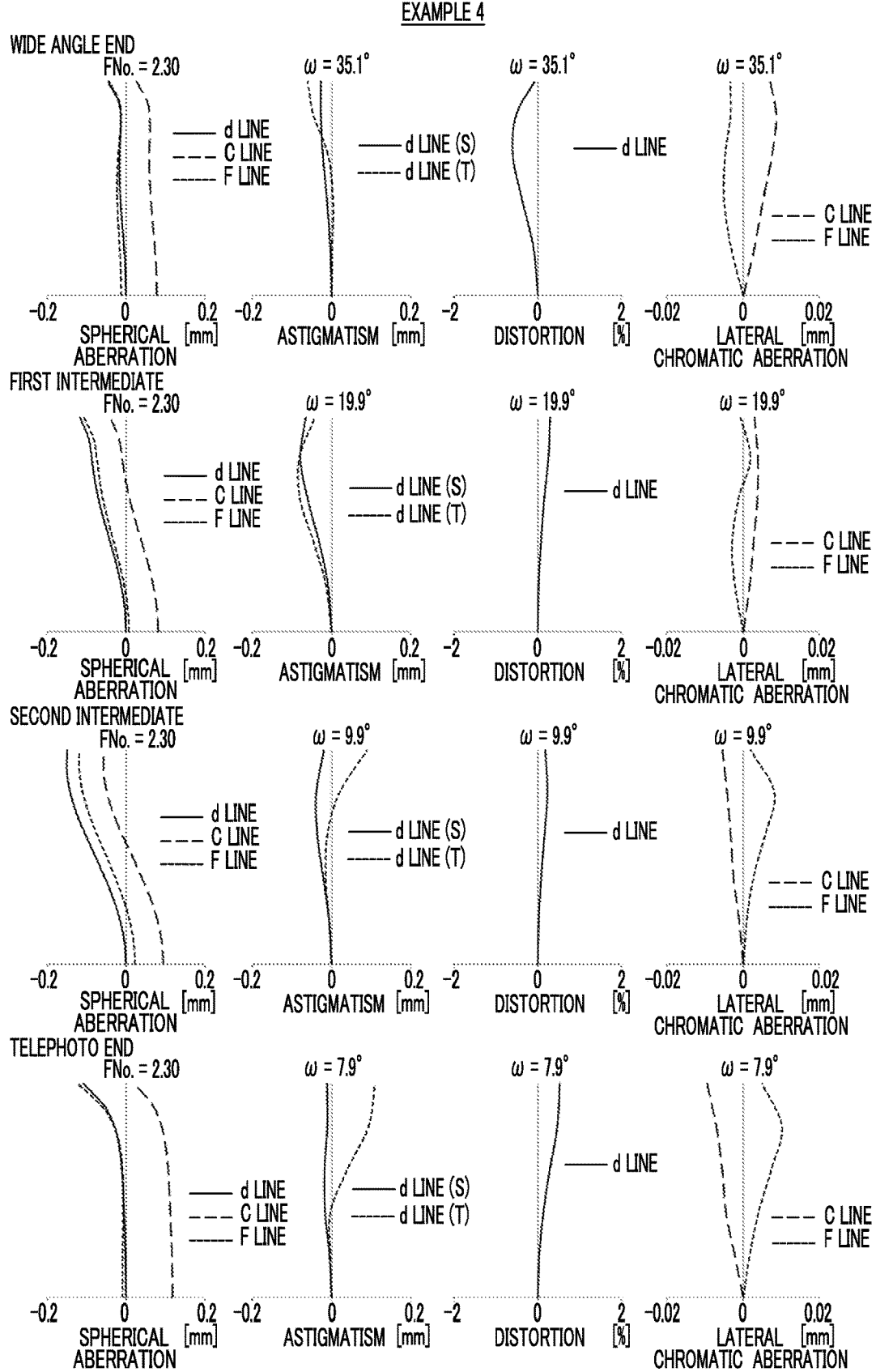
FIG. 16 is a diagram of aberrations of the zoom lens of Example 4 in a state where the projection distance is infinite.
Figure 17:
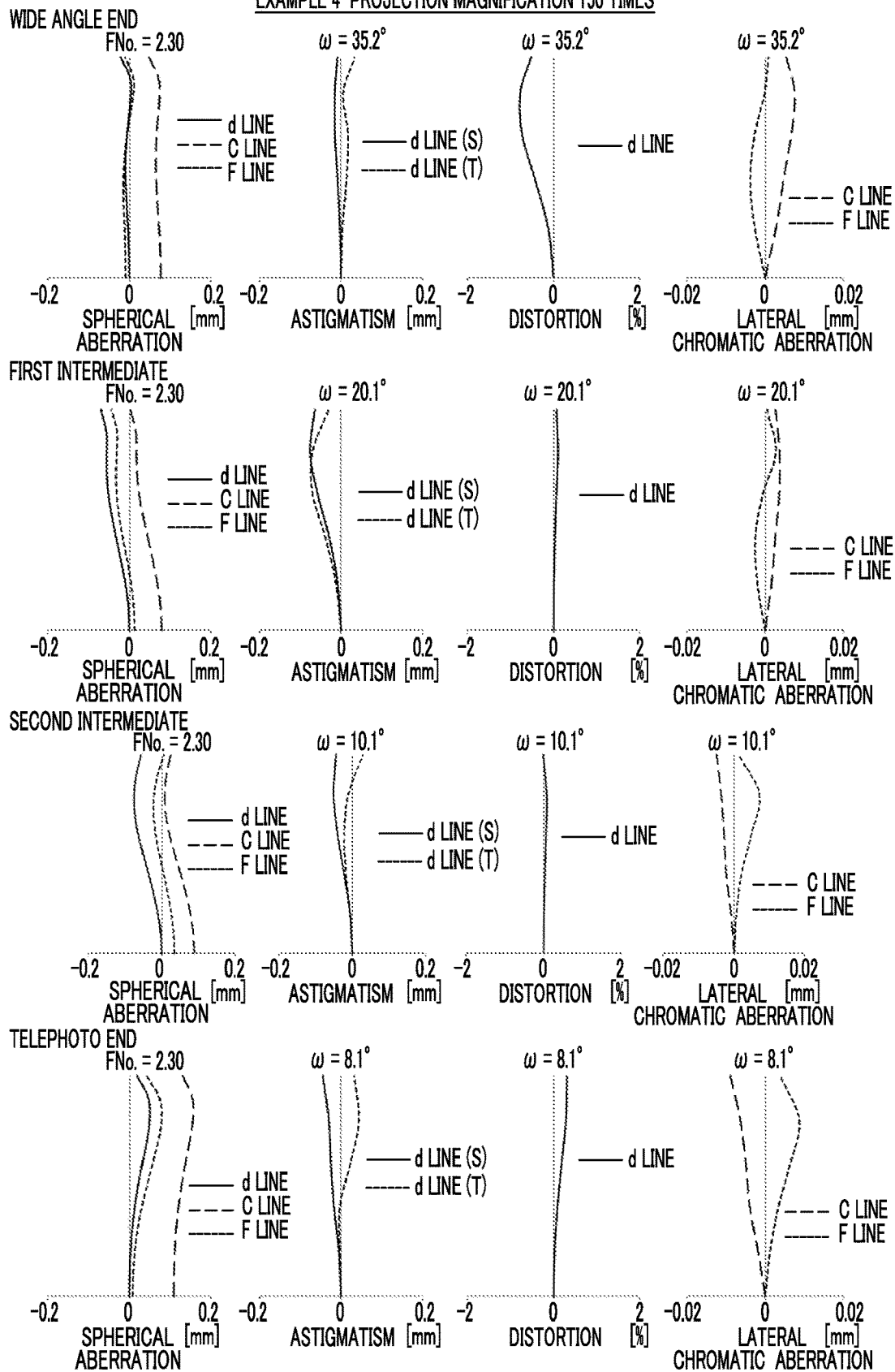
FIG. 17 is a diagram of aberrations of the zoom lens of Example 4 in a state where the projection magnification is 150 times.

Regarding the zoom lens of Example 4, Tables 11A and 11B show basic lens data, Table 12 shows specifications, and Table 13 shows variable surface spacings. Further, FIG. 16 shows a diagram of aberrations in a state where the projection distance is infinite, and FIG. 17 shows a diagram of aberrations in a state where the projection magnification is 150 times. In the data of FIG. 17, the projection distances at the wide angle end, in the first intermediate focal length state, in the second intermediate focal length state, and at the telephoto end are respectively 2.7 meters (m), 5.3 meters (m), 10.9 meters (m), and 13.6 meters (m).

TABLE 11A

Example 4

| Sn | R | D | Nd | vd |
|---|---|---|---|---|
| 1 | 91.7504 | 2.4991 | 1.84666 | 23.78 |
| 2 | 64.4914 | 13.8371 | 1.62041 | 60.29 |
| 3 | 433.7789 | 0.1997 | | |
| 4 | 56.1329 | 6.1646 | 1.83481 | 42.74 |
| 5 | 92.7917 | DD[5] | | |
| 6 | 63.3307 | 1.5005 | 1.83481 | 42.74 |
| 7 | 23.2010 | 11.9350 | | |
| 8 | −102.5570 | 1.1991 | 1.85025 | 30.05 |
| 9 | 47.2014 | DD[9] | | |
| 10 | 34.9651 | 3.2482 | 1.58913 | 61.13 |
| 11 | 50.3714 | DD[11] | | |
| 12 | −48.8074 | 4.0276 | 1.72916 | 54.68 |
| 13 | −670.9370 | 0.5473 | | |
| 14 | 191.5777 | 6.5624 | 1.89286 | 20.36 |
| 15 | −53.7298 | DD[15] | | |
| 16 | 79.5035 | 10.5044 | 1.49700 | 81.61 |
| 17 | −36.7298 | 2.1452 | 1.76182 | 26.52 |
| 18 | −73.4271 | 11.1560 | | |
| 19 | 66.8112 | 8.9991 | 1.78880 | 28.43 |
| 20 | 28.9602 | 8.1708 | 1.49700 | 81.61 |
| 21 | −261.6238 | DD[21] | | |
| 22 | −37.2143 | 1.4995 | 1.84666 | 23.78 |
| 23 | −2054.7391 | 8.8951 | | |
| 24 | −1423.7011 | 6.9744 | 1.49700 | 81.61 |
| 25 | −44.0606 | 0.1991 | | |
| 26 | 508.8291 | 5.7432 | 1.62041 | 60.29 |
| 27 | −73.8982 | DD[27] | | |
| 28 | 40.0082 | 12.0009 | 1.72916 | 54.68 |
| 29 | 71.9414 | DD[29] | | |

TABLE 11B

Example 4

| Sn | R | D | Nd | vd |
|---|---|---|---|---|
| 30 | −31.6040 | 1.2008 | 1.84666 | 23.78 |
| 31 | 115.1271 | 7.2580 | | |
| 32 | −92.3744 | 10.6455 | 1.80100 | 34.97 |
| 33 | −31.2974 | 0.2068 | | |
| 34 | 12761.8482 | 4.8507 | 1.62041 | 60.29 |
| 35 | −71.5077 | 13.3630 | | |
| 36 | 32.4040 | 8.2734 | 1.49700 | 81.61 |
| 37 | −94.5146 | 0.1999 | | |
| 38 | 31.0720 | 4.7073 | 1.72916 | 54.68 |
| 39 | 187.8574 | 1.0837 | | |
| 40 | −187.5688 | 7.3773 | 1.58144 | 40.75 |
| 41 | 13.1493 | 11.5973 | | |
| 42(St) | ∞ | 2.6833 | | |
| 43 | −12.8299 | 1.5861 | 1.84666 | 23.78 |
| 44 | −549.8059 | 0.7301 | | |
| 45 | −57.0877 | 4.9314 | 1.59522 | 67.73 |
| 46 | −17.5053 | 0.2004 | | |
| 47 | 221.3974 | 5.4461 | 1.59522 | 67.73 |
| 48 | −21.4349 | 28.0478 | | |
| 49 | 43.7350 | 4.7580 | 1.90366 | 31.31 |
| 50 | 172.8525 | 12.3400 | | |
| 51 | ∞ | 23.0000 | 1.51633 | 64.14 |
| 52 | ∞ | 3.0000 | 1.48749 | 70.44 |
| 53 | ∞ | 3.8248 | | |

TABLE 12

Example 4

| | Wide angle end | First intermediate | Second intermediate | Telephoto end |
|---|---|---|---|---|
| Zr | 1.0 | 1.9 | 4.0 | 5.0 |
| \|f\| | 18.75 | 36.19 | 75.01 | 93.76 |

TABLE 12-continued

| | Example 4 | | | |
|---|---|---|---|---|
| | Wide angle end | First intermediate | Second intermediate | Telephoto end |
| FNo. | 2.30 | 2.30 | 2.30 | 2.30 |
| 2ω[°] | 70.2 | 39.8 | 19.8 | 15.8 |

TABLE 13

| | Wide angle end | First intermediate | Second intermediate | Telephoto end |
|---|---|---|---|---|
| | Example 4 Infinity | | | |
| DD[5] | 0.50 | 14.22 | 27.18 | 30.06 |
| DD[9] | 20.37 | 2.96 | 0.90 | 0.50 |
| DD[11] | 32.60 | 30.42 | 19.01 | 16.15 |
| DD[15] | 36.41 | 24.05 | 7.15 | 0.66 |
| DD[21] | 4.79 | 33.61 | 58.08 | 66.32 |
| DD[27] | 22.19 | 11.60 | 4.54 | 3.17 |
| DD[29] | 36.07 | 36.07 | 36.07 | 36.07 |
| | Example 4 Projection magnification 150 times | | | |
| DD[5] | 0.50 | 14.22 | 27.18 | 30.06 |
| DD[9] | 20.37 | 2.96 | 0.90 | 0.50 |
| DD[11] | 32.60 | 30.42 | 19.01 | 16.15 |
| DD[15] | 36.41 | 24.05 | 7.15 | 0.66 |
| DD[21] | 4.79 | 33.61 | 58.08 | 66.32 |
| DD[27] | 21.83 | 10.91 | 3.20 | 1.61 |
| DD[29] | 36.43 | 36.77 | 37.50 | 37.85 |

Example 5

Figure 18:
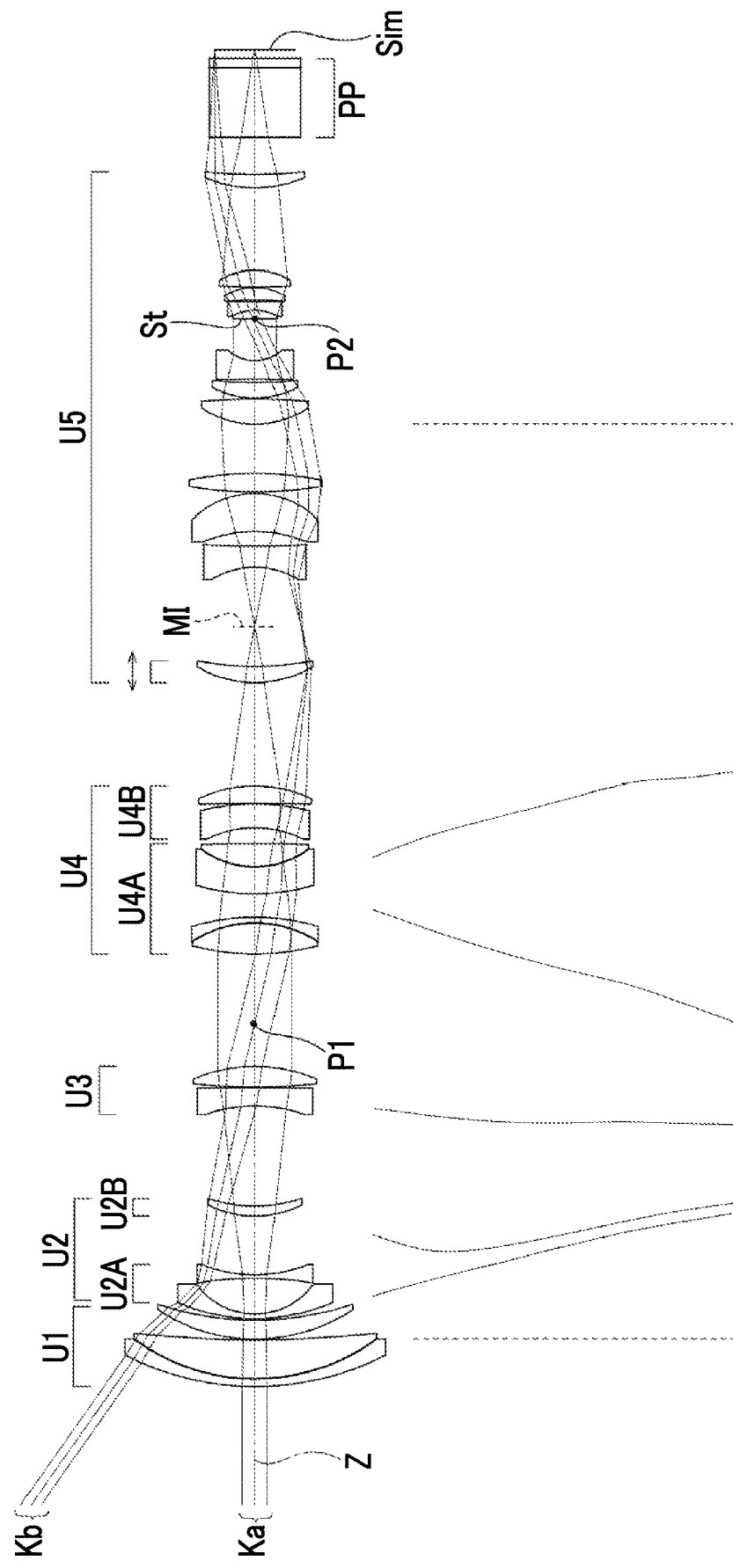
FIG. 18 is a cross-sectional view showing a configuration, luminous flux, and movement loci of a zoom lens of Example 5.

FIG. 18 shows a cross-sectional view of a configuration and luminous flux of the zoom lens of Example 5. The zoom lens of Example 5 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of one lens group that has a positive refractive power. The fourth unit U4 consists of a fourth A lens group U4A that has a positive refractive power and a fourth B lens group U4B that has a positive refractive power, in order from the magnification side to the reduction side. The fifth unit U5 consists of one lens group. The zoom lens of Example 5 consists of seven lens groups.

During magnification change, the lens group of the first unit U1 and the lens group of the fifth unit U5 remain stationary, and the other lens groups move along the optical axis Z by changing the spacing between the adjacent groups. The focus group consists of one lens closest to the magnification side in the fifth unit U5.

The intermediate image MI is located inside the fifth unit U5. The first optical system has a positive refractive power as a whole, and the second optical system has a positive refractive power as a whole, at the wide angle end and the telephoto end.

Figure 19:
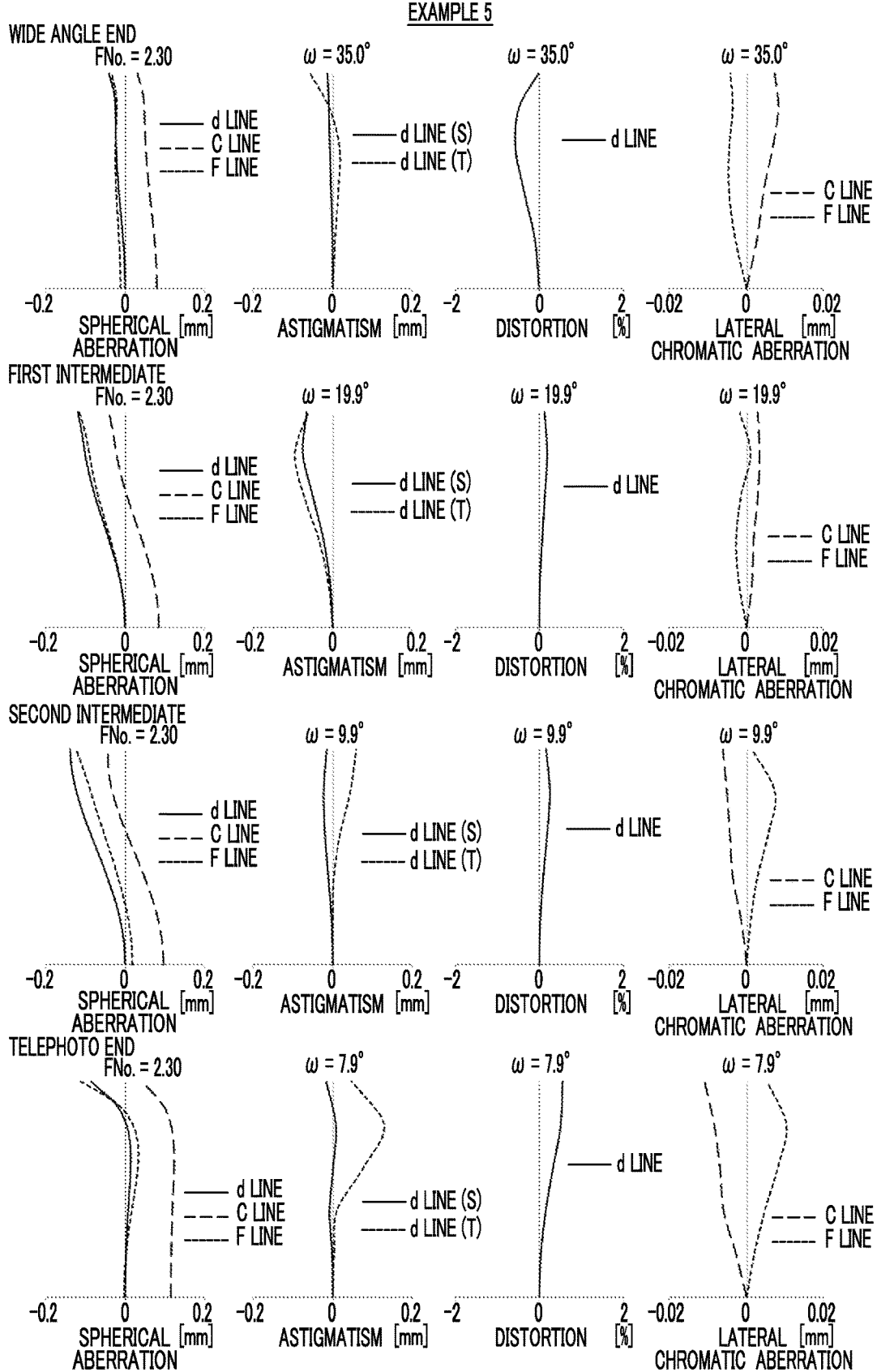
FIG. 19 is a diagram of aberrations of the zoom lens of Example 5 in a state where the projection distance is infinite.
Figure 20:
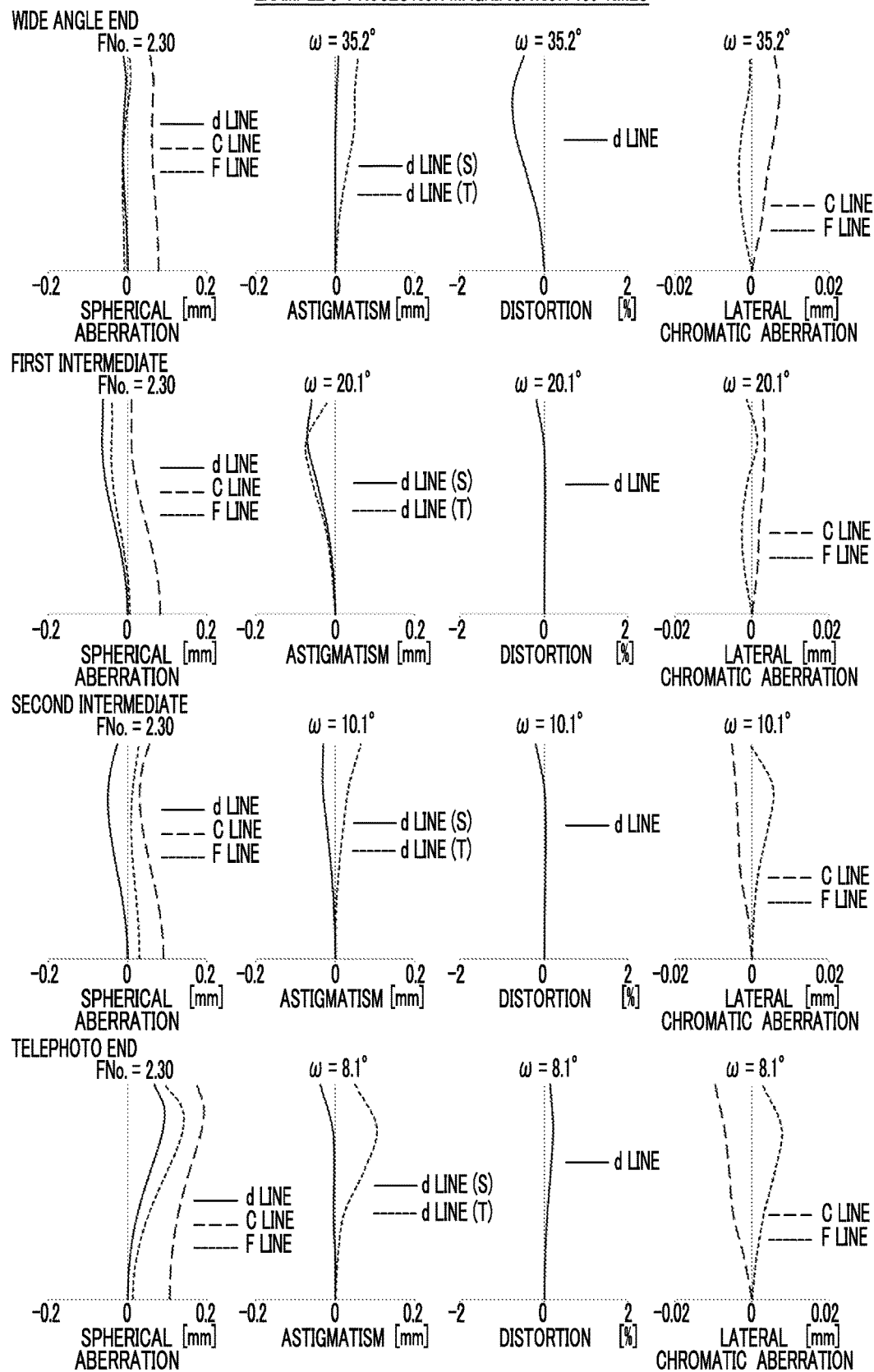
FIG. 20 is a diagram of aberrations of the zoom lens of Example 5 in a state where the projection magnification is 150 times.

Regarding the zoom lens of Example 5, Tables 14A and 14B show basic lens data, Table 15 shows specifications, and Table 16 shows variable surface spacings. Further, FIG. 19 shows a diagram of aberrations in a state where the projection distance is infinite, and FIG. 20 shows a diagram of aberrations in a state where the projection magnification is 150 times. In the data of FIG. 20, the projection distances at the wide angle end, in the first intermediate focal length state, in the second intermediate focal length state, and at the telephoto end are respectively 2.7 meters (m), 5.3 meters (m), 10.9 meters (m), and 13.6 meters (m).

TABLE 14A

| | Example 5 | | | |
|---|---|---|---|---|
| Sn | R | D | Nd | νd |
| 1 | 93.1699 | 2.4999 | 1.84666 | 23.78 |
| 2 | 66.4309 | 12.9333 | 1.61800 | 63.33 |
| 3 | 366.5715 | 0.1999 | | |
| 4 | 56.7694 | 6.3466 | 1.83481 | 42.74 |
| 5 | 99.9170 | DD[5] | | |
| 6 | 63.3470 | 1.5010 | 1.87070 | 40.73 |
| 7 | 23.5152 | 11.8007 | | |
| 8 | −117.9040 | 1.1999 | 1.85025 | 30.05 |
| 9 | 47.3758 | DD[9] | | |
| 10 | 34.2404 | 3.3753 | 1.48749 | 70.44 |
| 11 | 49.1304 | DD[11] | | |
| 12 | −47.7528 | 6.1185 | 1.80400 | 46.53 |
| 13 | −778.8736 | 0.2007 | | |
| 14 | 192.0246 | 6.8095 | 1.89286 | 20.36 |
| 15 | −50.7325 | DD[15] | | |
| 16 | 79.9392 | 10.2229 | 1.49700 | 81.61 |
| 17 | −37.6297 | 1.8523 | 1.78472 | 25.68 |
| 18 | −74.2162 | 7.8131 | | |
| 19 | 66.0652 | 8.9757 | 1.78880 | 28.43 |
| 20 | 29.3069 | 7.7766 | 1.49700 | 81.61 |
| 21 | −433.2158 | DD[21] | | |
| 22 | −35.5050 | 7.9047 | 1.84666 | 23.78 |
| 23 | −74.1632 | 0.1997 | | |
| 24 | −467.2417 | 5.7909 | 1.52841 | 76.45 |
| 25 | −42.2601 | DD[25] | | |
| 26 | 36.3002 | 5.3705 | 1.77250 | 49.60 |
| 27 | 90.6185 | DD[27] | | |

TABLE 14B

| | Example 5 | | | |
|---|---|---|---|---|
| Sn | R | D | Nd | νd |
| 28 | −26.7971 | 7.0000 | 1.80518 | 25.42 |
| 29 | 297.4055 | 4.8050 | | |
| 30 | −43.7157 | 12.4523 | 1.80610 | 33.27 |
| 31 | −28.9226 | 0.5511 | | |
| 32 | 130.7837 | 6.0629 | 1.72916 | 54.68 |
| 33 | −110.6957 | 16.3613 | | |
| 34 | 31.5412 | 8.3147 | 1.49700 | 81.61 |
| 35 | −198.4366 | 0.2002 | | |
| 36 | 28.3485 | 5.2879 | 1.72916 | 54.68 |
| 37 | 153.0078 | 1.1028 | | |
| 38 | −664.4220 | 6.0572 | 1.62004 | 36.26 |
| 39 | 12.5753 | 13.9630 | | |
| 40(St) | ∞ | 2.8599 | | |
| 41 | −13.8120 | 2.8055 | 1.84666 | 23.78 |
| 42 | −1266.5385 | 0.6142 | | |
| 43 | −70.6525 | 4.0319 | 1.59522 | 67.73 |
| 44 | −18.9753 | 0.2000 | | |
| 45 | 232.5929 | 5.4045 | 1.61800 | 63.33 |
| 46 | −21.9504 | 27.3008 | | |
| 47 | 41.5461 | 4.4272 | 1.87070 | 40.73 |
| 48 | 163.3553 | 12.3400 | | |
| 49 | ∞ | 23.0000 | 1.51633 | 64.14 |
| 50 | ∞ | 3.0000 | 1.48749 | 70.44 |
| 51 | ∞ | 2.8790 | | |

TABLE 15

| | Wide angle end | First intermediate | Second intermediate | Telephoto end |
|---|---|---|---|---|
| Zr | 1.0 | 1.9 | 4.0 | 5.0 |
| \|f\| | 18.75 | 36.20 | 75.02 | 93.77 |
| FNo. | 2.30 | 2.30 | 2.30 | 2.30 |
| 2ω[°] | 70.0 | 39.8 | 19.8 | 15.8 |

TABLE 16

| | Wide angle end | First intermediate | Second intermediate | Telephoto end |
|---|---|---|---|---|
| Example 5 Infinity | | | | |
| DD[5] | 0.50 | 14.70 | 27.85 | 30.82 |
| DD[9] | 19.26 | 1.87 | 0.87 | 0.50 |
| DD[11] | 33.06 | 30.91 | 18.38 | 15.41 |
| DD[15] | 37.08 | 24.19 | 7.42 | 1.03 |
| DD[21] | 5.12 | 40.15 | 69.51 | 78.36 |
| DD[25] | 33.71 | 16.92 | 4.70 | 2.60 |
| DD[27] | 32.89 | 32.89 | 32.89 | 32.89 |
| Example 5 Projection magnification 150 times | | | | |
| DD[5] | 0.50 | 14.70 | 27.85 | 30.82 |
| DD[9] | 19.26 | 1.87 | 0.87 | 0.50 |
| DD[11] | 33.06 | 30.91 | 18.38 | 15.41 |
| DD[15] | 37.08 | 24.19 | 7.42 | 1.03 |
| DD[21] | 5.12 | 40.15 | 69.51 | 78.36 |
| DD[25] | 33.37 | 16.26 | 3.44 | 1.53 |
| DD[27] | 33.23 | 33.55 | 34.24 | 34.56 |

Example 6

Figure 21:
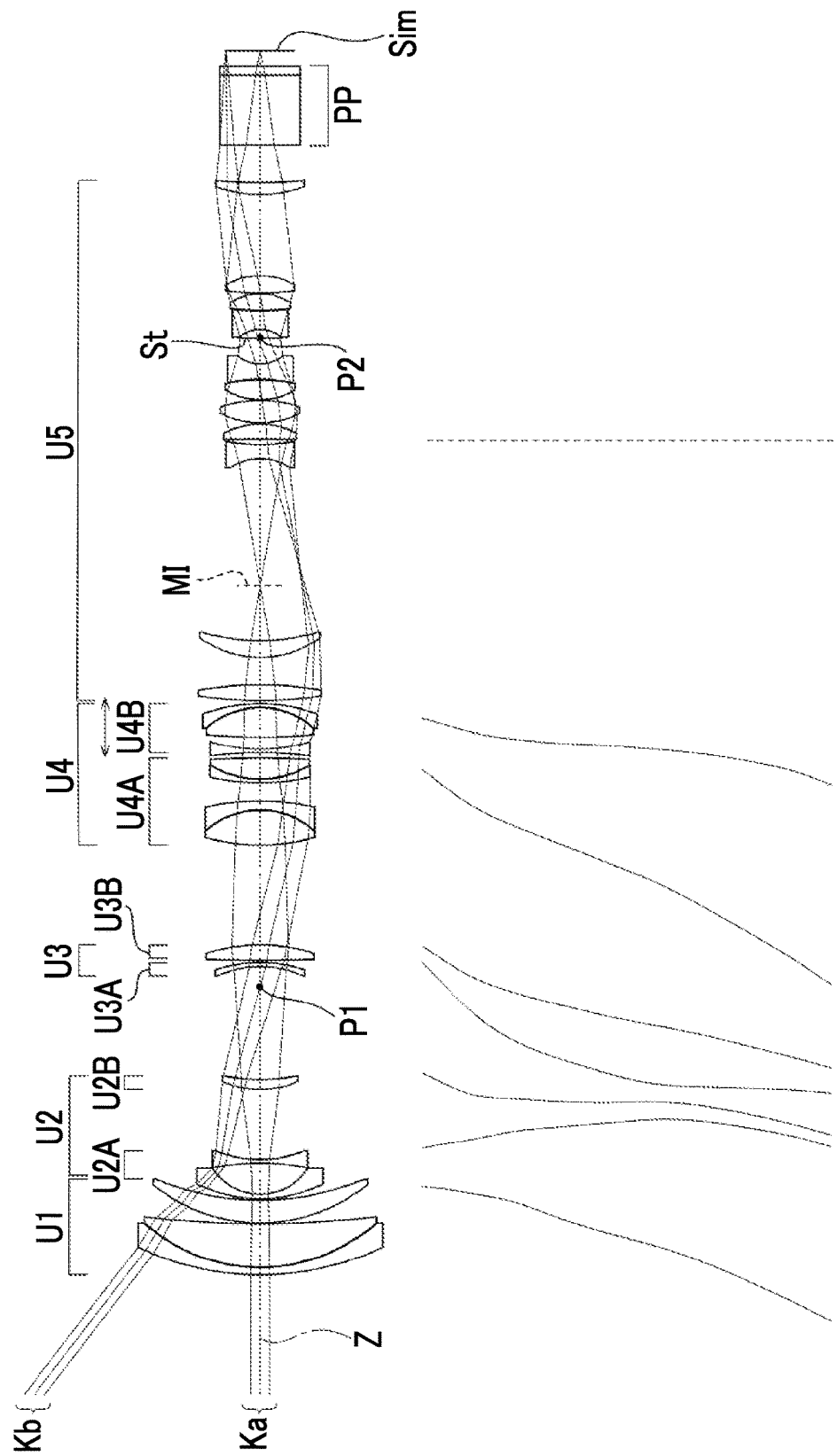
FIG. 21 is a cross-sectional view showing a configuration, luminous flux, and movement loci of a zoom lens of Example 6.

FIG. 21 shows a cross-sectional view of a configuration and luminous flux of the zoom lens of Example 6. The zoom lens of Example 6 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of a third A lens group U3A that has a negative refractive power and a third B lens group U3B that has a positive refractive power, in order from the magnification side to the reduction side. The fourth unit U4 consists of a fourth A lens group U4A that has a positive refractive power and a fourth B lens group U4B that has a negative refractive power, in order from the magnification side to the reduction side. The fifth unit U5 consists of one lens group. The zoom lens of Example 6 consists of eight lens groups.

During magnification change, the lens group included in the fifth unit U5 remains stationary, and the other lens groups move along the optical axis Z by changing the spacing between the adjacent groups. The focus group consists of the fourth B lens group U4B.

The intermediate image MI is located inside the fifth unit U5. The first optical system has a positive refractive power as a whole, and the second optical system has a positive refractive power as a whole, at the wide angle end and the telephoto end.

Figure 22:
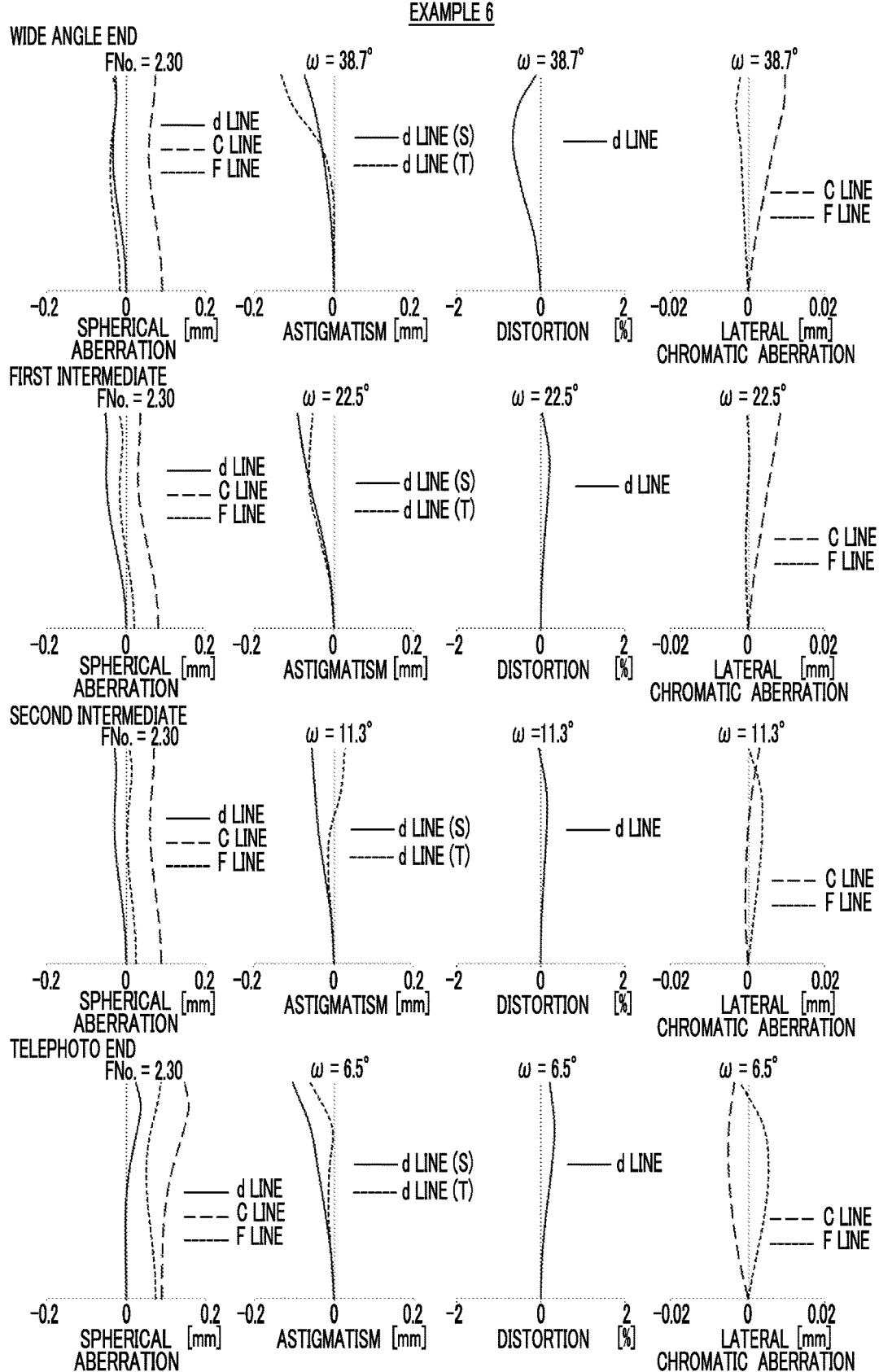
FIG. 22 is a diagram of aberrations of the zoom lens of Example 6 in a state where the projection distance is infinite.
Figure 23:
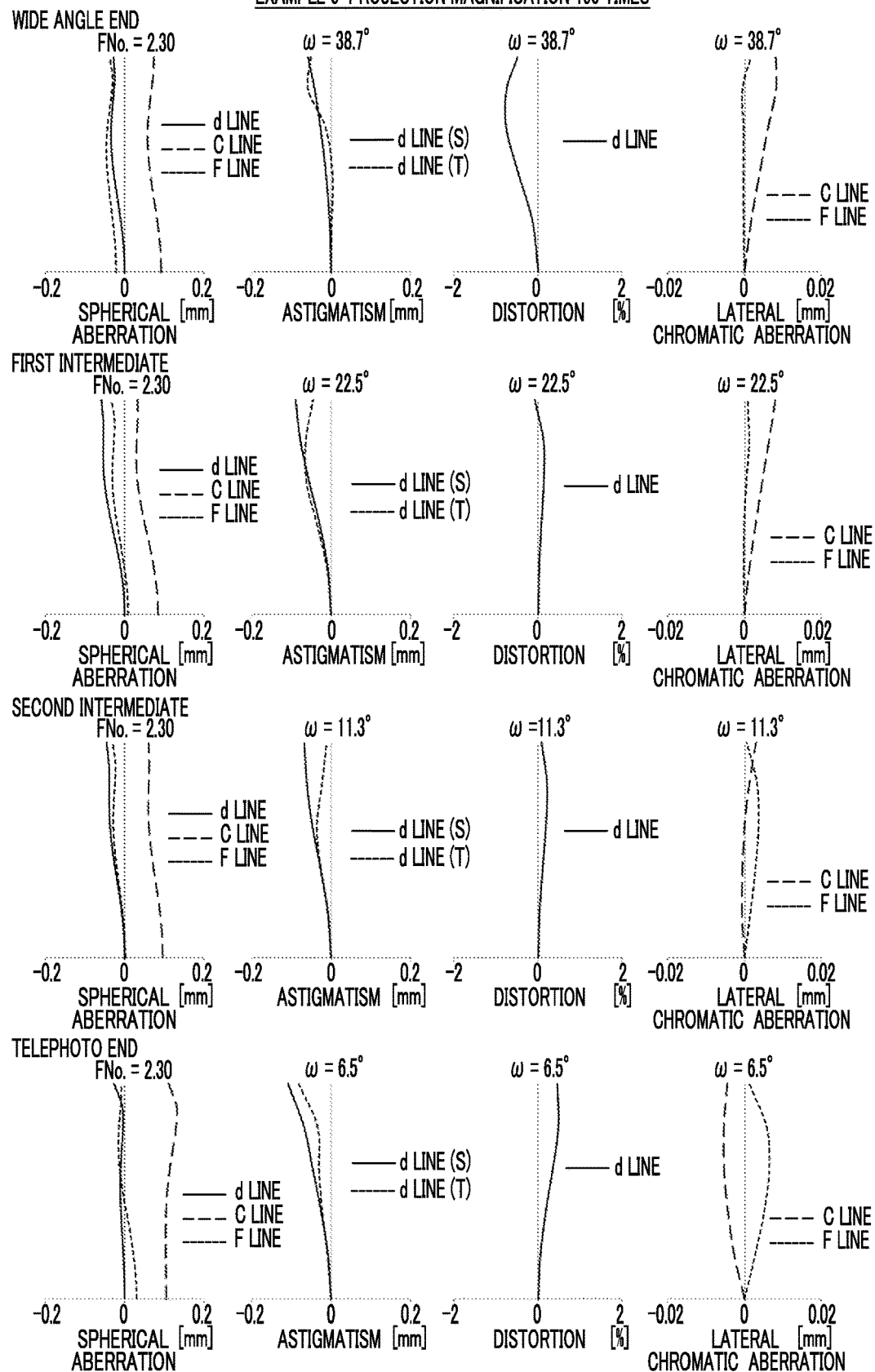
FIG. 23 is a diagram of aberrations of the zoom lens of Example 6 in a state where the projection magnification is 150 times.

Regarding the zoom lens of Example 6, Tables 17A and 17B show basic lens data, Table 18 shows specifications, and Table 19 shows variable surface spacings. Further, FIG. 22 shows a diagram of aberrations in a state where the projection distance is infinite, and FIG. 23 shows a diagram of aberrations in a state where the projection magnification is 150 times. In the data of FIG. 23, the projection distances at the wide angle end, in the first intermediate focal length state, in the second intermediate focal length state, and at the telephoto end are respectively 2.1 meters (m), 4.1 meters (m), 8.6 meters (m), and 15.1 meters (m).

TABLE 17A

Example 6

| Sn | R | D | Nd | vd |
|---|---|---|---|---|
| 1 | 99.5724 | 2.4991 | 1.84666 | 23.78 |
| 2 | 60.7700 | 14.4551 | 1.62041 | 60.29 |
| 3 | 351.4877 | 0.2000 | | |
| 4 | 59.0338 | 7.5240 | 1.80400 | 46.53 |
| 5 | 93.5124 | DD[5] | | |
| 6 | 49.8128 | 1.4991 | 1.87070 | 40.73 |
| 7 | 20.0968 | 10.2373 | | |
| 8 | −84.4233 | 1.1997 | 1.83481 | 42.74 |
| 9 | 40.3922 | DD[9] | | |
| 10 | 33.2318 | 3.2655 | 1.76182 | 26.52 |
| 11 | 60.9633 | DD[11] | | |
| 12 | −36.5336 | 1.3329 | 1.85026 | 32.27 |
| 13 | −49.6751 | DD[13] | | |
| 14 | 663.5242 | 5.0327 | 1.89286 | 20.36 |
| 15 | −61.9410 | DD[15] | | |
| 16 | 69.6660 | 11.5912 | 1.53775 | 74.70 |
| 17 | −28.5715 | 2.8643 | 1.59551 | 39.24 |
| 18 | −92.5642 | 6.0388 | | |
| 19 | 82.4523 | 1.1997 | 1.83481 | 42.74 |
| 20 | 33.7090 | 7.0083 | 1.49700 | 81.61 |
| 21 | −291.0958 | DD[21] | | |
| 22 | −142.0836 | 1.2007 | 1.84666 | 23.78 |
| 23 | 58.3553 | 4.0519 | | |
| 24 | 211.1210 | 9.4757 | 1.59522 | 67.73 |
| 25 | −28.5714 | 1.2991 | 1.84666 | 23.78 |
| 26 | −57.7345 | DD[26] | | |
| 27 | 151.4529 | 5.2705 | 1.72916 | 54.68 |
| 28 | −122.7749 | 8.9563 | | |
| 29 | 36.4118 | 5.5062 | 1.77250 | 49.60 |
| 30 | 70.4459 | 60.0732 | | |

TABLE 17B

Example 6

| Sn | R | D | Nd | vd |
|---|---|---|---|---|
| 31 | −18.7792 | 4.6936 | 1.69895 | 30.13 |
| 32 | 68.5449 | 1.7284 | | |
| 33 | −444.7974 | 5.0252 | 1.83481 | 42.74 |
| 34 | −26.4285 | 0.3796 | | |
| 35 | 30.9004 | 7.3960 | 1.53775 | 74.70 |
| 36 | −44.3774 | 0.1999 | | |
| 37 | 23.1123 | 6.5400 | 1.59522 | 67.73 |
| 38 | −58.4683 | 0.2000 | | |
| 39 | −50.5998 | 5.0061 | 1.51742 | 52.43 |
| 40 | 12.5331 | 8.4873 | | |
| 41(St) | ∞ | 2.8449 | | |
| 42 | −11.3858 | 6.1957 | 1.83400 | 37.16 |
| 43 | 81.3016 | 0.1000 | | |
| 44 | 91.4344 | 5.6045 | 1.52841 | 76.45 |
| 45 | −18.1590 | 0.1991 | | |
| 46 | 102.6850 | 5.6370 | 1.52841 | 76.45 |
| 47 | −24.3769 | 26.9515 | | |
| 48 | 46.0838 | 3.9527 | 1.80400 | 46.53 |
| 49 | 180.9216 | 12.3400 | | |
| 50 | ∞ | 23.0000 | 1.51633 | 64.14 |
| 51 | ∞ | 3.0000 | 1.48749 | 70.44 |
| 52 | ∞ | 5.0301 | | |

TABLE 18

Example 6

|  | Wide angle end | First intermediate | Second intermediate | Telephoto end |
|---|---|---|---|---|
| Zr | 1.0 | 1.9 | 4.0 | 7.0 |
| \|f\| | 14.54 | 28.07 | 58.17 | 101.79 |
| FNo. | 2.30 | 2.30 | 2.30 | 2.30 |
| 2ω[°] | 77.4 | 45.0 | 22.6 | 13.0 |

TABLE 19

|  | Wide angle end | First intermediate | Second intermediate | Telephoto end |
|---|---|---|---|---|
| Example 6 Infinity | | | | |
| DD[5] | 0.50 | 19.07 | 37.35 | 48.20 |
| DD[9] | 23.06 | 5.59 | 1.93 | 0.61 |
| DD[11] | 37.40 | 13.50 | 5.74 | 13.31 |
| DD[13] | 0.75 | 13.90 | 12.29 | 3.77 |
| DD[15] | 32.83 | 27.50 | 15.11 | 0.55 |
| DD[21] | 1.72 | 19.18 | 38.90 | 53.67 |
| DD[26] | 0.98 | 9.58 | 13.87 | 24.28 |
| Example 6 Projection magnification 150 times | | | | |
| DD[5] | 0.50 | 19.07 | 37.35 | 48.20 |
| DD[9] | 23.06 | 5.59 | 1.93 | 0.61 |
| DD[11] | 37.40 | 13.50 | 5.74 | 13.31 |
| DD[13] | 0.75 | 13.90 | 12.29 | 3.77 |
| DD[15] | 32.83 | 27.50 | 15.11 | 0.55 |
| DD[21] | 2.01 | 19.68 | 39.89 | 55.23 |
| DD[26] | 0.69 | 9.09 | 12.82 | 22.62 |

Figure 24:
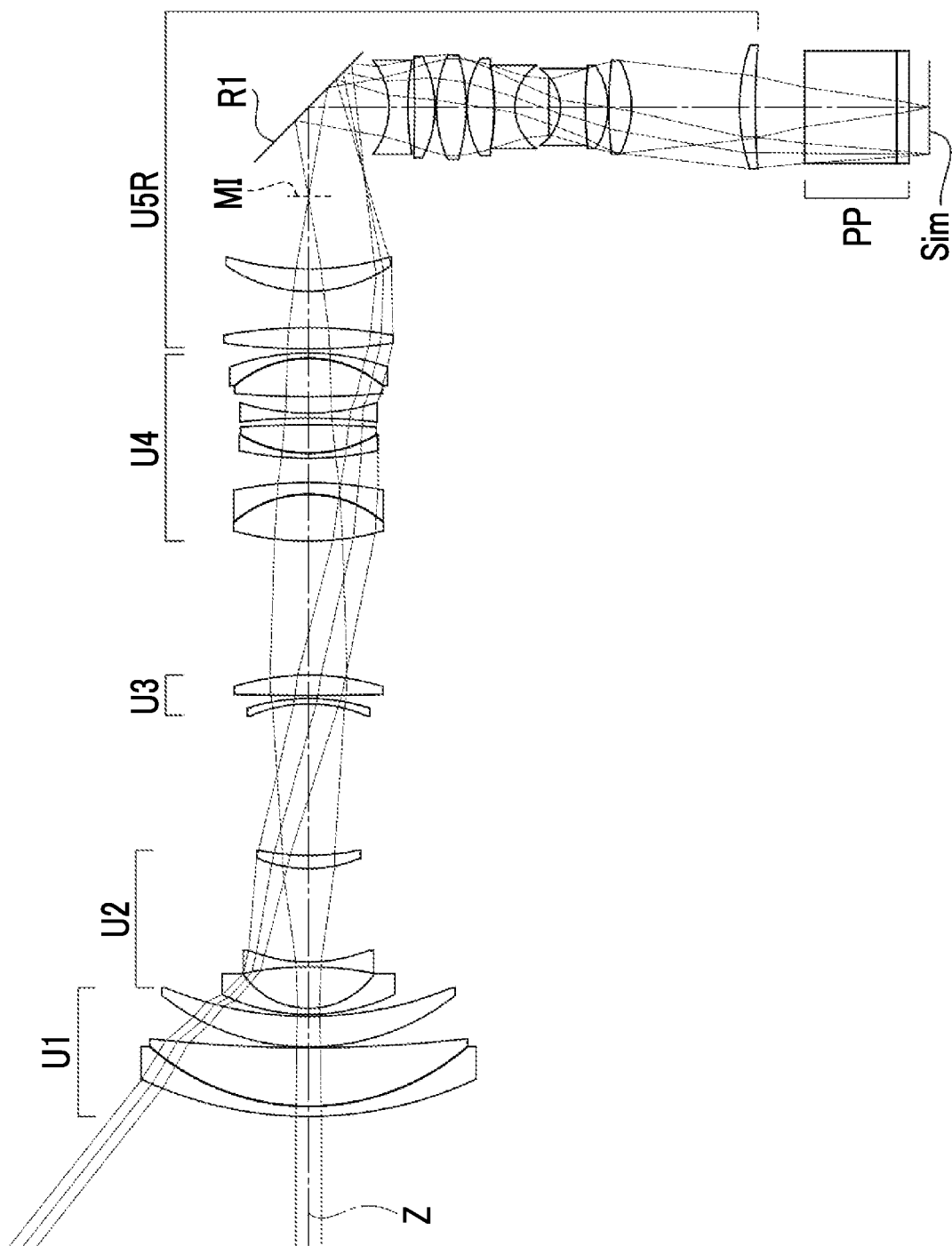
FIG. 24 is a cross-sectional view showing a configuration and luminous flux of a zoom lens according to a modification example of Example 6.

FIG. 24 shows a configuration and luminous flux of a zoom lens according to a modification example of Example 6 at the wide angle end. The zoom lens of FIG. 24 consists of a first unit U1, a second unit U2, a third unit U3, a fourth unit U4, and a fifth unit U5R, in order from the magnification side to the reduction side along the optical path. The fifth unit U5R is different from the fifth unit U5 of the zoom lens of Example 6 in that the mirror R1 which is an optical path deflection member is included at a position adjacent to the intermediate image MI and the optical path is deflected by the mirror R1. Other configurations of the zoom lens of FIG. 24 are the same as those of the zoom lens of Example 6. By deflecting the optical path, a compact configuration is possible.

Example 7

Figure 25:
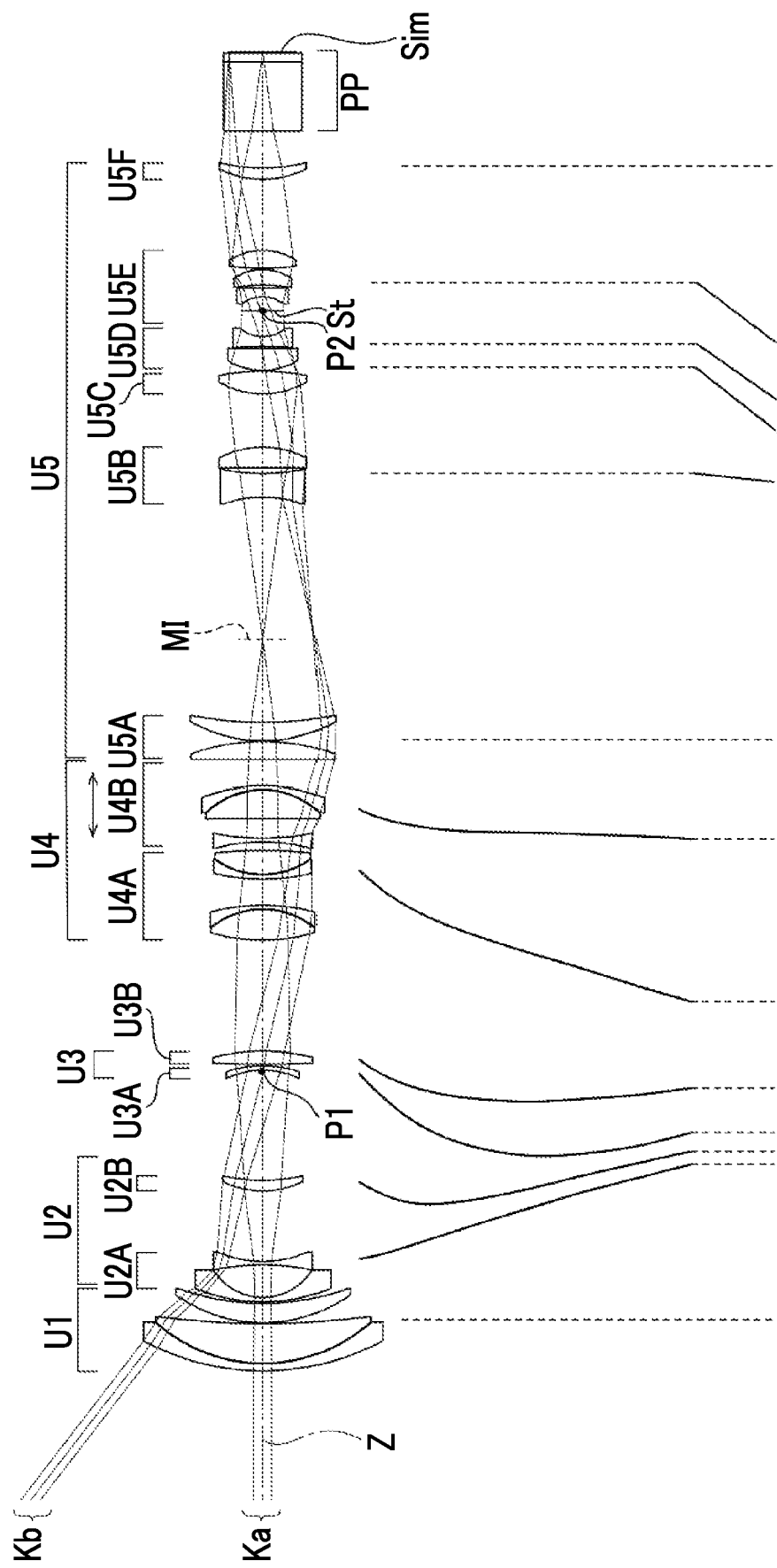
FIG. 25 is a cross-sectional view showing a configuration, luminous flux, and movement loci of a zoom lens of Example 7.

FIG. 25 shows a cross-sectional view of a configuration and luminous flux of the zoom lens of Example 7. FIG. 26 shows a cross-sectional view of the configuration and the luminous flux of the zoom lens of Example 7 in each variable magnification state. The illustration method of FIG. 26 is the same as that of FIG. 2. The zoom lens of Example 7 consists of a first unit U1, a second unit U2, a third unit U3, a fourth unit U4, and a fifth unit U5, in order from the magnification side to the reduction side.

The first unit U1 consists of one lens group that has a positive refractive power. The second unit U2 consists of a second A lens group U2A that has a negative refractive power and a second B lens group U2B that has a positive refractive power, in order from the magnification side to the reduction side. The third unit U3 consists of a third A lens group U3A that has a negative refractive power and a third B lens group U3B that has a positive refractive power, in order from the magnification side to the reduction side. The fourth unit U4 consists of a fourth A lens group U4A that has a positive refractive power and a fourth B lens group U4B that has a negative refractive power, in order from the magnification side to the reduction side. The fifth unit U5 consists of a fifth A lens group U5A, a fifth B lens group U5B, a fifth C lens group U5C, a fifth D lens group U5D, a fifth E lens group U5E, and a fifth F lens group U5F, in order from the magnification side to the reduction side. The zoom lens of Example 7 consists of thirteen lens groups.

During magnification change from the wide angle end to the second intermediate focal length state, the lens group of the first unit U1 and the lens group of the fifth unit U5 remain stationary, and the other lens groups move along the optical axis Z by changing the spacing between adjacent groups. During magnification change from the second intermediate focal length state to the telephoto end, the spacing between the group in which the fifth B lens group U5B, the fifth C lens group U5C, the fifth D lens group U5D, the fifth E lens group U5E move along the optical axis Z by changing the spacing between adjacent groups, and the other lens groups remain stationary along the optical axis Z. The focus group consists of the fourth B lens group U4B.

The intermediate image MI is located inside the fifth unit U5. The first optical system has a positive refractive power as a whole, and the second optical system has a positive refractive power as a whole, at the wide angle end and the telephoto end.

Figure 27:
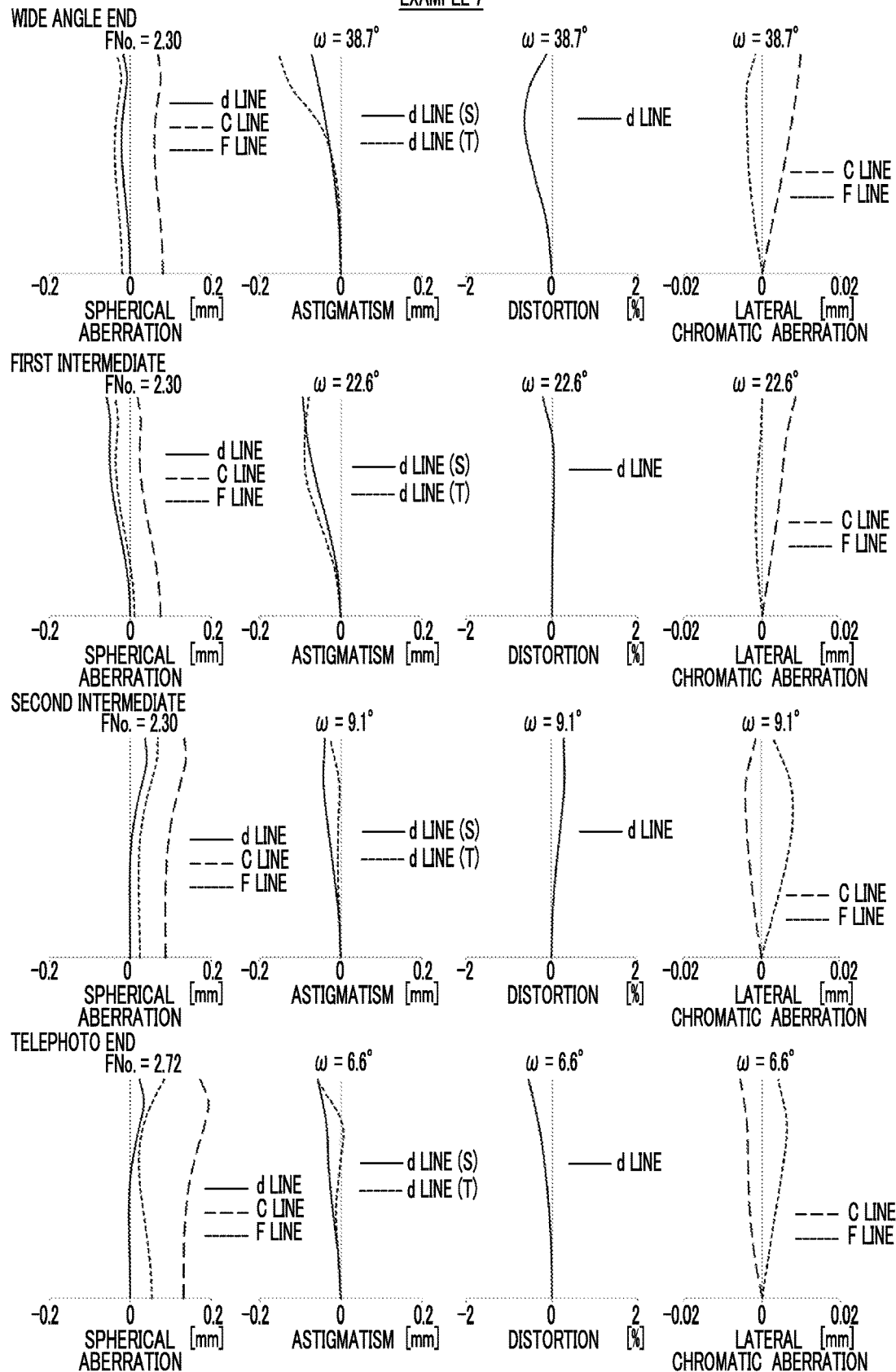
FIG. 27 is a diagram of aberrations of the zoom lens of Example 7 in a state where the projection distance is infinite.
Figure 28:
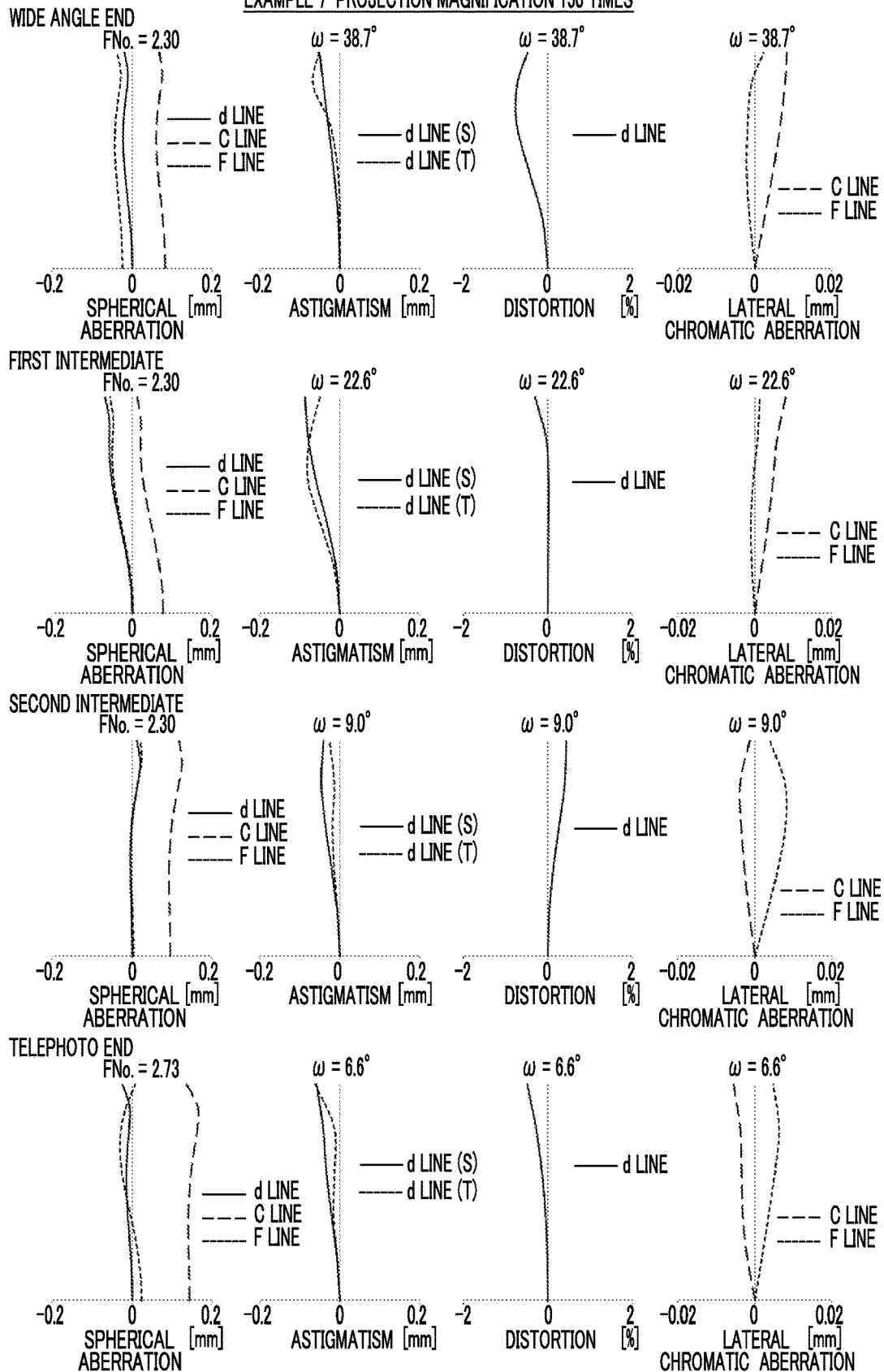
FIG. 28 is a diagram of aberrations of the zoom lens of Example 7 in a state where the projection magnification is 150 times.

Regarding the zoom lens of Example 7, Tables 20A and 20B show basic lens data, Table 21 shows specifications, and Table 22 shows variable surface spacings. Further, FIG. 27 shows a diagram of aberrations in a state where the projection distance is infinite, and FIG. 28 shows a diagram of aberrations in a state where the projection magnification is 150 times. In the data of FIG. 28, the projection distances at the wide angle end, in the first intermediate focal length state, in the second intermediate focal length state, and at the telephoto end are respectively 2.1 meters (m), 4.1 meters (m), 10.8 meters (m), and 15.1 meters (m).

TABLE 20A

Example 7

| Sn | R | D | Nd | vd |
|---|---|---|---|---|
| 1 | 90.0009 | 2.5001 | 1.84666 | 23.78 |
| 2 | 57.0200 | 13.2602 | 1.62041 | 60.29 |
| 3 | 291.2864 | 0.2000 | | |
| 4 | 52.5036 | 6.5065 | 1.87070 | 40.73 |
| 5 | 88.5535 | DD[5] | | |
| 6 | 62.1339 | 1.5010 | 1.83481 | 42.74 |
| 7 | 20.6650 | 10.7931 | | |
| 8 | −89.8850 | 1.1998 | 1.83481 | 42.74 |
| 9 | 40.4947 | DD[9] | | |
| 10 | 32.1940 | 3.5960 | 1.58913 | 61.13 |
| 11 | 65.6658 | DD[11] | | |
| 12 | −30.6246 | 1.4965 | 1.78880 | 28.43 |
| 13 | −40.0037 | DD[13] | | |
| 14 | 401.8731 | 4.4237 | 1.89286 | 20.36 |
| 15 | −69.2645 | DD[15] | | |
| 16 | 65.8746 | 10.2649 | 1.49700 | 81.61 |
| 17 | −29.4118 | 1.3107 | 1.58144 | 40.75 |
| 18 | −74.3408 | 8.7667 | | |
| 19 | 77.3852 | 1.5008 | 1.80610 | 40.93 |
| 20 | 29.1761 | 7.9662 | 1.49700 | 81.61 |
| 21 | −176.0042 | DD[21] | | |
| 22 | −64.3055 | 1.2005 | 1.80518 | 25.42 |
| 23 | 86.2808 | 6.6458 | | |
| 24 | −1401.8602 | 9.4616 | 1.61800 | 63.33 |
| 25 | −29.0810 | 1.2009 | 1.84666 | 23.78 |
| 26 | −59.8834 | DD[26] | | |
| 27 | −3898.2647 | 6.0144 | 1.72916 | 54.68 |

TABLE 20A-continued

Example 7

| Sn | R | D | Nd | vd |
|---|---|---|---|---|
| 28 | −77.6563 | 0.2006 | | |
| 29 | 51.5312 | 6.1591 | 1.77250 | 49.60 |
| 30 | 129.3129 | DD[30] | | |

TABLE 20B

Example 7

| Sn | R | D | Nd | vd |
|---|---|---|---|---|
| 31 | −43.0339 | 7.9594 | 1.67270 | 32.10 |
| 32 | 73.1433 | 1.8979 | | |
| 33 | −872.3319 | 6.8223 | 1.77250 | 49.60 |
| 34 | −33.5891 | DD[34] | | |
| 35 | 30.7353 | 7.5700 | 1.52841 | 76.45 |
| 36 | −75.7566 | DD[36] | | |
| 37 | 23.5836 | 7.3457 | 1.62041 | 60.29 |
| 38 | 1673.4771 | 0.6658 | | |
| 39 | −130.8155 | 3.3188 | 1.60562 | 43.71 |
| 40 | 12.9389 | DD[40] | | |
| 41(St) | ∞ | 4.6362 | | |
| 42 | −12.7808 | 2.9261 | 1.74950 | 35.33 |
| 43 | 410.3897 | 1.0548 | | |
| 44 | −51.2037 | 5.1938 | 1.59522 | 67.73 |
| 45 | −17.9209 | 0.3658 | | |
| 46 | 94.8843 | 5.9392 | 1.49700 | 81.61 |
| 47 | −22.2457 | DD[47] | | |
| 48 | 33.8795 | 3.7611 | 1.87070 | 40.73 |
| 49 | 63.6888 | 12.3400 | | |
| 50 | ∞ | 23.0000 | 1.51633 | 64.14 |
| 51 | ∞ | 3.0000 | 1.48749 | 70.44 |
| 52 | ∞ | 0.3538 | | |

TABLE 21

Example 7

| | Wide angle end | First intermediate | Second intermediate | Telephoto end |
|---|---|---|---|---|
| Zr | 1.0 | 1.9 | 5.0 | 7.0 |
| \|f\| | 14.54 | 28.06 | 58.15 | 101.77 |
| FNo. | 2.30 | 2.30 | 2.30 | 2.72 |
| 2ω[°] | 77.4 | 45.2 | 22.6 | 13.2 |

TABLE 22

| | Wide angle end | First intermediate | Second intermediate | Telephoto end |
|---|---|---|---|---|
| Example 7 Infinity | | | | |
| DD[5] | 0.50 | 14.71 | 33.81 | 33.81 |
| DD[9] | 23.46 | 4.34 | 0.99 | 0.99 |
| DD[11] | 36.63 | 14.18 | 5.14 | 5.14 |
| DD[13] | 0.50 | 13.54 | 11.20 | 11.20 |
| DD[15] | 36.95 | 25.89 | 0.50 | 0.50 |
| DD[21] | 2.90 | 20.18 | 38.77 | 38.77 |
| DD[26] | 8.59 | 16.68 | 19.11 | 19.11 |
| DD[30] | 75.00 | 75.00 | 75.00 | 72.13 |
| DD[34] | 17.77 | 17.77 | 17.77 | 0.50 |
| DD[36] | 0.20 | 0.20 | 0.20 | 2.48 |
| DD[40] | 8.56 | 8.56 | 8.56 | 7.15 |
| DD[47] | 23.69 | 23.69 | 23.69 | 42.96 |
| Example 7 Projection magnification 150 times | | | | |
| DD[5] | 0.50 | 14.71 | 33.81 | 33.81 |
| DD[9] | 23.46 | 4.34 | 0.99 | 0.99 |
| DD[11] | 36.63 | 14.18 | 5.14 | 5.14 |
| DD[13] | 0.50 | 13.54 | 11.20 | 11.20 |
| DD[15] | 36.95 | 25.89 | 0.50 | 0.50 |
| DD[21] | 3.14 | 20.61 | 39.86 | 39.55 |
| DD[26] | 8.34 | 16.23 | 18.03 | 18.34 |
| DD[30] | 75.00 | 75.00 | 75.00 | 72.13 |
| DD[34] | 17.77 | 17.77 | 17.77 | 0.50 |
| DD[36] | 0.20 | 0.20 | 0.20 | 2.48 |
| DD[40] | 8.56 | 8.56 | 8.56 | 7.15 |
| DD[47] | 23.69 | 23.69 | 23.69 | 42.96 |

Figure 29:
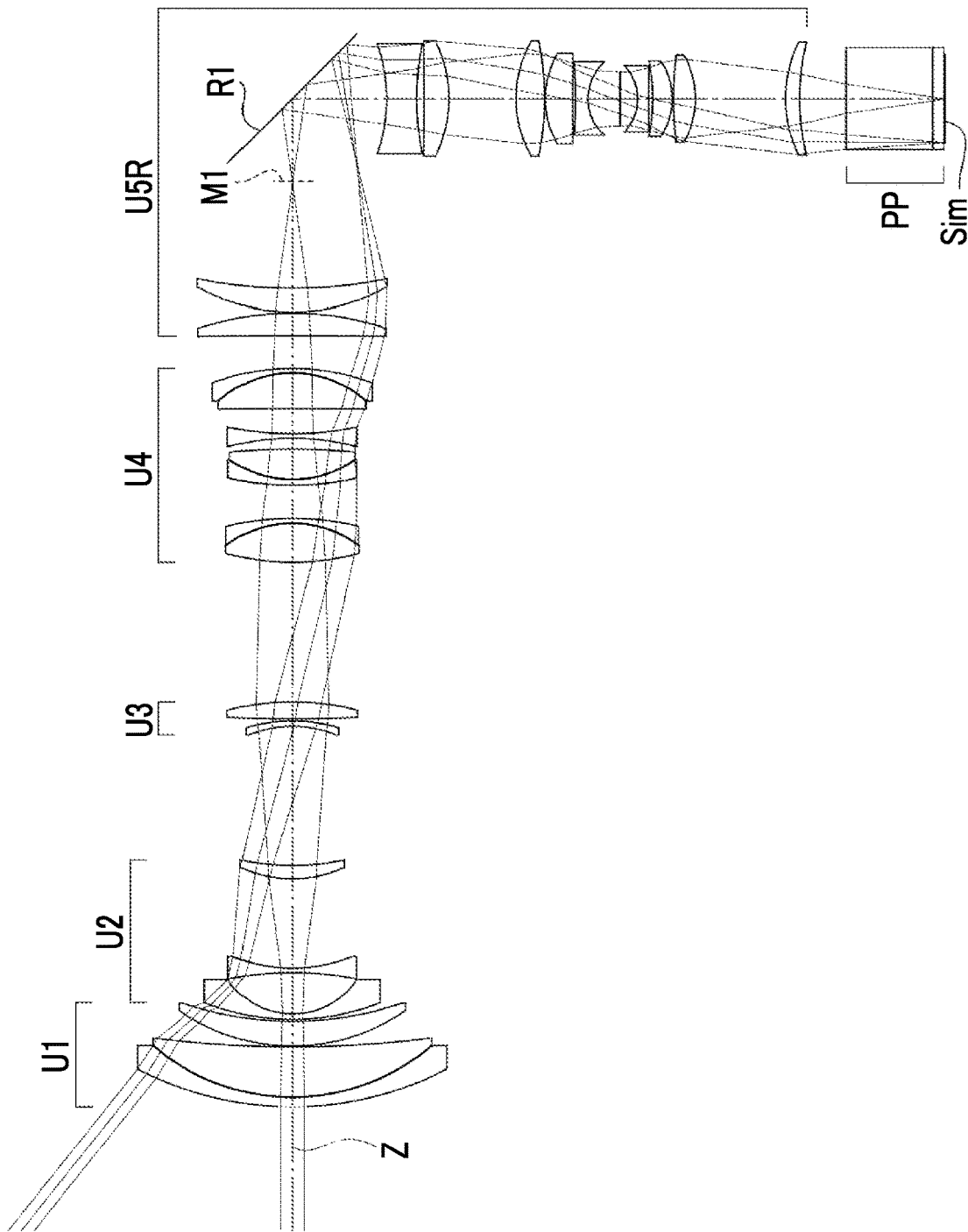
FIG. 29 is a cross-sectional view showing a configuration and luminous flux of a zoom lens according to a modification example of Example 7.

FIG. 29 shows a configuration and luminous flux of a zoom lens according to a modification example of Example 7 at the wide angle end. The zoom lens of FIG. 29 consists of a first unit U1, a second unit U2, a third unit U3, a fourth unit U4, and a fifth unit U5R, in order from the magnification side to the reduction side along the optical path. The fifth unit U5R is different from the fifth unit U5 of the zoom lens of Example 7 in that the mirror R1 which is an optical path deflection member is included at a position adjacent to the intermediate image MI and the optical path is deflected by the mirror R1. Other configurations of the zoom lens of FIG. 29 are the same as those of the zoom lens of Example 7. By deflecting the optical path, a compact configuration is possible.

Table 23 shows the corresponding values of Conditional Expressions (1) to (7) and radiuses of the effective image circle Ymax of the zoom lenses of Examples 1 to 7. Table 23 shows values in a case where the d line is used as a reference. Preferable ranges of the conditional expressions may be set by using the corresponding values of the examples shown in Table 23 as the upper limits or the lower limits of the conditional expressions.

TABLE 23

Table 23

| Expression number | | Example 1 | Example 2 | Example 3 | Example 4 |
|---|---|---|---|---|---|
| (1) | Ymax/\|exPw\| | 0.05 | 0.05 | 0.05 | 0.06 |
| (2) | f2A/f2B | −0.16 | −0.16 | −0.18 | −0.10 |
| (3) | f4A/f4B | −1.14 | −1.11 | −1.05 | 0.39 |
| (4) | v4pave | 75.67 | 75.67 | 73.21 | 76.28 |
| (5) | fS1w/\|fw\| | 1.39 | 1.33 | 1.34 | 1.15 |
| (6) | ThS1/ThZL | 0.58 | 0.58 | 0.57 | 0.61 |
| (7) | Bfw/\|fw\| | 2.37 | 2.37 | 2.46 | 1.78 |
| | Ymax | 11.65 | 11.65 | 11.65 | 13.15 |

| Expression number | | Example 5 | Example 6 | Example 7 |
|---|---|---|---|---|
| (1) | Ymax/\|exPw\| | 0.06 | 0.05 | 0.06 |
| (2) | f2A/f2B | −0.08 | −0.17 | −0.15 |
| (3) | f4A/f4B | 0.15 | −0.76 | −0.98 |
| (4) | y4pave | 79.89 | 74.68 | 75.52 |
| (5) | fS1w/\|fw\| | 1.12 | 1.21 | 1.50 |
| (6) | ThS1/ThZL | 0.59 | 0.58 | 0.54 |
| (7) | Bfw/\|fw\| | 1.73 | 2.38 | 2.06 |
| | Ymax | 13.15 | 11.65 | 11.65 |

The zoom lenses of Examples 1 to 7 each have a high magnification such as a zoom magnification of 3 times or more and more specifically a zoom magnification of 5 times or more. Further, in the zoom lenses of Examples 1 to 7, fluctuation in aberrations during magnification change is suppressed, and each aberration is satisfactorily corrected to achieve high optical performance.

It is necessary for a projection optical system used in a projection type display device to have favorable aberration correction in accordance with a resolution of the light valve of the projection type display device. Further, in recent years, with an increase in luminance of the light valve, it is necessary for the projection optical system to cover a wide focal range in order to utilize the projection type display device in various situations. For this reason, an increase in magnification has been achieved, but it is not easy to achieve both the increase in magnification and favorable aberration correction, and the zoom magnification is usually limited to about 2 times. In the related art, a method has been adopted in which a plurality of projection optical systems having a zoom magnification of about 1 to 2 times are provided for each focal range, and the projection optical systems are replaced to cover a wide focal range. However, this method has problems such as contamination of dust, troublesome work of replacing the projection optical system, and the need to provide the projection optical system every time for each usage situation in the case of replacing the projection optical system. On the other hand, the zoom lenses of Examples 1 to 7 described above achieve a sufficiently high zoom magnification and favorable aberration correction including the case of magnification change, and thus it is possible to solve the above-mentioned problems.

Figure 30:
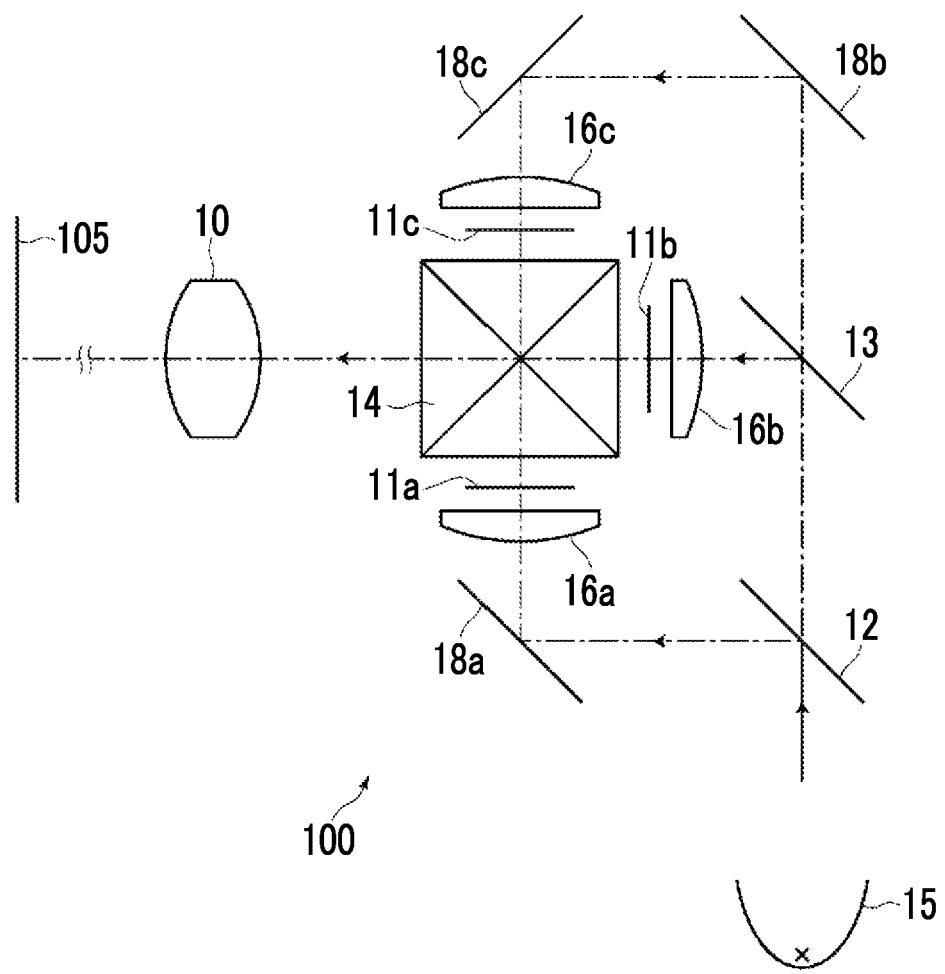
FIG. 30 is a schematic configuration diagram of a projection type display device according to an embodiment.

Next, a projection type display device according to an embodiment of the present disclosure will be described. FIG. 30 is a schematic configuration diagram of a projection type display device according to an embodiment of the present disclosure. The projection type display device 100 shown in FIG. 30 has the zoom lens 10 according to the embodiment of the present disclosure, a light source 15, transmissive display elements 11a to 11c as light valves each corresponding to each color light, dichroic mirrors 12 and 13 for color separation, a cross dichroic prism 14 for color synthesis, condenser lenses 16a to 16c, and total reflection mirrors 18a to 18c that deflect the optical path. It should be noted that FIG. 30 schematically shows the zoom lens 10. Further, an integrator is disposed between the light source 15 and the dichroic mirror 12, but is not shown in FIG. 30.

White light originating from the light source 15 is separated into ray with three colors (green light, blue light, and red light) through the dichroic mirrors 12 and 13. Thereafter, the ray respectively pass through the condenser lenses 16a to 16c, are incident into and modulated through the transmissive display elements 11a to 11c respectively corresponding to the ray with the respective colors, are subjected to color synthesis through the cross dichroic prism 14, and are subsequently incident into the zoom lens 10. The zoom lens 10 projects an optical image based on the modulated light modulated through the transmissive display elements 11a to 11c onto the screen 105.

Figure 31:
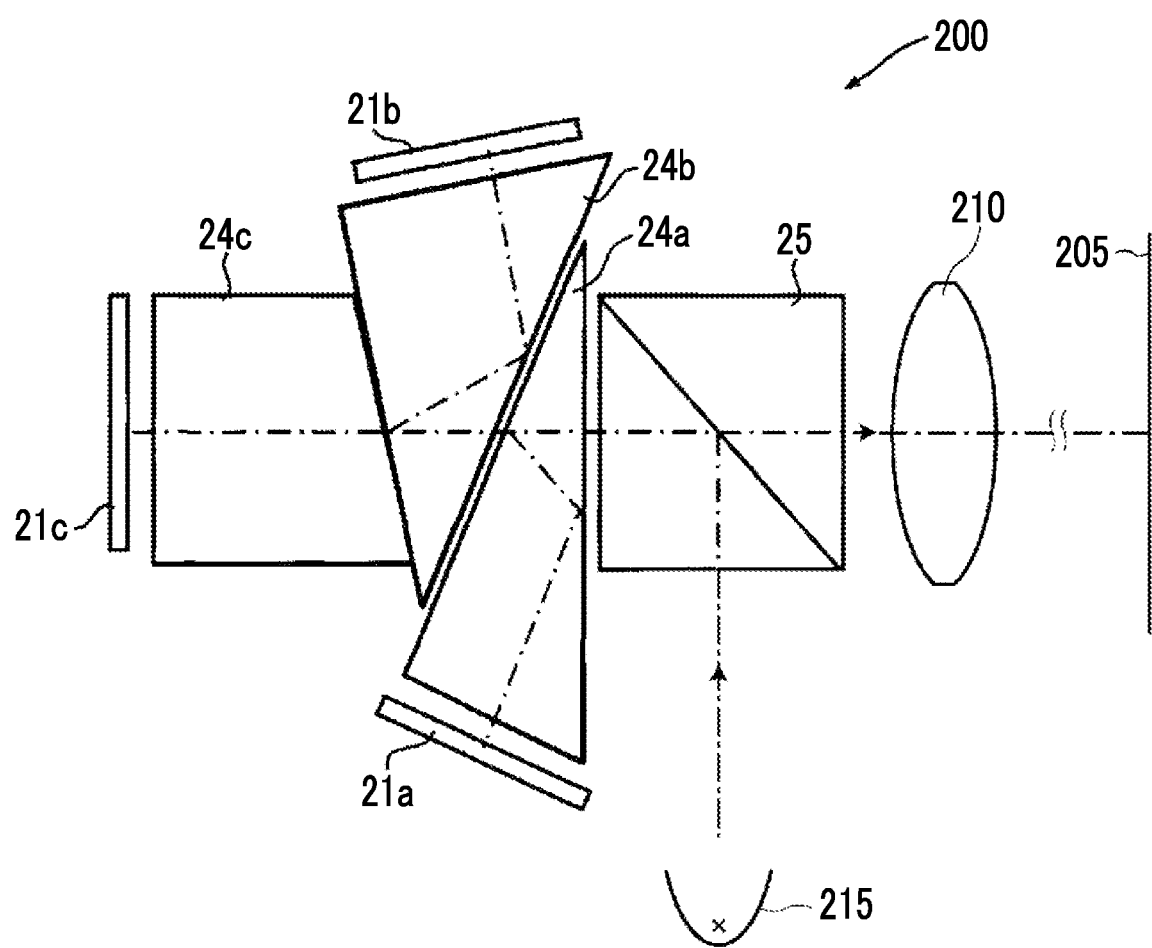
FIG. 31 is a schematic configuration diagram of a projection type display device according to another embodiment.

FIG. 31 is a schematic configuration diagram of a projection type display device according to another embodiment of the present disclosure. The projection type display device 200 shown in FIG. 31 has a zoom lens 210 according to the embodiment of the present disclosure, a light source 215, digital micromirror device (DMD: registered trademark) elements 21a to 21c as light valves corresponding to respective color light, total internal reflection (TIR) prisms 24a to 24c for color separation and color synthesis, and a polarized light separating prism 25 that separates illumination light and projection light. It should be noted that FIG. 31 schematically shows the zoom lens 210. Further, an integrator is disposed between the light source 215 and the polarized light separating prism 25, but is not shown in FIG. 31.

White light originating from the light source 215 is reflected on a reflective surface inside the polarized light separating prism 25, and is separated into ray with three colors (green light, blue light, and red light) through the TIR prisms 24a to 24c. The separated ray with the respective colors are respectively incident into and modulated through the corresponding DMD elements 21a to 21c, travel through the TIR prisms 24a to 24c again in a reverse direction, are subjected to color synthesis, are subsequently transmitted through the polarized light separating prism 25, and are incident into the zoom lens 210. The zoom lens 210 projects an optical image based on the modulated light modulated through the DMD elements 21a to 21c onto the screen 205.

Figure 32:
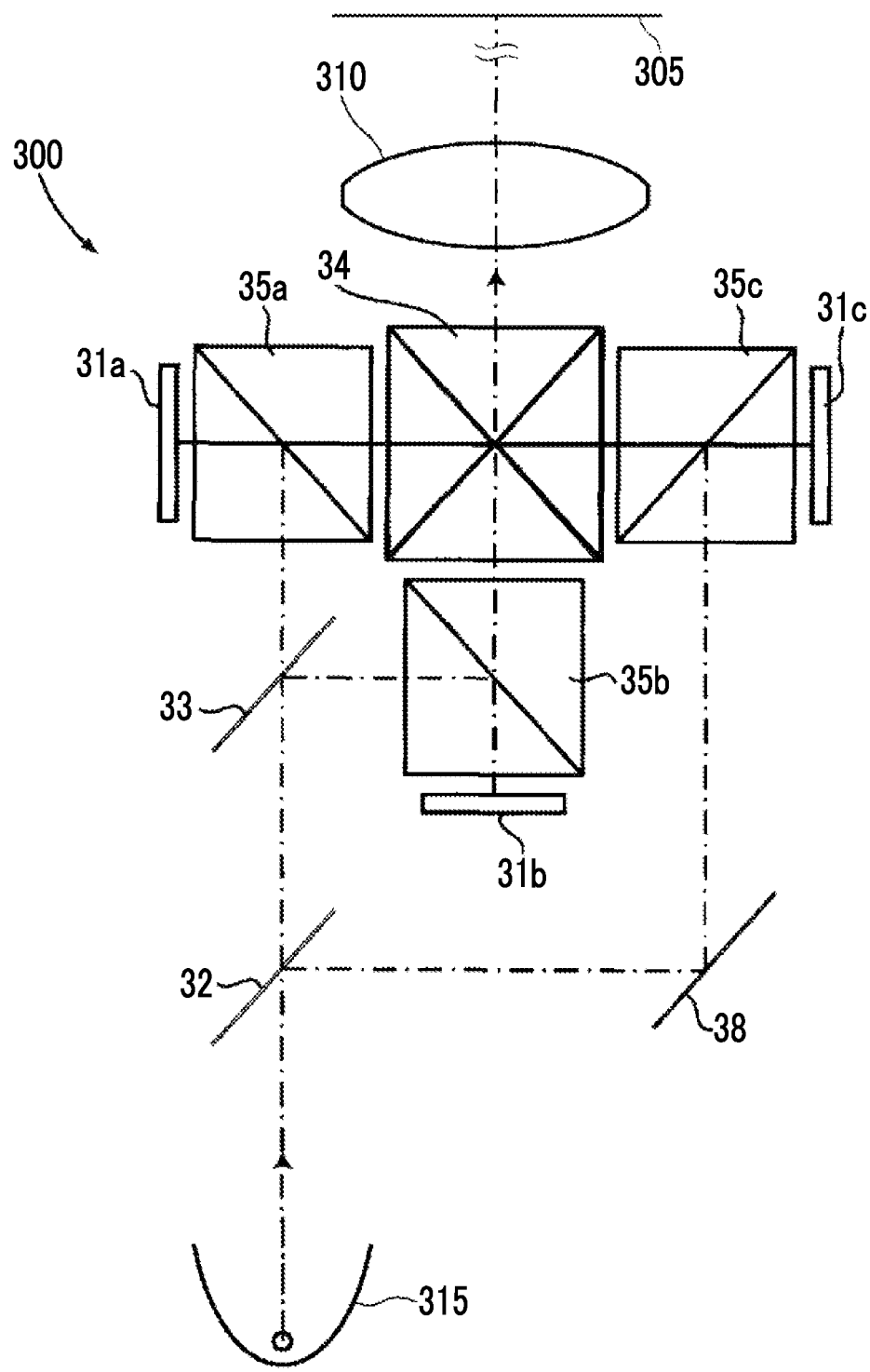
FIG. 32 is a schematic configuration diagram of a projection type display device according to still another embodiment.

FIG. 32 is a schematic configuration diagram of a projection type display device according to still another embodiment of the present disclosure. The projection type display device 300 shown in FIG. 32 has a zoom lens 310 according to the embodiment of the present disclosure, a light source 315, reflective display elements 31a to 31c as light valves each corresponding to each color light, dichroic mirrors 32 and 33 for color separation, a cross dichroic prism 34 for color synthesis, a total reflection mirror 38 for deflecting the optical path, and polarized light separating prisms 35a to 35c. It should be noted that FIG. 32 schematically shows the zoom lens 310. Further, an integrator is disposed between the light source 315 and the dichroic mirror 32, but is not shown in FIG. 32.

White light originating from the light source 315 is separated into ray with three colors (green light, blue light, and red light) through the dichroic mirrors 32 and 33. The separated ray with the respective colors respectively pass through the polarized light separating prisms 35a to 35c, are incident into and modulated through the reflective display elements 31a to 31c respectively corresponding to the ray with the respective colors, are subjected to color synthesis through the cross dichroic prism 34, and are subsequently incident into the zoom lens 310. The zoom lens 310 projects an optical image based on the modulated light modulated through the reflective display elements 31a to 31c onto the screen 305.

Figure 33:
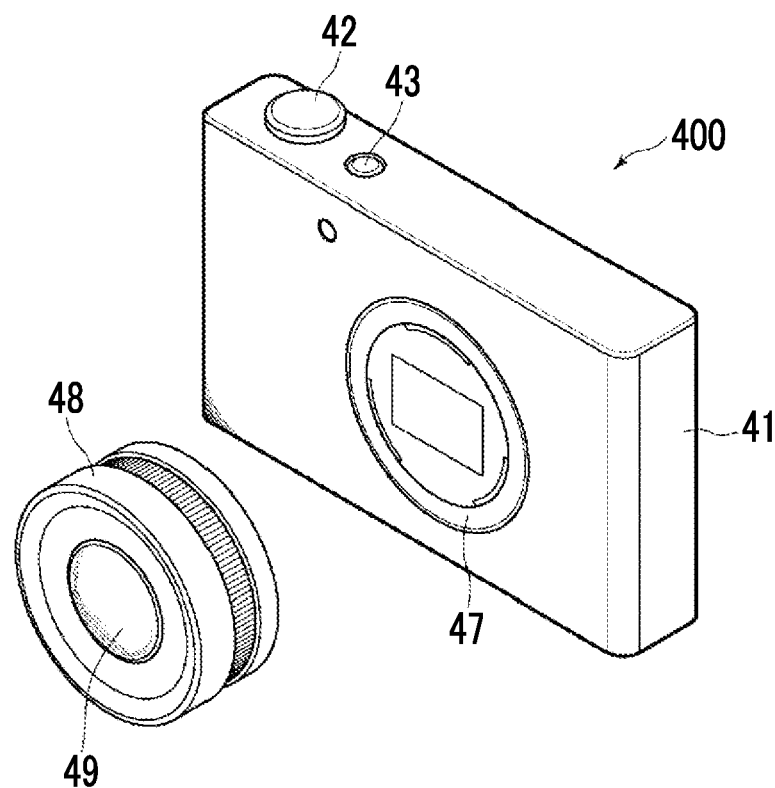
FIG. 33 is a perspective view of the front side of an imaging apparatus according to an embodiment.
Figure 34:
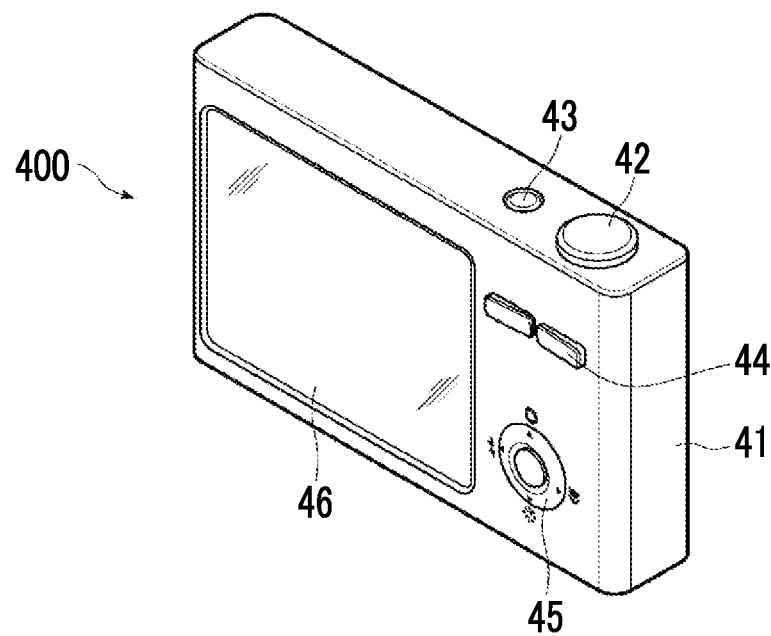
FIG. 34 is a perspective view of the rear side of the imaging apparatus shown in FIG. 33.

FIGS. 33 and 34 are external views of a camera 400 which is the imaging apparatus according to the embodiment of the present disclosure. FIG. 33 is a perspective view of the camera 400 viewed from a front side, and FIG. 34 is a perspective view of the camera 400 viewed from a rear side. The camera 400 is a mirrorless single-lens type digital camera on which an interchangeable lens 48 is attachably and detachably mounted. The interchangeable lens 48 is a lens barrel containing a zoom lens 49 according to the embodiment of the present disclosure.

The camera 400 comprises a camera body 41, and a shutter button 42 and a power button 43 are provided on an upper surface of the camera body 41. Further, operating parts 44 and 45 and a display unit 46 are provided on a rear surface of the camera body 41. The display unit 46 displays a captured image or an image within an angle of view before imaging.

An imaging aperture, through which light from an imaging target is incident, is provided at the center on the front surface of the camera body 41. A mount 47 is provided at a position corresponding to the imaging aperture. The interchangeable lens 48 is mounted on the camera body 41 with the mount 47 interposed therebetween.

In the camera body 41, there are provided an imaging element, a signal processing circuit, a recording medium, and the like. The imaging element (not shown in the drawing) such as a charge coupled device (CCD) or a complementary metal oxide semiconductor (CMOS) outputs an imaging signal based on a subject image which is formed through the interchangeable lens 48. The signal processing circuit (not shown in the drawing) generates an image through processing of the imaging signal which is output from the imaging element. The recording medium (not shown in the drawing) records the generated image. The camera 400 captures a static image or a video by pressing the shutter button 42, and records image data, which is obtained through imaging, in the recording medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the projection type display device according to the technique of the present disclosure is not limited to the above-mentioned configuration, and may be modified into various forms such as the optical member used for ray separation or ray synthesis and the light valve. The light valve is not limited to a form in which light from a light source is spatially modulated through an image display element and is output as an optical image based on image data, but may be a form in which light itself output from the self-luminous image display element is output as an optical image based on the image data. Examples of the self-luminous image display element include an image display element in which light emitting elements such as light emitting diodes (LED) or organic light emitting diodes (OLED) are two-dimensionally arranged.

Further, the imaging apparatus according to the technique of the present disclosure is not limited to the above-mentioned configuration, and may be modified into various forms such as a non-mirrorless type camera, a film camera, a video camera, and a camera for movie imaging.

What is claimed is:

1. A zoom lens that forms an intermediate image at a position conjugate to a reduction side image formation plane and reforms the intermediate image on a magnification side image formation plane, the zoom lens consisting of, in order from a magnification side to a reduction side along an optical path:
   a first unit; a second unit; a third unit; a fourth unit; and a fifth unit,
   wherein in a case where one lens group is a group of which a spacing to an adjacent group in an optical axis direction changes during magnification change,
   the first unit consists of one lens group that has a positive refractive power,
   the second unit consists of two lens groups that move by changing mutual spacing between the lens groups during magnification change, and has a negative refractive power as a whole at a wide angle end,
   the third unit includes one or more lens groups that move during magnification change,
   the fourth unit includes one or more lens groups that move during magnification change, and
   the fifth unit consists of one or more lens groups, and
   in a case where, among intersections of a principal ray having a maximum angle of view and an optical axis at the wide angle end, the intersection on the magnification side on the optical path is set as a first intersection, and the intersection on the reduction side is set as a second intersection,
   at the wide angle end, the third unit includes a lens group that has a positive refractive power and that is located closest to the first intersection, and
   at the wide angle end, the fifth unit includes the second intersection between the most magnification side lens surface of the fifth unit and the most reduction side lens surface of the fifth unit.

2. The zoom lens according to claim 1, wherein the zoom lens is configured to be telecentric on the reduction side.

3. The zoom lens according to claim 1,
   wherein assuming that
   a radius of an effective image circle on the reduction side is Ymax, and
   a distance on the optical axis from the reduction side image formation plane to a paraxial exit pupil position at the wide angle end in a case where the reduction side is set as an exit side in a state where the magnification side image formation plane is at infinity is exPw,
   Conditional Expression (1) is satisfied, which is represented by $$0 < Y\max/|exPw| < 0.1 \quad (1).$$

4. The zoom lens according to claim 1,
   wherein in a case where, in the two lens groups of the second unit, a lens group on the magnification side on the optical path is set as a second A lens group and a lens group on the reduction side is set as a second B lens group,
   the second A lens group has a negative refractive power, and the second B lens group has a positive refractive power.

5. The zoom lens according to claim 4, wherein the second B lens group moves to the magnification side and then moves to the reduction side during magnification change from the wide angle end to a telephoto end.

6. The zoom lens according to claim 1,
   wherein in a case where, in the two lens groups of the second unit, a lens group on the magnification side on the optical path is set as a second A lens group, and a lens group on the reduction side is set as a second B lens group,
   assuming that
   a focal length of the second A lens group is f2A, and
   a focal length of the second B lens group is f2B,
   Conditional Expression (2) is satisfied, which is represented by $$-0.5 < f2A/f2B < 0 \quad (2).$$

7. The zoom lens according to claim 1,
   wherein the fourth unit consists of, in order from the magnification side to the reduction side along the optical path, a fourth A lens group that has a positive refractive power and a fourth B lens group that has a positive or negative refractive power, and
   during magnification change, the fourth A lens group and the fourth B lens group move by changing mutual spacing between the lens groups.

8. The zoom lens according to claim 7,
   wherein assuming that
   a focal length of the fourth A lens group is f4A, and
   a focal length of the fourth B lens group is f4B,
   Conditional Expression (3) is satisfied, which is represented by $$-2 < f4A/f4B < 1 \quad (3).$$

9. The zoom lens according to claim 1, wherein assuming that an average value of Abbe numbers of all positive lenses included in the fourth unit at a d line is ν4pave, Conditional Expression (4) is satisfied, which is represented by $$60 < \nu 4pave \qquad (4).$$

10. The zoom lens according to claim 1, wherein the intermediate image is located in the fifth unit.

11. The zoom lens according to claim 1,
wherein in a case where an optical system closer to the magnification side than the intermediate image is set as a first optical system, and an optical system closer to the reduction side than the intermediate image is set as a second optical system,
assuming that
a focal length of the first optical system at the wide angle end is fS1w, and
a focal length of the zoom lens at the wide angle end is fw,
Conditional Expression (5) is satisfied, which is represented by $$0.8 \leq fS1w/|fw| \qquad (5).$$

12. The zoom lens according to claim 1,
wherein in a case where an optical system closer to the magnification side than the intermediate image is set as a first optical system, and an optical system closer to the reduction side than the intermediate image is set as a second optical system,
the first optical system corrects field curvature occurring in the second optical system to reform the intermediate image on the magnification side image formation plane.

13. The zoom lens according to claim 1,
wherein the intermediate image is located closer to the reduction side than the second unit, and
in a case where an optical system closer to the magnification side than the intermediate image is set as a first optical system, and an optical system closer to the reduction side than the intermediate image is set as a second optical system,
assuming that
a distance on the optical axis from a lens surface closest to the magnification side in the first optical system to a lens surface closest to the reduction side in the first optical system at the wide angle end is ThS1, and
a distance on the optical axis from a lens surface closest to the magnification side in the zoom lens to the lens surface closest to the reduction side in the zoom lens at the wide angle end is ThZL,
Conditional Expression (6) is satisfied, which is represented by $$0.4 < ThS1/ThZL < 0.7 \qquad (6).$$

14. The zoom lens according to claim 1,
wherein assuming that
an air-equivalent distance on the optical axis from a lens surface of the zoom lens closest to the reduction side to a reduction side focal position of the zoom lens at the wide angle end is Bfw, and
a focal length of the zoom lens at the wide angle end is fw,
Conditional Expression (7) is satisfied, which is represented by $$1 < Bfw/|fw| \qquad (7).$$

15. The zoom lens according to claim 1, comprising an optical path deflection member that deflects the optical path at a position adjacent to the intermediate image.

16. The zoom lens according to claim 15, wherein the optical path deflection member deflects the optical path by 90 degrees.

17. The zoom lens according to claim 1, wherein at least one or more lenses of the fourth unit and the fifth unit move during focusing.

18. A projection type display device comprising:
a light valve that outputs an optical image; and
the zoom lens according to claim 1,
wherein the zoom lens projects the optical image, which is output from the light valve, onto a screen.

19. An imaging apparatus comprising the zoom lens according to claim 1.

* * * * *